United States Patent
Mueck et al.

(10) Patent No.: US 11,382,071 B2
(45) Date of Patent: Jul. 5, 2022

(54) MANAGEMENT OF PREFERRED CHANNEL ALLOCATIONS BETWEEN WIRELESS COMMUNICATION BANDS

(71) Applicant: Intel Corporation, Santa Clara, CA (US)

(72) Inventors: Markus Dominik Mueck, Unterhaching (DE); Dario Sabella, Munich (DE)

(73) Assignee: Intel Corporation, Santa Clara, CA (US)

( * ) Notice: Subject to any disclaimer, the term of this patent is extended or adjusted under 35 U.S.C. 154(b) by 94 days.

(21) Appl. No.: 16/981,664

(22) PCT Filed: Jun. 5, 2019

(86) PCT No.: PCT/US2019/035597
§ 371 (c)(1),
(2) Date: Sep. 16, 2020

(87) PCT Pub. No.: WO2019/236714
PCT Pub. Date: Dec. 12, 2019

(65) Prior Publication Data
US 2021/0099976 A1    Apr. 1, 2021

Related U.S. Application Data

(60) Provisional application No. 62/682,732, filed on Jun. 8, 2018.

(51) Int. Cl.
*H04W 72/04* (2009.01)
*H04W 4/40* (2018.01)

(52) U.S. Cl.
CPC ............. *H04W 72/04* (2013.01); *H04W 4/40* (2018.02)

(58) Field of Classification Search
CPC .......... H04B 7/024; H04L 1/001; H04L 5/00; H04W 4/40–48; H04W 16/00;
(Continued)

(56) References Cited

U.S. PATENT DOCUMENTS 10,757,042 B2 *   8/2020   Gaal ..................... H04W 88/06
10,841,930 B2 *  11/2020   Gao ...................... H04W 72/04
(Continued)

FOREIGN PATENT DOCUMENTS

WO       2017-052488 A1    3/2017
WO    WO 2017-189035 A1   11/2017

OTHER PUBLICATIONS

International Search Report and Written Opinion dated Sep. 27, 2019 for International Patent Application No. PCT/US2019/035597, 15 pages.
(Continued)

*Primary Examiner* — Thomas R Cairns
(74) *Attorney, Agent, or Firm* — Schwabe, Williamson & Wyatt, P.C.

(57) ABSTRACT

Various systems and methods for establishing, configuring, and operating multi-access edge computing (MEC) communications, such as in connection with management of preferred channel allocations between two or more vehicle-to-everything (V2X) Radio Access Technologies (RATs), are discussed herein. In embodiments, a resource allocation (for example, channel allocations) for vehicle user equipment (vUEs) is determined based on a number of vUEs supporting each of one or more V2X RATs detected in one or more coverage areas of one or more Road Side Units (RSUs). Other embodiments are described and/or claimed.

24 Claims, 13 Drawing Sheets

(58) Field of Classification Search
CPC ........... H04W 36/06; H04W 72/04–10; H04W 72/12; H04W 76/14; H04W 84/005
See application file for complete search history.

(56) References Cited

U.S. PATENT DOCUMENTS

| | | | | |
|---|---|---|---|---|
| 2010/0002637 | A1* | 1/2010 | Huoviala | H04W 72/1247 370/329 |
| 2015/0063311 | A1 | 3/2015 | Chindapol et al. | |
| 2015/0296411 | A1 | 10/2015 | Meyer et al. | |
| 2017/0188391 | A1 | 6/2017 | Rajagopal et al. | |

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300 V15.1.0; Mar. 2018, 341 pages.

3GPP, "3rd Generation Partnership Project; Technical Specification Group Services and System Aspects; Proximity-based services (ProSe); Stage 2 (Release 15)", 3GPP TS 23.303 V15.1.0; Jun. 2018, 130 pages.

CEPT Report 71, "Report from CEPT to the European Commission in response to the Mandate to study the extension of the Intelligent Transport Systems (ITS) safety-related band at 5.9 GHz", Mar. 8, 2019, 42 pages.

Markus Mueck et al., "ETSI Reconfigurable Radio Systems: Status and Future Directions on Software Defined Radio and Cognitive Radio Standards", Oct. 2010, 10 pages, IEEE Communications Magazine.

Yun Chao Hu et al., "Mobile Edge Computing A key technology towards 5G", Sep. 2015, 16 pages, ETSI White Paper No. 11.

ETSI, "Mobile Edge Computing (MEC); Technical Requirements", Mar. 2016, 40 pages, ETSI GS MEC 002 V1.1.1.

ETSI, "Mobile Edge Computing (MEC); Framework and Reference Architecture", Mar. 2016, 18 pages, ETSI GS MEC 003 V1.1.1.

ETSI, "Mobile Edge Computing(MEC); Mobile Edge Platform Application Enablement", Jul. 2017, 55 pages, ETSI GS MEC 011 V1.1.1.

ETSI, "Intelligent Transport Systems (ITS); Vehicular Communications; GeoNetworking; Part 1: Requirements", Mar. 2010, 13 pages, ETSI TS 102 636-1 V1.1.1.

ETSI, "Intelligent Transport Systems (ITS); Vehicular Communications; GeoNetworking; Part 2: Scenarios", Mar. 2010, 9 pages, ETSI TS 102 636-2 V1.1.1.

ETSI, "Intelligent Transport Systems (ITS); Vehicular Communications; GeoNetworking; Part 3: Network architecture", Mar. 2010, 23 pages, ETSI TS 102 636-3 V1.1.1.

ETSI, "Intelligent Transport Systems (ITS); Communications Architecture", Sep. 2010, 44 pages, ETSI EN 302 665 V1.1.1.

ETSI, "Intelligent Transport Systems (ITS); Vehicular Communications; GeoNetworking; Part 5: Transport Protocols; Sub-part 1: Basic Transport Protocol", Feb. 2011, 15 pages, ETSI TS 102 636-5-1 V1.1 1.

ETSI, "Intelligent Transport Systems (ITS); Vehicular Communications; GeoNetworking; Part 6: Internet Integration; Sub-part 1: Transmission of IPv6 Packets over GeoNetworking Protocols", Mar. 2011, 45 pages, ETSI TS 102 636-6-1 V1.1.1.

ETSI, "Intelligent Transport Systems (ITS); Vehicular communications; GeoNetworking; Part 4: Geographical addressing and forwarding for point-to-point and point-to-multipoint communications; Sub-part 1: Media-Independent Functionality", Jun. 2011, 75 pages, ETSI TS 102 636-4-1 V1.1.1.

ETSI, "Transport and Traffic Telematics (TTT); Dedicated Short Range Communication (DSRC) transmission equipment (500 kbit/s / 250 kbit/s) operating in the 5 795 MHz to 5 815 MHz frequency band; Part 2: Harmonised Standard covering the essential requirements of article 3.2 of the Directive 2014/53/EU; Sub-part 1: Road Side Units (RSU)", Sep. 2016, 52 pages, ETSI EN 300 674-2-1 V2.1.1.

* cited by examiner

MANAGEMENT OF PREFERRED CHANNEL ALLOCATIONS BETWEEN WIRELESS COMMUNICATION BANDS

RELATED APPLICATIONS

The present application is a national phase entry under 35 U.S.C. § 371 of Int'l App. No. PCT/US2019/035597 filed Jun. 5, 2019 entitled "MANAGEMENT OF PREFERRED CHANNEL ALLOCATIONS BETWEEN WIRELESS COMMUNICATION BANDS", which designated, among the various States, the United States of America, which claims priority to U.S. Provisional App. No. 62/682,732 filed Jun. 8, 2018, the contents of which is hereby incorporated by reference in their entireties.

TECHNICAL FIELD

Embodiments described herein generally relate to data processing, network communication, and communication system implementations, and in particular, to techniques for establishing and implementing communications in multi-access edge computing (MEC) and Internet of Things (IoT) device networks.

BACKGROUND

Internet of Things (IoT) devices are physical or virtualized objects that may communicate on a network, and may include sensors, actuators, and other input/output components, such as to collect data or perform actions from a real world environment. For example, IoT devices may include low-powered devices that are embedded or attached to everyday things, such as buildings, vehicles, packages, etc., to provide an additional level of artificial sensory perception of those things. Recently, IoT devices have become more popular and thus applications using these devices have proliferated. The deployment of IoT devices and Multi-access Edge Computing (MEC) services have introduced a number of advanced use cases and scenarios occurring at or otherwise involving the edge of the network. However, these advanced use cases have also introduced a number of corresponding technical challenges related to security, processing/computing resources, network resources, service availability and efficiency, among many other issues.

MEC offers application developers and content providers cloud-computing capabilities and an Information Technology (IT) service environment at the edge of the network. This environment is characterized by ultra-low latency and high bandwidth as well as real-time access to radio network information that may be leveraged by edge applications (e.g., MEC applications). MEC technology permits flexible and rapid deployment of innovative applications and services towards mobile subscribers, enterprises and vertical segments.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
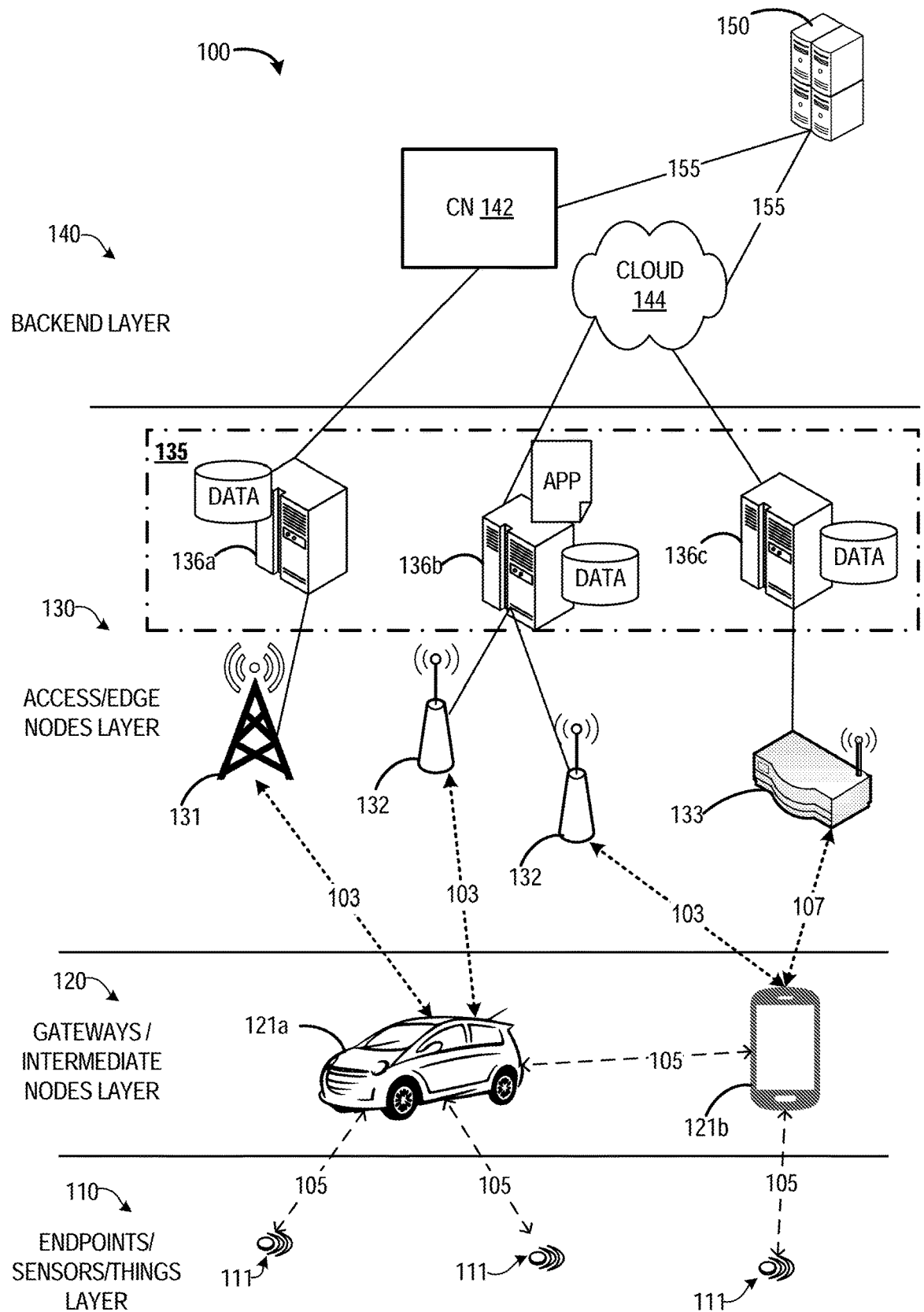
FIG. 1 depicts an example edge computing environment comprising a plurality of layers, according to various embodiments.

In the following description, methods, configurations, and related apparatuses are disclosed for the management of coexistence and interoperability between multiple vehicular communication systems (or standards), including preferred channel allocations between multiple radio communication technologies in connection with Multi-access Edge Computing (MEC) services and communication architectures.

Currently, there are two competing vehicular communication systems (or vehicle-to-everything (V2X) radio access technologies (RATs)); one system is Institute of Electrical and Electronics Engineers (IEEE) 802.11p such as Dedicated Short Range Communication (DSRC) and Intelligent Transport Systems in the 5 gigahertz (GHz) frequency band (ITS-G5), and the other system is Long Term Evolution (LTE) cellular V2X communication (C-V2X). As used herein, the term "DSRC" refers to vehicular communications in the 5.9 GHz frequency band. These systems do not have mechanisms to coexist with one another and are usually not interoperable with one another.

"Interoperability" refers to the ability of vehicle UEs (vUEs) and roadside equipment (e.g., Road Side Units (RSUs)) utilizing one vehicular communication system to communicate with vUEs and roadside equipment utilizing the other vehicular communication system. "Coexistence" refers to sharing or allocating radiofrequency resources among vUEs and roadside equipment using either vehicular communication system. One coexistence approach is the "preferred channel" approach, which involves dynamically allocating channels to be used exclusively by one system or exclusively by the other system. Another coexistence approach is the "co-channel existence" approach, which involves allocating both systems to a channel during different time slots.

As context for the applicable regulation and standardization, three safety channels of 10 megahertz (MHz) each are allocated in the 5.9 GHz ITS band. The 5G Automotive Association (5GAA) has suggested a so-called safe-harbor approach in which one channel is allocated to DSRC/ITS-G5 and one channel to LTE C-V2X in a fixed way (upper/lower channels). The middle channel should remain unused in the short-term. This proposal has been rejected by the Conference of Postal and Telecommunications Administrations (CEPT) Electronic Communication Committee (ECC), "SRDMG(17)136 ITS Background—Short Prel Action Plan and Background as well as reporting from ECC #46" ("SRDMG"), since regulation needs to be technology neutral. SRDMG has instead stated that the preferred channels approach may be viable. Instead of a fixed allocation of channels to DSRC/ITS-G5 and LTE C-V2X, such an allocation may be negotiated dynamically between the concerned systems. Further, although it is possible to have DSRC/ITS-G5 and LTE C-V2X coexisting in the same channel (e.g., Listen Before Talk (LBT) based channel access) due to the different nature of the channel access protocols of DSRC/ITS-G5 and LTE C-V2X, this approach is considered to be highly inefficient.

The technical approach discussed herein does not provide a fixed allocation for two or more distinct vehicular communication technologies (e.g., DSRC/ITS-G5 and LTE C-V2X) accessing the same band. Rather, edge network infrastructure (e.g., an RSU or a collocated MEC server/host) determines the required amount of spectrum for each vehicular communication system based on the number of vUEs using each type of vehicular communication technology, dynamically (or semi-statically) assigns a preferred channel allocation (depending on the local requirements), and forwards the allocation (or an indication of the allocation decision) to neighboring infrastructure (e.g., one or more RSUs). In an alternative embodiment, the vUEs send requests for a specific vehicular communication technology, and the edge network infrastructure dynamically (or semi-statically) assigns resources based on the number of requests for each type of communication technology.

The following discussion introduces an approach to use MEC and Edge Network entities in support of the preferred channels approach and the dynamic allocation of channels among multiple vehicular RATs (also referred to as "V2X RATs"), such as DSRC/ITS-G5 and LTE C-V2X. The technical approach discussed herein is acceptable by regulation administrations (they allow for a dynamic allocation, called "preferred channels" approach) and leads to a highly efficient overall solution, that is much more efficient than both systems existing in the same channel. Further, offering a solution that considers the inclusion of these two alternative technologies (e.g., the so-called technology neutral approach), will provide better interoperability in the V2X ecosystem, and the possibility to offer V2X/ITS services across wider deployments.

The following description provides a detailed discussion of these techniques within MEC systems and services, applicable to the larger context of Internet of Things (IoT) and fog network deployments. It will be understood that the disclosed MEC system and service deployment examples provide one illustrative example of a fog device or fog system, but that many other combinations and layouts of devices located at the edge of a network may be provided. Further, the techniques disclosed herein may relate to other IoT standards and configurations, and other intermediate processing entities and architectures. The present techniques and configurations may provide significant benefits to MEC architectures and other IoT device network architectures involving any number of edge computing devices or fog computing platforms.

For illustrative purposes, the following description is provided for deployment scenarios including vehicles (including computer-assisted and/or autonomous vehicles) in a two dimensional (2D) freeway/highway/roadway environment wherein the vehicles are automobiles. However, the embodiments described herein are also applicable to other types of vehicles, such as trucks, busses, motorboats, motorcycles, electric personal transporters, and/or any other motorized devices capable of transporting people or goods. Also, embodiments described herein are applicable to social networking between vehicles of different vehicle types. The embodiments described herein may also be applicable to three dimensional (3D) deployment scenarios where some or all of the vehicles are implemented as flying objects, such as aircraft, drones, unmanned aerial vehicles (UAVs), and/or to any other like motorized devices.

Referring now to FIG. 1, which illustrates a Multi-access Edge Computing (MEC) environment 100 in accordance with various embodiments. FIG. 1 specifically illustrates the different layers of communication occurring within the environment 100, starting from endpoint sensors or things layer 110 (e.g., operating in an IoT network topology) comprising one or more IoT devices 111 (also referred to as edge endpoints 110 or the like); increasing in sophistication to gateways or intermediate node layer 120 comprising one or more user equipment (UEs) 121*a* and 121*b* (also referred to as intermediate nodes 120 or the like), which facilitate the collection and processing of data from endpoints 110; increasing in processing and connectivity sophistication to access or edge node layer 130 comprising a plurality of access nodes (ANs) 131, 132, and 133 (also referred to as edge compute nodes 130 or the like); and increasing in connectivity and processing sophistication to a backend layer 110 comprising core network (CN) 142 and cloud 144. The processing at the backend layer 110 may be enhanced by network services as performed by a remote application server 150 and/or other cloud services.

An end-user device, such as an intermediate node 120 or endpoint 110 has access to multiple communication networks based on different technologies, for example, LTE or NR/5G cellular technology (e.g., as provided by AN 131 and/or ANs 132), WiFi (e.g., as provided by AN 133 and/or ANs 132), DSL, MuLTEfire, etc., for accessing application services. Different technologies exhibit benefits and limitations in different scenarios, and application performance in different scenarios becomes dependent on the choice of the access networks (e.g., WiFi, LTE, etc.) and the used network and transport protocols (e.g., VPN, MPTCP, GRE etc.). For example, WiFi may provide high throughput for intermediate nodes 120 and endpoints 110 when under relatively good coverage, but the throughput degrades significantly as the user moves closer to the edge of WiFi coverage area or when an 133 serves a relatively large user population (e.g., due to contention based WiFi access scheme). In LTE or NR networks, the capacity is often constrained by the limited availability of licensed spectrum, but the quality of the service is predictable even in multi-user scenarios due to the exclusivity of the licensed spectrum and the controlled scheduling provided by a serving base station.

Unlike LTE and NR networks that use licensed spectrum, WiFi is a shared medium that operates in the unlicensed radiofrequency (RF) of 2.4 GHz and 5 GHz ranges. The 3GPP variant of unlicensed access is called LAA. LAA, aims to design LTE and/or NR specifications for global harmonization that allow for fair coexistence with WiFi and other networks in a shared medium. LAA employs a medium access scheme similar to WiFi's EDCA. The coexistence impact on fairness and throughput with respect to LTE and/or NR is also a current challenge for both standards. One issue that may arise when utilizing network technologies that operated in a shared medium is that packets may be lost during transmission due to, for example, temporary interference, packet collisions, congestion, and buffer overflow. In current WiFi-based protocols, MAC protocols support limited retransmissions to recover lost packets. In particular, a WiFi transmitter will give up and drop a packet when a maximum retransmission limit is reached. Additionally, the WiFi-based retransmission method is not applicable when a packet is dropped due to temporary congestion and/or buffer overflow. Similarly, LAA uses a contention window size (CWS) for retransmitting lost packets, where the CWS increases in an exponential manner based on the HARQ-ACK in the MAC layer.

Referring back to FIG. 1, the environment 100 is shown to include a UE 121a and UE 121b (collectively referred to as "UE 121" or "UEs 121"). In this example, the UE 121a is illustrated as a vehicle UE, and UE 121b is illustrated as a smartphone (e.g., handheld touchscreen mobile computing device connectable to one or more cellular networks). However, these UEs 121 may comprise any mobile or non-mobile computing device, such as tablet computers, wearable devices, PDAs, pagers, desktop computers, laptop computers, wireless handsets, unmanned vehicles or drones, IVIs, ICEs, an Instrument Clusters, HUDs, OBDs, DMEs, MDTs, OBUs, EMS, EEMS, ECUs, ECMs, embedded systems, microcontrollers, control modules, networked or "smart" appliances, MTC devices, M2M, IoT devices, and/or any type of computing device including a wireless communications interface.

Environment 100 also includes IoT devices 111, which are uniquely identifiable embedded computing devices (e.g., within the Internet infrastructure) that comprise a network access layer designed for low-power IoT applications utilizing short-lived UE connections. The IoT devices 111 may be any objects, devices, sensors, or "things" that are embedded with hardware and/or software components that enable the objects, devices, sensors, or "things" capable of capturing and/or recording data associated with an event, and capable of communicating such data with one or more other devices over a network with little or no user intervention. For instance, in various embodiments, IoT devices 111 may be abiotic devices such as autonomous sensors, gauges, meters, image capture devices, microphones, light emitting devices, audio emitting devices, audio and/or video playback devices, electro-mechanical devices (e.g., switch, actuator, etc.), and the like. The IoT devices 111 can utilize technologies such as M2M or MTC for exchanging data with an MTC server (e.g., a server 150), a MEC server 136 and/or MEC system, or device via a PLMN, ProSe or D2D communication, sensor networks, or IoT networks. The M2M or MTC exchange of data may be a machine-initiated exchange of data.

The IoT devices 111 may execute background applications (e.g., keep-alive messages, status updates, etc.) to facilitate the connections of the IoT network. Where the IoT devices 111 are, or are embedded in, sensor devices, the IoT network may be a WSN. An IoT network describes an interconnecting IoT UEs, such as the IoT devices 111 being connected to one another over respective direct links 105. The IoT devices may include any number of different types of devices, grouped in various combinations (referred to as an "IoT group") that may include IoT devices that provide one or more services for a particular user, customer, organizations, etc. A service provider (e.g., an owner/operator of server 150, CN 412, and/or cloud 144) may deploy the IoT devices in the IoT group to a particular area (e.g., a geolocation, building, etc.) in order to provide the one or more services. In some implementations, the IoT network may be a mesh network of IoT devices 111, which may be termed a fog device, fog system, or fog, operating at the edge of the cloud 144. The fog involves mechanisms for bringing cloud computing functionality closer to data generators and consumers wherein various network devices run cloud application logic on their native architecture. Fog computing is a system-level horizontal architecture that distributes resources and services of computing, storage, control, and networking anywhere along the continuum from cloud 144 to Things (e.g., IoT devices 111). The fog may be established in accordance with specifications released by the OFC, the OCF, among others. In some embodiments, the fog may be a tangle as defined by the IOTA foundation.

The fog may be used to perform low-latency computation/aggregation on the data while routing it to an edge cloud computing service (e.g., edge nodes 130) and/or a central cloud computing service (e.g., cloud 144) for performing heavy computations or computationally burdensome tasks. On the other hand, edge cloud computing consolidates human-operated, voluntary resources, as a cloud. These voluntary resource may include, inter-alia, intermediate nodes 120 and/or endpoints 110, desktop PCs, tablets, smartphones, nano data centers, and the like. In various implementations, resources in the edge cloud may be in one to two-hop proximity to the IoT devices 111, which may result in reducing overhead related to processing data and may reduce network delay.

In some embodiments, the fog may be a consolidation of IoT devices 111 and/or networking devices, such as routers and switches, with high computing capabilities and the ability to run cloud application logic on their native architecture. Fog resources may be manufactured, managed, and deployed by cloud vendors, and may be interconnected with high speed, reliable links. Moreover, fog resources reside farther from the edge of the network when compared to edge systems but closer than a central cloud infrastructure. Fog devices are used to effectively handle computationally intensive tasks or workloads offloaded by edge resources.

In embodiments, the fog may operate at the edge of the cloud 144. The fog operating at the edge of the cloud 144 may overlap or be subsumed into an edge network 130 of the cloud 144. The edge network of the cloud 144 may overlap with the fog, or become a part of the fog. Furthermore, the fog may be an edge-fog network that includes an edge layer and a fog layer. The edge layer of the edge-fog network includes a collection of loosely coupled, voluntary and human-operated resources (e.g., the aforementioned edge compute nodes or edge devices). The Fog layer resides on top of the edge layer and is a consolidation of networking devices such as the intermediate nodes 120 and/or endpoints 110 of FIG. 1.

Data may be captured, stored/recorded, and communicated among the IoT devices 4804 (or, for example, among the intermediate nodes 120 and/or endpoints 110 that have direct links 105 with one another as shown by FIG. 1). Analysis of the traffic flow and control schemes may be implemented by aggregators that are in communication with the IoT devices 111 and each other through a mesh network. The aggregators may be a type of IoT device 111 and/or network appliance. In the example of FIG. 1, the aggregators may be edge nodes 130, or one or more designated intermediate nodes 120 and/or endpoints 110. Data may be uploaded to the cloud 144 via the aggregator, and commands can be received from the cloud 144 through gateway devices that are in communication with the IoT devices 111 and the aggregators through the mesh network. Unlike the traditional cloud computing model, in some implementations, the cloud 144 may have little or no computational capabilities and only serves as a repository for archiving data recorded and processed by the fog. In these implementations, the cloud 144 centralized data storage system and provides reliability and access to data by the computing resources in the fog and/or edge devices. Being at the core of the architecture, the Data Store of the cloud 144 is accessible by both Edge and Fog layers of the aforementioned edge-fog network.

The UEs 121 and IoT devices 111 may be configured to connect, for example, communicatively couple, with Radio Access Network (RAN) including one or more of the ANs 131, 132, and/or 133. In embodiments, the RAN may be an NG RAN or a 5G RAN, an E-UTRAN, or a legacy RAN, such as a UTRAN or GERAN. As used herein, the term "NG RAN" may refer to a RAN that operates in an NR or 5G system, and the term "E-UTRAN" or the like may refer to a RAN that operates in an LTE or 4G system. The UEs 121 and IoT devices 111 may utilize respective connections (or channels) 103, respectively, each of which comprises a physical communications interface or layer. In this example, the connections 103 are illustrated as an air interface to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein.

In embodiments, the UEs 121 and IoT devices 111 may further directly exchange communication data via respective direct interfaces (or links) 105. In some implementations the interfaces 105 may be a WiFi based link or a personal area network (PAN) based link (e.g., IEEE 802.15.4 based protocols including ZigBee, IPv6 over Low power Wireless Personal Area Networks (6LoWPAN), WirelessHART, MiWi, Thread, etc.; WiFi-direct; Bluetooth/Bluetooth Low Energy (BLE) protocols). In other implementations, the interface 105 may be an LTE/NR Proximity Services (ProSe) link or PC5 interface.

According to various embodiments, the UEs 121 and IoT devices 111 and the RAN nodes 131/132 communicate data (e.g., transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum may include channels that operate in the frequency range of approximately 100 MHz to approximately 3.8 GHz, whereas the unlicensed spectrum may include the 5 GHz band. To operate in the unlicensed spectrum, the UEs 121 and IoT devices 111 and the RAN nodes 131/132 may operate using LAA, enhanced LAA (eLAA), and/or further eLAA (feLAA) mechanisms. In these implementations, the UEs 121 and IoT devices 111 and the RAN nodes 131/132 may perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations may be performed according to a listen-before-talk (LBT) protocol. LBT is a mechanism whereby equipment (e.g., UEs 121 and IoT devices 111, RAN nodes 131/132, etc.) senses a medium (for example, a channel or carrier frequency) and transmits when the medium is sensed to be idle (or when a specific channel in the medium is sensed to be unoccupied). The medium sensing operation may include CCA, which utilizes at least ED to determine the presence or absence of other signals on a channel in order to determine if a channel is occupied or clear. This LBT mechanism allows cellular/LAA networks to coexist with incumbent systems in the unlicensed spectrum and with other LAA networks. ED may include sensing RF energy across an intended transmission band for a period of time and comparing the sensed RF energy to a predefined or configured threshold.

The UE 121b is shown to be configured to access an access point (AP) 133 via a connection 107. The connection 107 can comprise a local wireless connection, such as a connection consistent with any IEEE 802.11 protocol, wherein the AP 133 would comprise a wireless fidelity (WiFi®) router. In this example, the AP 133 is shown to be connected to the Internet without connecting to the CN 142 of the wireless system. In various embodiments, the UE 121b, RAN nodes 131/132, and AP 106 may be configured to utilize LWA operation and/or LWIP operation. The LWA operation may involve the UE 121b being configured by a RAN node 131/132 to utilize radio resources of LTE/NR and WLAN. LWIP operation may involve the UE 121b using WLAN radio resources (e.g., connection 107) via IPsec protocol tunneling to authenticate and encrypt packets (e.g., IP packets) sent over the connection 107. IPsec tunneling includes encapsulating the entirety of original IP packets and adding a new packet header, thereby protecting the original header of the IP packets.

The RAN can include one or more AN nodes or RAN nodes 131 and 132 (collectively referred to as "RAN nodes" or "RAN node") that enable the connections 103. As used herein, the terms "access node," "access point," or the like may describe equipment that provides the radio baseband functions for data and/or voice connectivity between a network and one or more users.

In this example, the RAN node 131 is embodied as a NodeB, evolved NodeB (eNB), or a next generation NodeB (gNB), and the RAN nodes 132 are embodied as Road Side Unites (RSUs). Any other type of ANs can be used, and the ANs may comprise ground stations (e.g., terrestrial access points) or satellite stations providing coverage within a geographic area (e.g., a cell). As used herein, the term "NG RAN node" or the like may refer to a RAN node 111 that operates in an NR or 5G system (for example, a gNB), and the term "E-UTRAN node" or the like may refer to a RAN node 131 that operates in an LTE or 4G system (e.g., an eNB). According to various embodiments, the RAN nodes 131 may be implemented as one or more of a dedicated physical device such as a macrocell base station, and/or a low power base station for providing femtocells, picocells or other like cells having smaller coverage areas, smaller user capacity, or higher bandwidth compared to macrocells.

In some embodiments, all or parts of the RAN nodes 131/132 may be implemented as one or more software entities running on server computers as part of a virtual network, which may be referred to as a cloud RAN (CRAN), Cognitive Radio (CR), and/or a virtual baseband unit pool (vBBUP). In these embodiments, the CRAN, CR, or vBBUP may implement a RAN function split, such as a PDCP split wherein RRC and PDCP layers are operated by the CRAN/vBBUP and other L2 protocol entities are operated by individual RAN nodes 131/132; a MAC/PHY split wherein RRC, PDCP, RLC, and MAC layers are operated by the CRAN/vBBUP and the PHY layer is operated by individual RAN nodes 131/132; or a "lower PHY" split wherein RRC, PDCP, RLC, MAC layers and upper portions of the PHY layer are operated by the CRAN/vBBUP and lower portions of the PHY layer are operated by individual RAN nodes 131/132. This virtualized framework allows the freed-up processor cores of the RAN nodes 131/132 to perform other virtualized applications. In some implementations, an individual RAN node 131/132 may represent individual gNB-DUs that are connected to a gNB-CU via individual interfaces (not shown by FIG. 1). In these implementations, the gNB-DUs include one or more remote radio heads or RFEMs (see, e.g., FIG. 6—XS2 infra), and the gNB-CU may be operated by a server that is located in the RAN (not shown) or by a server pool in a similar manner as the CRAN/vBBUP. Additionally or alternatively, one or more of the RAN nodes 131/132 may be next generation eNBs (ng-eNBs), which are RAN nodes 131/132 that provide E-UTRA user plane and control plane protocol terminations toward the UEs 121, and are connected to a 5GC via an NG interface.

Any of the RAN nodes 131/132 can terminate the air interface protocol and can be the first point of contact for the UEs 121 and IoT devices 111. In some embodiments, any of the RAN nodes 131/132 can fulfill various logical functions for the RAN including, but not limited to, radio network controller (RNC) functions such as radio bearer management, uplink and downlink dynamic radio resource management and data packet scheduling, and mobility management. In embodiments, the UEs 121 and IoT devices 111 can be configured to communicate using OFDM communication signals with each other or with any of the RAN nodes 131/132 over a multicarrier communication channel in accordance with various communication techniques, such as, but not limited to, an OFDMA communication technique (e.g., for downlink communications) and/or an SC-FDMA communication technique (e.g., for uplink and ProSe or sidelink communications), although the scope of the embodiments is not limited in this respect.

The RAN nodes 131/132 may be configured to communicate with one another via respective interfaces or links (not shown), such as an X2 interface for LTE implementations (e.g., when CN 142 is an Evolved Packet Core (EPC)), an Xn interface for 5G or NR implementations (e.g., when CN 142 is an Fifth Generation Core (5GC)), or the like.

The ANs 131 and 132 are communicatively coupled to CN 142. In embodiments, the CN 142 may be an evolved packet core (EPC) network, a NextGen Packet Core (NPC) network, a 5G core (5GC), or some other type of CN. The CN 142 may comprise a plurality of network elements, which are configured to offer various data and telecommunications services to customers/subscribers (e.g., users of UEs 121 and IoT devices 111) who are connected to the CN 142 via a RAN. The components of the CN 142 may be implemented in one physical node or separate physical nodes including components to read and execute instructions from a machine-readable or computer-readable medium (e.g., a non-transitory machine-readable storage medium). In some embodiments, Network Functions Virtualization (NFV) may be utilized to virtualize any or all of the above-described network node functions via executable instructions stored in one or more computer-readable storage mediums (described in further detail infra). A logical instantiation of the CN 142 may be referred to as a network slice, and a logical instantiation of a portion of the CN 142 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more CN 142 components/functions.

The CN 142 is shown to be communicatively coupled to an application server 150 and a network 150 via an IP communications interface 155. the one or more server(s) 150 comprise one or more physical and/or virtualized systems for providing functionality (or services) to one or more clients (e.g., UEs 121 and IoT devices 111) over a network (e.g., cloud 144). The server(s) 150 may include various computer devices with rack computing architecture component(s), tower computing architecture component(s), blade computing architecture component(s), and/or the like. The server(s) 150 may represent a cluster of servers, a server farm, a cloud computing service, or other grouping or pool of servers, which may be located in one or more datacenters. The server(s) 130 may also be connected to, or otherwise associated with one or more data storage devices (not shown). Moreover, the server(s) 150 may include an operating system (OS) that provides executable program instructions for the general administration and operation of the individual server computer devices, and may include a computer-readable medium storing instructions that, when executed by a processor of the servers, may allow the servers to perform their intended functions. Suitable implementations for the OS and general functionality of servers are known or commercially available, and are readily implemented by persons having ordinary skill in the art. Generally, the server(s) 150 offer applications or services that use IP/network resources. As examples, the server(s) 150 may provide traffic management services, cloud analytics, content streaming services, immersive gaming experiences, social networking and/or microblogging services, and/or other like services. In addition, the various services provided by the server(s) 150 may include initiating and controlling software and/or firmware updates for applications or individual components implemented by the UEs 121 and IoT devices 111. The server(s) 150 can also be configured to support one or more communication services (e.g., Voice-over-Internet Protocol (VoIP) sessions, PTT sessions, group communication sessions, social networking services, etc.) for the UEs 121 and IoT devices 111 via the CN 142.

The cloud 144 may represent a cloud computing service, the Internet, a local area network (LAN) or a wide area network (WAN) including proprietary and/or enterprise networks for a company or organization, or combinations thereof. The cloud 144 may be a network that comprises computers, network connections among the computers, and software routines to enable communication between the computers over network connections. In this regard, the cloud 144 comprises one or more network elements that may include one or more processors, communications systems (e.g., including network interface controllers, one or more transmitters/receivers connected to one or more antennas, etc.), and computer readable media. Examples of such network elements may include wireless access points (WAPs), home/business servers (with or without RF communications circuitry), routers, switches, hubs, radio beacons, base stations, picocell or small cell base stations, backbone gateways, and/or any other like network device. Connection to the cloud 144 may be via a wired or a wireless connection using the various communication protocols discussed infra. More than one network may be involved in a communication session between the illustrated devices. Connection to the cloud 144 may require that the computers execute software routines which enable, for example, the seven layers of the OSI model of computer networking or equivalent in a wireless (cellular) phone network. Cloud 144 may be used to enable relatively long-range communication such as, for example, between the one or more server(s) 150 and one or more UEs 121 and IoT devices 111. In some embodiments, the cloud 144 may represent the Internet, one or more cellular networks, local area networks, or wide area networks including proprietary and/or enterprise networks, Transfer Control Protocol (TCP)/Internet Protocol (IP)-based network, or combinations thereof. In such embodiments, the cloud 144 may be associated with network operator who owns or controls equipment and other elements necessary to provide network-related services, such as one or more base stations or access points, one or more servers for routing digital data or telephone calls (e.g., a core network or backbone network), etc. The backbone links 155 may include any number of wired or wireless technologies, and may be part of a local area network (LAN), a wide area network (WAN), or the Internet. In one example, the backbone links 155 are fiber backbone links that couple lower levels of service providers to the Internet, such as the CN 412 and cloud 144.

In some embodiments, at least some of the edge nodes 120 may include or be part of a MEC system 135. The MEC system 135 includes a collection of MEC servers 136 (including MEC server 136a and MEC server 136b in FIG. 1) and MEC management systems (not shown by FIG. 1) necessary to run MEC applications (e.g., MEC Apps 436 of FIG. 4) within an operator network or a subset of an operator network. The MEC servers 136a, 136b, 136c (collectively referred to as "MEC servers 136" or "MEC server 136") are physical computer systems (e.g., server compute nodes) that include a MEC platform (e.g., MEC platform 437 of FIG. 4) and a virtualization infrastructure (e.g., VI 438 of FIG. 4), and provide compute, storage, and network resources to MEC applications. Each of the MEC servers 136 are disposed at an edge of a corresponding communication network (or access network), and are arranged to provide computing resources and/or various services (e.g., computational task and/or workload offloading, cloud-computing capabilities, information technology (IT) services, and other like resources and/or services as discussed herein) in relatively close proximity to intermediate nodes 120 and/or endpoints 110. The MEC servers 136 may also be referred to as "MEC hosts 136" or "edge servers." The VI of the MEC servers 136 provide virtualized environments and virtualized resources (e.g., "virtualized infrastructure") for the MEC hosts 136, and the MEC applications may run as virtual machines (VMs) and/or application containers on top of the VI. The components and/or entities of the MEC system 135 are discussed in more detail infra with respect to FIGS. 4-11.

As shown by FIG. 1, each of the (R)AN nodes 131/132 and AP 133 are co-located with MEC servers 136a, 136b, and 136c, respectively. These implementations may be small-cell clouds (SCCs) where a MEC server 136 is co-located with a small cell (e.g., pico-cell, femto-cell, etc.), or may be mobile micro clouds (MCCs) where a MEC server 136 is co-located with a macro-cell (e.g., an eNB, gNB, etc.). The MEC servers 136 may be deployed in a multitude of arrangements other than as shown by FIG. 1. In a first example, the MEC servers 136 may be co-located or operated by RNCs, which may be the case for legacy network deployments, such as 3G networks. In a second example, the MEC servers 136 may be deployed at cell aggregation sites or at multi-RAT aggregation points that can be located either within an enterprise or used in public coverage areas. In a third example, the MEC servers 136 may be deployed at the edge of CN 142. These implementations may be used in follow-me clouds (FMC), where cloud services running at distributed data centers follow the UEs 121 as they roam throughout the network.

According to various embodiments, task offloading may be "opportunistic", wherein the MEC system 135 (or a particular MEC server 136 selected as a master node in the example of FIG. 1) may offload application tasks to one or more UEs 121 taking into account the computational complexity of the tasks and/or the amount of computational and network/signaling resources available at the UEs 121/111 (or MEC servers 836). For example, a MEC server 136 may offload a certain number and/or type of tasks based on the quality or strength of links 103, 105, and/or 107, the strength or quality of the computational resources available at the UEs 121, an amount of available memory or a current memory utilization of the UEs 121, and/or based on other operational parameters of (or experienced by) the UEs 121. In some embodiments, the MEC system 135 (or a particular MEC server 136 selected as a master node) may select one or more MEC servers 136 to which a UE 121/111 may offload application tasks or workloads. In some embodiments, a device application or client application operating in a UE 121/111 may offload application tasks to one or more MEC servers 136. For some identified tasks, the MEC system 135 (or device/client application at the UE 121/111) may evaluate the offloading opportunity (e.g., the "tradeoff") with respect to available UEs 121/111 (or MEC server(s) 136), in which case the MEC system 135 may offload tasks to certain UEs 121/111 (or MEC server(s) 136) that are capable of providing output data from performing their respective tasks back to the MEC server 136 (or UE 121/111) in a desired period of time. Based on the operational parameters discussed previously, offloading tradeoffs may be evaluated and optimal or best offloading opportunities may be determined based on the tradeoffs.

Figure 2:
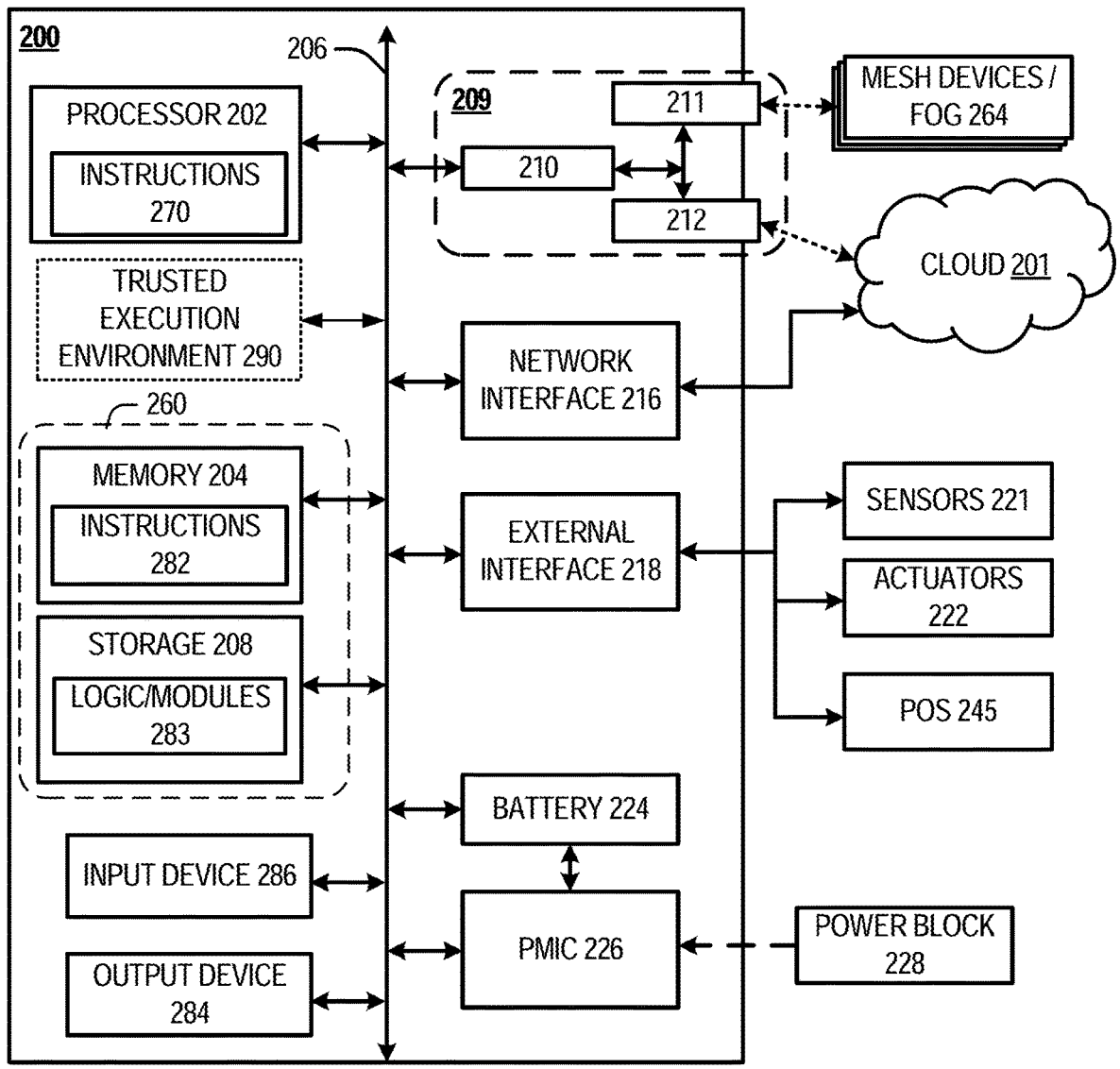
FIG. 2 depicts example components of a computer platform in accordance with various embodiments.

FIG. 2 illustrates an example of an platform 200 (also referred to as "system 200," "device 200," "appliance 200," or the like) in accordance with various embodiments. In embodiments, the platform 200 may be suitable for use as intermediate nodes 120 and/or endpoints 110 of FIG. 1, and/or any other element/device discussed herein with regard any other figure shown and described herein. Platform 200 may also be implemented in or as a server computer system or some other element, device, or system discussed herein. The platform 200 may include any combinations of the components shown in the example. The components of platform 200 may be implemented as integrated circuits (ICs), portions thereof, discrete electronic devices, or other modules, logic, hardware, software, firmware, or a combination thereof adapted in the computer platform 200, or as components otherwise incorporated within a chassis of a larger system. The example of FIG. 2 is intended to show a high level view of components of the computer platform 200. However, some of the components shown may be omitted, additional components may be present, and different arrangement of the components shown may occur in other implementations.

The platform 200 includes processor circuitry 202. The processor circuitry 202 includes circuitry such as, but not limited to one or more processor cores and one or more of cache memory, low drop-out voltage regulators (LDOs), interrupt controllers, serial interfaces such as serial peripheral interface (SPI), inter-integrated circuit (I$^2$C) or universal programmable serial interface circuit, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports. In some implementations, the processor circuitry 202 may include one or more hardware accelerators, which may be microprocessors, programmable processing devices (e.g., FPGA, ASIC, etc.), or the like. The one or more hardware accelerators may include, for example, computer vision, machine learning, and/or deep learning accelerators. In some implementations, the processor circuitry 202 may include on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of processor circuitry 202 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more baseband processors, one or more radio-frequency integrated circuits (RFIC), one or more microprocessors or controllers, or any suitable combination thereof. The processors (or cores) of the processor circuitry 202 may be coupled with or may include memory/storage and may be configured to execute instructions stored in the memory/storage to enable various applications or operating systems to run on the platform 200. In these embodiments, the processors (or cores) of the processor circuitry 202 is configured to operate application software to provide a specific service to a user of the platform 200. In some embodiments, the processor circuitry 202 may be a special-purpose processor/controller to operate according to the various embodiments herein.

As examples, the processor circuitry 202 may include an Intel® Architecture Core™ based processor, such as a Quark™, an Atom™, an i3, an i5, an i7, or an MCU-class processor, Pentium® processor(s), Xeon® processor(s), or another such processor available from Intel® Corporation, Santa Clara, Calif. However, any number other processors may be used, such as one or more of Advanced Micro Devices (AMD) Zen® Core Architecture, such as Ryzen® or EPYC® processor(s), Accelerated Processing Units (APUs), MxGPUs, Epyc® processor(s), or the like; A5-A12 and/or S1-S4 processor(s) from Apple® Inc., Snapdragon™ or Centrig™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; the ThunderX2® provided by Cavium™, Inc.; or the like. In some implementations, the processor circuitry 202 may be a part of a system on a chip (SoC), System-in-Package (SiP), a multi-chip package (MCP), and/or the like, in which the processor circuitry 202 and other components are formed into a single integrated circuit, or a single package, such as the Edison™ or Galileo™ SoC boards from Intel® Corporation. Other examples of the processor circuitry 202 are mentioned elsewhere in the present disclosure.

Additionally or alternatively, processor circuitry 202 may include circuitry such as, but not limited to, one or more FPDs such as FPGAs and the like; PLDs such as CPLDs, HCPLDs, and the like; ASICs such as structured ASICs and the like; PSoCs; and the like. In such embodiments, the circuitry of processor circuitry 202 may comprise logic blocks or logic fabric including and other interconnected resources that may be programmed to perform various functions, such as the procedures, methods, functions, etc. of the various embodiments discussed herein. In such embodiments, the circuitry of processor circuitry 202 may include memory cells (e.g., EPROM, EEPROM, flash memory, static memory (e.g., SRAM, anti-fuses, etc.) used to store logic blocks, logic fabric, data, etc. in LUTs and the like.

The processor circuitry 202 may communicate with system memory circuitry 204 over an interconnect 206 (e.g., a bus). Any number of memory devices may be used to provide for a given amount of system memory. As examples, the memory circuitry 204 may be random access memory (RAM) in accordance with a Joint Electron Devices Engineering Council (JEDEC) design such as the DDR or mobile DDR standards (e.g., LPDDR, LPDDR2, LPDDR3, or LPDDR4), dynamic RAM (DRAM), and/or synchronous DRAM (SDRAM)). The memory circuitry 204 may also include nonvolatile memory (NVM) such as high-speed electrically erasable memory (commonly referred to as "flash memory"), phase change RAM (PRAM), resistive memory such as magnetoresistive random access memory (MRAM), etc., and may incorporate three-dimensional (3D) cross-point (XPOINT) memories from Intel® and Micron®. The memory circuitry 204 may also comprise persistent storage devices, which may be temporal and/or persistent storage of any type, including, but not limited to, non-volatile memory, optical, magnetic, and/or solid state mass storage, and so forth.

The individual memory devices of memory circuitry 204 may be implemented as one or more of solder down packaged integrated circuits, socketed memory modules, and plug-in memory cards. The memory circuitry 204 may be implemented as any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs. Memory circuitry 204. In embodiments, the memory circuitry 204 may be disposed in or on a same die or package as the processor circuitry 202 (e.g., a same SoC, a same SiP, or soldered on a same MCP as the processor circuitry 202).

To provide for persistent storage of information such as data, applications, operating systems (OS), and so forth, a storage circuitry 208 may also couple to the processor circuitry 202 via the interconnect 206. In an example, the storage circuitry 208 may be implemented via a solid-state disk drive (SSDD). Other devices that may be used for the storage circuitry 208 include flash memory cards, such as SD cards, microSD cards, xD picture cards, and the like, and USB flash drives. In low power implementations, the storage circuitry 208 may be on-die memory or registers associated with the processor circuitry 202. However, in some examples, the storage circuitry 208 may be implemented using a micro hard disk drive (HDD). Further, any number of new technologies may be used for the storage circuitry 208 in addition to, or instead of, the technologies described, such resistance change memories, phase change memories, holographic memories, or chemical memories, among others.

The storage circuitry 208 stores computational logic 283 (or "modules 283") in the form of software, firmware, or hardware commands to implement the techniques described herein. The computational logic 283 may be employed to store working copies and/or permanent copies of computer programs, or data to create the computer programs, for the operation of various components of platform 200 (e.g., drivers, etc.), an operating system of platform 200, one or more applications, and/or for carrying out the embodiments discussed herein. The computational logic 283 may be stored or loaded into memory circuitry 204 as instructions 282, or data to create the instructions 282, for execution by the processor circuitry 202 to provide the functions described herein. The various elements may be implemented by assembler instructions supported by processor circuitry 202 or high-level languages that may be compiled into such instructions (e.g., instructions 270, or data to create the instructions 270). The permanent copy of the programming instructions may be placed into persistent storage devices of storage circuitry 208 in the factory or in the field through, for example, a distribution medium (not shown), through a communication interface (e.g., from a distribution server (not shown)), or over-the-air (OTA).

The instructions 282 and/or modules 283 (also referred to as "program code" or "programming instructions") provided via the memory circuitry 204 and/or the storage circuitry 208 of FIG. 2 are embodied as one or more non-transitory computer readable storage media (NTCRSM) 260 including program code, a computer program product or data to create the computer program, with the computer program or data, to direct the processor circuitry 202 of platform 200 to perform electronic operations in the platform 200, and/or to perform a specific sequence or flow of actions, for example, as described with respect to the flowchart(s) and block diagram(s) of operations and functionality depicted by FIGS. 1 and 4-13.

In some embodiments, the programming instructions (or data to create the programming instructions) to be executed may be in a pre-configured form that may require configuration instructions to install or provision the programming instructions to an apparatus (such as any of the devices/components/systems described herein). When installed/provisioned, configured and executed, the programming instructions can complete or perform various programming operations associated with operating system functions, one or more applications, and/or aspects of the present disclosure (including various programming operations associated with FIGS. 1 and 4-13.

In alternate embodiments, programming instructions (or data to create the instructions) may be disposed on multiple NTCRSM 260. In alternate embodiments, programming instructions (or data to create the instructions) may be disposed on computer-readable transitory storage media, such as, signals. The instructions embodied by a machine-readable medium may further be transmitted or received over a communications network using a transmission medium via a network interface device utilizing any one of a number of transfer protocols (e.g., HTTP). Any combination of one or more computer usable or computer readable medium(s) may be utilized. The computer-usable or computer-readable medium may be, for example but not limited to, one or more electronic, magnetic, optical, electromagnetic, infrared, or semiconductor systems, apparatuses, devices, or propagation media. For instance, the NTCRSM 260 may be embodied by devices described for the storage circuitry 208 and/or memory circuitry 204. More specific examples (a non-exhaustive list) of a computer-readable medium would include the following: an electrical connection having one or more wires, a portable computer diskette, a hard disk, a random access memory (RAM), a read-only memory (ROM), an erasable programmable read-only memory (EPROM, Flash memory, etc.), an optical fiber, a portable compact disc read-only memory (CD-ROM), an optical storage device and/or optical disks, a transmission media such as those supporting the Internet or an intranet, a magnetic storage device, or any number of other hardware devices. Note that the computer-usable or computer-readable medium could even be paper or another suitable medium upon which the program (or data to create the program) is printed, as the program (or data to create the program) can be electronically captured, via, for instance, optical scanning of the paper or other medium, then compiled, interpreted, or otherwise processed in a suitable manner, if necessary, and then stored in a computer memory (with or without having been staged in or more intermediate storage media). In the context of this document, a computer-usable or computer-readable medium may be any medium that can contain, store, communicate, propagate, or transport the program (or data to create the program) for use by or in connection with the instruction execution system, apparatus, or device. The computer-usable medium may include a propagated data signal with the computer-usable program code (or data to create the program code) embodied therewith, either in baseband or as part of a carrier wave. The computer usable program code (or data to create the program) may be transmitted using any appropriate medium, including but not limited to wireless, wireline, optical fiber cable, RF, etc.

In various embodiments, the program code (or data to create the program code) described herein may be stored in one or more of a compressed format, an encrypted format, a fragmented format, a packaged format, etc. Program code (or data to create the program code) as described herein may require one or more of installation, modification, adaptation, updating, combining, supplementing, configuring, decryption, decompression, unpacking, distribution, reassignment, etc. in order to make them directly readable and/or executable by a computing device and/or other machine. For example, the program code (or data to create the program code) may be stored in multiple parts, which are individually compressed, encrypted, and stored on separate computing devices, wherein the parts when decrypted, decompressed, and combined form a set of executable instructions that implement the program code (the data to create the program code such as that described herein. In another example, the Program code (or data to create the program code) may be stored in a state in which they may be read by a computer, but require addition of a library (e.g., a dynamic link library), a software development kit (SDK), an application programming interface (API), etc. in order to execute the instructions on a particular computing device or other device. In another example, the program code (or data to create the program code) may need to be configured (e.g., settings stored, data input, network addresses recorded, etc.) before the program code (or data to create the program code) can be executed/used in whole or in part. In this example, the program code (or data to create the program code) may be unpacked, configured for proper execution, and stored in a first location with the configuration instructions located in a second location distinct from the first location. The configuration instructions can be initiated by an action, trigger, or instruction that is not co-located in storage or execution location with the instructions enabling the disclosed techniques. Accordingly, the disclosed program code (or data to create the program code) are intended to encompass such machine readable instructions and/or program(s) (or data to create such machine readable instruction and/or programs) regardless of the particular format or state of the machine readable instructions and/or program(s) when stored or otherwise at rest or in transit.

Computer program code for carrying out operations of the present disclosure (e.g., computational logic 283, instructions 282, 270 discussed previously) may be written in any combination of one or more programming languages, including an object oriented programming language such as Python, Ruby, Scala, Smalltalk, Java™, C++, C#, or the like; a procedural programming languages, such as the "C" programming language, the Go (or "Golang") programming language, or the like; a scripting language such as JavaScript, Server-Side JavaScript (SSJS), JQuery, PHP, Pearl, Python, Ruby on Rails, Accelerated Mobile Pages Script (AMPscript), Mustache Template Language, Handlebars Template Language, Guide Template Language (GTL), PHP, Java and/or Java Server Pages (JSP), Nodejs, ASP.NET, and/or the like; a markup language such as Hypertext Markup Language (HTML), Extensible Markup Language (XML), Java Script Object Notion (JSON), Apex®, Cascading Stylesheets (CSS), JavaServer Pages (JSP), MessagePack™, Apache® Thrift, Abstract Syntax Notation One (ASN.1), Google® Protocol Buffers (protobuf), or the like; some other suitable programming languages including proprietary programming languages and/or development tools, or any other languages tools. The computer program code for carrying out operations of the present disclosure may also be written in any combination of the programming languages discussed herein. The program code may execute entirely on the system 200, partly on the system 200, as a stand-alone software package, partly on the system 200 and partly on a remote computer or entirely on the remote computer or server. In the latter scenario, the remote computer may be connected to the system 200 through any type of network, including a LAN or WAN, or the connection may be made to an external computer (e.g., through the Internet using an Internet Service Provider).

In an example, the instructions 270 on the processor circuitry 202 (separately, or in combination with the instructions 282 and/or logic/modules 283 stored in computer-readable storage media) may configure execution or operation of a trusted execution environment (TEE) 290. The TEE 290 operates as a protected area accessible to the processor circuitry 202 to enable secure access to data and secure execution of instructions. In some embodiments, the TEE 290 may be a physical hardware device that is separate from other components of the system 200 such as a secure-embedded controller, a dedicated SoC, or a tamper-resistant chipset or microcontroller with embedded processing devices and memory devices. In other embodiments, the TEE 290 may be implemented as secure enclaves, which are isolated regions of code and/or data within the memory of the system 200. Only code executed within a secure enclave may access data within the same secure enclave, and the secure enclave may only be accessible using the secure application (which may be implemented by an application processor or a tamper-resistant microcontroller). Various implementations of the TEE 290, and an accompanying secure area in the processor circuitry 202 or the memory circuitry 204 and/or storage circuitry 208 may be provided, for instance, through use of Intel® Software Guard Extensions (SGX) or ARM® TrustZone® hardware security extensions; a Desktop and mobile Architecture Hardware (DASH) compliant Network Interface Card (NIC), Intel® Management/Manageability Engine, Intel® Converged Security Engine (CSE) or a Converged Security Management/Manageability Engine (CSME), Trusted Execution Engine (TXE) provided by Intel® each of which may operate in conjunction with Intel® Active Management Technology (AMT) and/or Intel® vPro™ Technology; AMD® Platform Security coProcessor (PSP), AMD® PRO A-Series Accelerated Processing Unit (APU) with DASH manageability, the IBM® Crypto Express3®, IBM® 4807, 4808, 4809, and/or 4765 Cryptographic Coprocessors, IBM® Baseboard Management Controller (BMC) with Intelligent Platform Management Interface (IPMI), Dell™ Remote Assistant Card II (DRAC II), integrated Dell™ Remote Assistant Card (iDRAC), and the like. Other aspects of security hardening, hardware roots-of-trust, and trusted or protected operations may be implemented in the device 200 through the TEE 290 and the processor circuitry 202.

Although the instructions 282 are shown as code blocks included in the memory circuitry 204 and the computational logic 283 is shown as code blocks in the storage circuitry 208, it should be understood that any of the code blocks may be replaced with hardwired circuits, for example, built into an FPGA, ASIC, or some other suitable circuitry. For example, where processor circuitry 202 includes (e.g., FPGA based) hardware accelerators as well as processor cores, the hardware accelerators (e.g., the FPGA cells) may be pre-configured (e.g., with appropriate bit streams) with the aforementioned computational logic to perform some or all of the functions discussed previously (in lieu of employment of programming instructions to be executed by the processor core(s)).

The memory circuitry 204 and/or storage circuitry 208 may store program code of an operating system (OS), which may be a general purpose OS or an OS specifically written for and tailored to the computing platform 200. For example, the OS may be Unix or a Unix-like OS such as Linux e.g., provided by Red Hat Enterprise, Windows 10™ provided by Microsoft Corp.®, macOS provided by Apple Inc.®, or the like. In another example, the OS may be a mobile OS, such as Android® provided by Google Inc.®, iOS® provided by Apple Inc.®, Windows 10 Mobile® provided by Microsoft Corp.®, KaiOS provided by KaiOS Technologies Inc., or the like. In another example, the OS may be a real-time OS (RTOS), such as Apache Mynewt provided by the Apache Software Foundation®, Windows 10 For IoT® provided by Microsoft Corp.®, Micro-Controller Operating Systems ("MicroC/OS" or "µC/OS") provided by Micrium®, Inc., FreeRTOS, VxWorks® provided by Wind River Systems, Inc.®, PikeOS provided by Sysgo AG®, Android Things® provided by Google Inc.®, QNX® RTOS provided by BlackBerry Ltd., or any other suitable RTOS, such as those discussed herein.

The OS may include one or more drivers that operate to control particular devices that are embedded in the platform 200, attached to the platform 200, or otherwise communicatively coupled with the platform 200. The drivers may include individual drivers allowing other components of the platform 200 to interact or control various IO devices that may be present within, or connected to, the platform 200. For example, the drivers may include a display driver to control and allow access to a display device, a touchscreen driver to control and allow access to a touchscreen interface of the platform 200, sensor drivers to obtain sensor readings of sensor circuitry 221 and control and allow access to sensor circuitry 221, actuator drivers to obtain actuator positions of the actuators 222 and/or control and allow access to the actuators 222, a camera driver to control and allow access to an embedded image capture device, audio drivers to control and allow access to one or more audio devices. The OSs may also include one or more libraries, drivers, APIs, firmware, middleware, software glue, etc., which provide program code and/or software components for one or more applications to obtain and use the data from TEE 290.

The components may communicate over the interconnect 206. The interconnect 206 may include any number of technologies, including industry standard architecture (ISA), extended ISA (EISA), peripheral component interconnect (PCI), peripheral component interconnect extended (PCIx), PCI express (PCIe), or any number of other technologies. The interconnect 206 may be a proprietary bus, for example, used in a SoC based system. Other bus systems may be included, such as an I²C interface, an SPI interface, point-to-point interfaces, and a power bus, among others.

The interconnect 206 couples the processor circuitry 202 to the communication circuitry 209 for communications with other devices. The communication circuitry 209 is a hardware element, or collection of hardware elements, used to communicate over one or more networks (e.g., cloud 201) and/or with other devices (e.g., mesh devices/fog 264). The communication circuitry 209 includes baseband circuitry 210 (or "modem 210") and radiofrequency (RF) circuitry 211 and 212.

The baseband circuitry 210 includes one or more processing devices (e.g., baseband processors) to carry out various protocol and radio control functions. Baseband circuitry 210 may interface with application circuitry of platform 200 (e.g., a combination of processor circuitry 202, memory circuitry 204, and/or storage circuitry 208) for generation and processing of baseband signals and for controlling operations of the RF circuitry 211 or 212. The baseband circuitry 210 may handle various radio control functions that enable communication with one or more radio networks via the RF circuitry 211 or 212. The baseband circuitry 210 may include circuitry such as, but not limited to, one or more single-core or multi-core processors (e.g., one or more baseband processors) or control logic to process baseband signals received from a receive signal path of the RF circuitry 211 and/or 212, and to generate baseband signals to be provided to the RF circuitry 211 or 212 via a transmit signal path. In various embodiments, the baseband circuitry 210 may implement a real-time OS (RTOS) to manage resources of the baseband circuitry 210, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

Although not shown by FIG. 2, in one embodiment, the baseband circuitry 210 includes individual processing device(s) to operate one or more wireless communication protocols (e.g., a "multi-protocol baseband processor" or "protocol processing circuitry") and individual processing device(s) to implement PHY functions. In this embodiment, the protocol processing circuitry operates or implements various protocol layers/entities of one or more wireless communication protocols. In a first example, the protocol processing circuitry may operate LTE protocol entities and/or 5G/NR protocol entities when the communication circuitry 209 is a cellular radiofrequency communication system, such as millimeter wave (mmWave) communication circuitry or some other suitable cellular communication circuitry. In the first example, the protocol processing circuitry 202 would operate MAC, RLC, PDCP, SDAP, RRC, and NAS functions. In a second example, the protocol processing circuitry may operate one or more IEEE-based protocols when the communication circuitry 209 is WiFi communication system. In the second example, the protocol processing circuitry would operate WiFi MAC and LLC) functions. The protocol processing circuitry may include one or more memory structures (not shown) to store program code and data for operating the protocol functions, as well as one or more processing cores (not shown) to execute the program code and perform various operations using the data. The protocol processing circuitry provides control functions for the baseband circuitry 210 and/or RF circuitry 211 and 212. The baseband circuitry 210 may also support radio communications for more than one wireless protocol.

Continuing with the aforementioned embodiment, the baseband circuitry 210 includes individual processing device(s) to implement PHY including HARQ functions, scrambling and/or descrambling, (en)coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions. etc. The modulation/demodulation functionality may include Fast-Fourier Transform (FFT), pre-coding, or constellation mapping/demapping functionality. The (en)coding/decoding functionality may include convolution, tail-biting convolution, turbo, Viterbi, or Low Density Parity Check (LDPC) coding. Embodiments of modulation/demodulation and encoder/decoder functionality are not limited to these examples and may include other suitable functionality in other embodiments.

The communication circuitry 209 also includes RF circuitry 211 and 212 to enable communication with wireless networks using modulated electromagnetic radiation through a non-solid medium. Each of the RF circuitry 211 and 212 include a receive signal path, which may include circuitry to convert analog RF signals (e.g., an existing or received modulated waveform) into digital baseband signals to be provided to the baseband circuitry 210. Each of the RF circuitry 211 and 212 also include a transmit signal path, which may include circuitry configured to convert digital baseband signals provided by the baseband circuitry 210 to be converted into analog RF signals (e.g., modulated waveform) that will be amplified and transmitted via an antenna array including one or more antenna elements (not shown). The antenna array may be a plurality of microstrip antennas or printed antennas that are fabricated on the surface of one or more printed circuit boards. The antenna array may be formed in as a patch of metal foil (e.g., a patch antenna) in a variety of shapes, and may be coupled with the RF circuitry 211 or 212 using metal transmission lines or the like.

The RF circuitry 211 (also referred to as a "mesh transceiver") is used for communications with other mesh or fog devices 264. The mesh transceiver 211 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of RF circuitry 211, configured for a particular wireless communication protocol, may be used for the connections to the mesh devices 264. For example, a WLAN unit may be used to implement WiFi™ communications in accordance with the IEEE 802.11 standard. In addition, wireless wide area communications, for example, according to a cellular or other wireless wide area protocol, may occur via a WWAN unit.

The mesh transceiver 211 may communicate using multiple standards or radios for communications at different ranges. For example, the platform 200 may communicate with close/proximate devices, e.g., within about 10 meters, using a local transceiver based on BLE, or another low power radio, to save power. More distant mesh devices 264, e.g., within about 20 meters, may be reached over ZigBee or other intermediate power radios. Both communications techniques may take place over a single radio at different power levels, or may take place over separate transceivers, for example, a local transceiver using BLE and a separate mesh transceiver using ZigBee.

The RF circuitry 212 (also referred to as a "wireless network transceiver," a "cloud transceiver," or the like) may be included to communicate with devices or services in the cloud 201 via local or wide area network protocols. The wireless network transceiver 212 includes one or more radios to communicate with devices in the cloud 201. The cloud 201 may be the same or similar to cloud 144 discussed previously. The wireless network transceiver 212 may be a LPWA transceiver that follows the IEEE 802.15.4, or IEEE 802.15.4g standards, among others, such as those discussed herein. The platform 200 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4 specification may be used.

In one example implementation, the communication circuitry 209 may be, or may include, a software defined radio (SDR) in which RF operating parameters including, but not limited to, frequency range, modulation type, and/or output power can be set or altered by software, and/or the technique by which this is achieved. Additionally or alternatively, the communication circuitry 209 may be, or may include, a software defined multiradio (SDMR), which is a device or technology where multiple radio technologies (or RATs) coexist and share their wireless transmission and/or reception capabilities, including but not limited to regulated parameters, by operating them under a common software system. In either of these example implementations, each of the transceivers 211 and 212 may be radio applications, which are software application executing in a SDR or SDMR. Radio applications are typically designed to use certain RF band(s) using agreed-to schemes for multiple access, modulation, channel and data coding, as well as control protocols for all radio layers needed to maintain user data links between adjacent radio equipment, which run the same radio application.

Any number of other radio communications and protocols may be used in addition to the systems mentioned for the mesh transceiver 211 and wireless network transceiver 212, as described herein. For example, the radio transceivers 211 and 212 may include an LTE or other cellular transceiver that uses spread spectrum (SPA/SAS) communications for implementing high-speed communications. Further, any number of other protocols may be used, such as WiFi® networks for medium speed communications and provision of network communications. The transceivers 211 and 212 may include radios that are compatible with, and/or may operate according to any one or more of the following radio communication technologies and/or standards including but not limited to those discussed herein.

Network interface circuitry/controller (NIC) 216 may be included to provide wired communication to the cloud 201 or to other devices, such as the mesh devices 264 using a standard network interface protocol. The standard network interface protocol may include Ethernet, Ethernet over GRE Tunnels, Ethernet over Multiprotocol Label Switching (MPLS), Ethernet over USB, or may be based on other types of network protocols, such as Controller Area Network (CAN), Local Interconnect Network (LIN), DeviceNet, ControlNet, Data Highway+, PROFIBUS, or PROFINET, among many others. Network connectivity may be provided to/from the platform 200 via NIC 216 using a physical connection, which may be electrical (e.g., a "copper interconnect") or optical. The physical connection also includes suitable input connectors (e.g., ports, receptacles, sockets, etc.) and output connectors (e.g., plugs, pins, etc.). The NIC 216 may include one or more dedicated processors and/or FPGAs to communicate using one or more of the aforementioned network interface protocols. In some implementations, the NIC 216 may include multiple controllers to provide connectivity to other networks using the same or different protocols. For example, the platform 200 may include a first NIC 216 providing communications to the cloud over Ethernet and a second NIC 216 providing communications to other devices over another type of network.

The interconnect 206 may couple the processor circuitry 202 to an external interface 218 (also referred to as "IO interface circuitry" or the like) that is used to connect external devices or subsystems. The external devices include, inter alia, sensor circuitry 221, actuators 222, and positioning circuitry 245. The sensor circuitry 221 may include devices, modules, or subsystems whose purpose is to detect events or changes in its environment and send the information (sensor data) about the detected events to some other a device, module, subsystem, etc. Examples of such sensors 221 include, inter alia, inertia measurement units (IMU) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras); light detection and ranging (LiDAR) sensors; proximity sensors (e.g., infrared radiation detector and the like), depth sensors, ambient light sensors, ultrasonic transceivers; microphones; etc.

The external interface 218 connects the platform 200 to actuators 222, allow platform 200 to change its state, position, and/or orientation, or move or control a mechanism or system. The actuators 222 comprise electrical and/or mechanical devices for moving or controlling a mechanism or system, and converts energy (e.g., electric current or moving air and/or liquid) into some kind of motion. The actuators 222 may include one or more electronic (or electrochemical) devices, such as piezoelectric biomorphs, solid state actuators, solid state relays (SSRs), shapememory alloy-based actuators, electroactive polymer-based actuators, relay driver integrated circuits (ICs), and/or the like. The actuators 222 may include one or more electromechanical devices such as pneumatic actuators, hydraulic actuators, electromechanical switches including electromechanical relays (EMRs), motors (e.g., DC motors, stepper motors, servomechanisms, etc.), wheels, thrusters, propellers, claws, clamps, hooks, an audible sound generator, and/or other like electromechanical components. The platform 200 may be configured to operate one or more actuators 222 based on one or more captured events and/or instructions or control signals received from a service provider and/or various client systems.

The positioning circuitry 245 includes circuitry to receive and decode signals transmitted/broadcasted by a positioning network of a global navigation satellite system (GNSS). Examples of navigation satellite constellations (or GNSS) include United States'Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 245 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 245 may include a Micro-Technology for Positioning, Navigation, and Timing (Micro-PNT) IC that uses a master timing clock to perform position tracking/estimation without GNSS assistance. The positioning circuitry 245 may also be part of, or interact with, the communication circuitry 209 to communicate with the nodes and components of the positioning network. The positioning circuitry 245 may also provide position data and/or time data to the application circuitry, which may use the data to synchronize operations with various infrastructure (e.g., radio base stations), for turn-by-turn navigation, or the like.

In some examples, various IO devices may be present within, or connected to, the platform 200, which are referred to as input device circuitry 286 and output device circuitry 284 in FIG. 1. The input device circuitry 286 and output device circuitry 284 include one or more user interfaces designed to enable user interaction with the platform 200 and/or peripheral component interfaces designed to enable peripheral component interaction with the platform 200. Input device circuitry 286 may include any physical or virtual means for accepting an input including, inter alia, one or more physical or virtual buttons (e.g., a reset button), a physical keyboard, keypad, mouse, touchpad, touchscreen, microphones, scanner, headset, and/or the like.

The output device circuitry 284 may be included to show information or otherwise convey information, such as sensor readings, actuator position(s), or other like information. Data and/or graphics may be displayed on one or more user interface components of the output device circuitry 284. Output device circuitry 284 may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 200. The output device circuitry 284 may also include speakers or other audio emitting devices, printer(s), and/or the like. In some embodiments, the sensor circuitry 221 may be used as the input device circuitry 286 (e.g., an image capture device, motion capture device, or the like) and one or more actuators 222 may be used as the output device circuitry 284 (e.g., an actuator to provide haptic feedback or the like). In another example, near-field communication (NFC) circuitry comprising an NFC controller coupled with an antenna element and a processing device may be included to read electronic tags and/or connect with another NFC-enabled device. Peripheral component interfaces may include, but are not limited to, a non-volatile memory port, a universal serial bus (USB) port, an audio jack, a power supply interface, etc.

A battery 224 may be coupled to the platform 200 to power the platform 200, which may be used in embodiments where the platform 200 is not in a fixed location. The battery 224 may be a lithium ion battery, a lead-acid automotive battery, or a metal-air battery, such as a zinc-air battery, an aluminum-air battery, a lithium-air battery, a lithium polymer battery, and/or the like. In embodiments where the platform 200 is mounted in a fixed location, the platform 200 may have a power supply coupled to an electrical grid. In these embodiments, the platform 200 may include power tee circuitry to provide for electrical power drawn from a network cable to provide both power supply and data connectivity to the platform 200 using a single cable.

Power management integrated circuitry (PMIC) 226 may be included in the platform 200 to track the state of charge (SoCh) of the battery 224, and to control charging of the platform 200. The PMIC 226 may be used to monitor other parameters of the battery 224 to provide failure predictions, such as the state of health (SoH) and the state of function (SoF) of the battery 224. The PMIC 226 may include voltage regulators, surge protectors, power alarm detection circuitry. The power alarm detection circuitry may detect one or more of brown out (under-voltage) and surge (over-voltage) conditions. The PMIC 226 may communicate the information on the battery 224 to the processor circuitry 202 over the interconnect 206. The PMIC 226 may also include an analog-to-digital (ADC) convertor that allows the processor circuitry 202 to directly monitor the voltage of the battery 224 or the current flow from the battery 224. The battery parameters may be used to determine actions that the platform 200 may perform, such as transmission frequency, mesh network operation, sensing frequency, and the like. As an example, the PMIC 226 may be a battery monitoring integrated circuit, such as an LTC5020 or an LTC2990 from Linear Technologies, an ADT7488A from ON Semiconductor of Phoenix Ariz., or an IC from the UCD90xxx family from Texas Instruments of Dallas, Tex.

A power block 228, or other power supply coupled to a grid, may be coupled with the PMIC 226 to charge the battery 224. In some examples, the power block 228 may be replaced with a wireless power receiver to obtain the power wirelessly, for example, through a loop antenna in the platform 200. A wireless battery charging circuit, such as an LTC5020 chip from Linear Technologies of Milpitas, Calif., among others, may be included in the PMIC 226. The specific charging circuits chosen depend on the size of the battery 224, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

Figure 3:
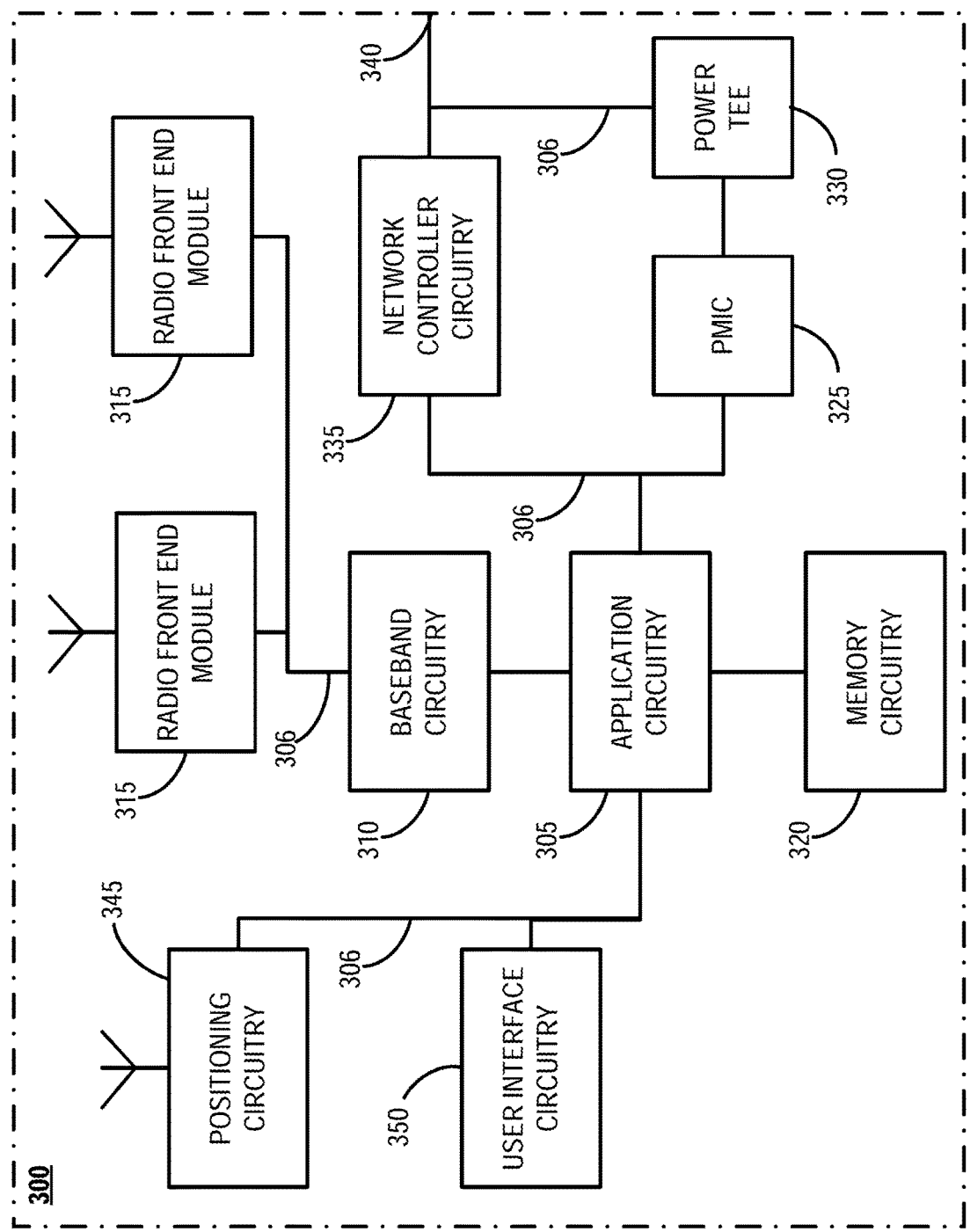
FIG. 3 depicts an example of infrastructure equipment in accordance with various embodiments.

FIG. 3 illustrates an example of infrastructure equipment 300 in accordance with various embodiments. The infrastructure equipment 300 (or "system 300") may be implemented as a base station, radio head, access network node (e.g., the edge nodes 130 shown of FIG. 1), MEC servers 136, server(s) 150, and/or any other element/device discussed herein. In other examples, the system 300 could be implemented in or by an intermediate node 120 or endpoint 110.

The system 300 includes application circuitry 305, baseband circuitry 310, one or more radio front end modules (RFEMs) 315, memory circuitry 320, power management integrated circuitry (PMIC) 325, power tee circuitry 330, network controller circuitry 335, network interface connector 340, positioning circuitry 345, and user interface 350. In some embodiments, the device 300 may include additional elements such as, for example, memory/storage, display, camera, sensor, or IO interface. In other embodiments, the components described below may be included in more than one device. For example, said circuitries may be separately included in more than one device for CRAN, CR, vBBU, or other like implementations.

Application circuitry 305 includes circuitry such as, but not limited to one or more processors (or processor cores), cache memory, and one or more of low drop-out voltage regulators (LDOs), interrupt controllers, serial interfaces such as SPI, I$^2$C or universal programmable serial interface module, real time clock (RTC), timer-counters including interval and watchdog timers, general purpose IO, memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 305 may be coupled with or may include memory/storage elements and may be configured to execute instructions stored in the memory/storage to enable various applications or operating systems to run on the system 300. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 305 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more DSPs, one or more FPGAs, one or more PLDs, one or more ASICs, one or more microprocessors or controllers, or any suitable combination thereof. In some embodiments, the application circuitry 305 may comprise, or may be, a special-purpose processor/controller to operate according to the various embodiments herein. As examples, the processor(s) of application circuitry 305 may include one or more Intel Pentium®, Core®, or Xeon® processor(s); Advanced Micro Devices (AMD) Ryzen® processor(s), Accelerated Processing Units (APUs), or Epyc® processors; ARM-based processor(s) licensed from ARM Holdings, Ltd. such as the ARM Cortex-A family of processors and the ThunderX2® provided by Cavium™, Inc.; a MIPS-based design from MIPS Technologies, Inc. such as MIPS Warrior P-class processors; and/or the like. In some embodiments, the system 300 may not utilize application circuitry 305, and instead may include a special-purpose processor/controller to process IP data received from an EPC or 5GC, for example.

In some implementations, the application circuitry 305 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more field-programmable gate arrays (FPGAs); programmable logic devices (PLDs) such as complex PLDs (CPLDs), high-capacity PLDs (HCPLDs), and the like; ASICs such as structured ASICs and the like; programmable SoCs (PSoCs); and/or the like. In such implementations, the circuitry of application circuitry 305 may comprise logic blocks or logic fabric, and other interconnected resources that may be programmed to perform various functions, such as the procedures, methods, functions, etc. of the various embodiments discussed herein. In such embodiments, the circuitry of application circuitry 305 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like.

In some implementations, such as implementations where subsystems of the edge nodes 130, intermediate nodes 120, and/or endpoints 110 of FIG. 1 are individual software agents or AI agents, each agent is implemented in a respective hardware accelerator that are configured with appropriate bit stream(s) or logic blocks to perform their respective functions. In these implementations, processor(s) and/or hardware accelerators of the application circuitry 305 may be specifically tailored for operating the agents and/or for machine learning functionality, such as a cluster of AI GPUs, tensor processing units (TPUs) developed by Google® Inc., a Real AI Processors (RAPs™) provided by AlphaICs®, Nervana™ Neural Network Processors (NNPs) provided by Intel® Corp., Intel® Movidius™ Myriad™ X Vision Processing Unit (VPU), NVIDIA® PX™ based GPUs, the NM500 chip provided by General Vision®, Hardware 3 provided by Tesla®, Inc., an Epiphany™ based processor provided by Adapteva®, or the like. In some embodiments, the hardware accelerator may be implemented as an AI accelerating co-processor, such as the Hexagon 685 DSP provided by Qualcomm®, the PowerVR 2NX Neural Net Accelerator (NNA) provided by Imagination Technologies Limited®, the Neural Engine core within the Apple® A11 or A12 Bionic SoC, the Neural Processing Unit within the HiSilicon Kirin 970 provided by Huawei®, and/or the like.

The baseband circuitry 310 may be implemented, for example, as a solder-down substrate including one or more integrated circuits, a single packaged integrated circuit soldered to a main circuit board or a multi-chip module containing two or more integrated circuits. The baseband circuitry 310 includes one or more processing devices (e.g., baseband processors) to carry out various protocol and radio control functions. Baseband circuitry 310 may interface with application circuitry of system 300 for generation and processing of baseband signals and for controlling operations of the RFEMs 315. The baseband circuitry 310 may handle various radio control functions that enable communication with one or more radio networks via the RFEMs 315. The baseband circuitry 310 may include circuitry such as, but not limited to, one or more single-core or multi-core processors (e.g., one or more baseband processors) or control logic to process baseband signals received from a receive signal path of the RFEMs 315, and to generate baseband signals to be provided to the RFEMs 315 via a transmit signal path. In various embodiments, the baseband circuitry 310 may implement a real-time OS (RTOS) to manage resources of the baseband circuitry 310, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein.

Although not shown by FIG. 3, in one embodiment, the baseband circuitry 310 includes individual processing device(s) to operate one or more wireless communication protocols (e.g., a "multi-protocol baseband processor" or "protocol processing circuitry") and individual processing device(s) to implement physical layer (PHY) functions. In this embodiment, the protocol processing circuitry operates or implements various protocol layers/entities of one or more wireless communication protocols. In a first example, the protocol processing circuitry may operate LTE protocol entities and/or 5G/NR protocol entities when the RFEMs 315 are cellular radiofrequency communication system, such as millimeter wave (mmWave) communication circuitry or some other suitable cellular communication circuitry. In the first example, the protocol processing circuitry would operate MAC, RLC, PDCP, SDAP, RRC, and NAS functions. In a second example, the protocol processing circuitry may operate one or more IEEE-based protocols when the RFEMs 315 are WiFi communication system. In the second example, the protocol processing circuitry would operate WiFi MAC and LLC functions. The protocol processing circuitry may include one or more memory structures (not shown) to store program code and data for operating the protocol functions, as well as one or more processing cores (not shown) to execute the program code and perform various operations using the data. The protocol processing circuitry provides control functions for the baseband circuitry 310 and/or RFEMs 315. The baseband circuitry 310 may also support radio communications for more than one wireless protocol.

Continuing with the aforementioned embodiment, the baseband circuitry 310 includes individual processing device(s) to implement PHY including HARQ functions, scrambling and/or descrambling, (en)coding and/or decoding, layer mapping and/or de-mapping, modulation symbol mapping, received symbol and/or bit metric determination, multi-antenna port pre-coding and/or decoding which may include one or more of space-time, space-frequency or spatial coding, reference signal generation and/or detection, preamble sequence generation and/or decoding, synchronization sequence generation and/or detection, control channel signal blind decoding, radio frequency shifting, and other related functions. etc. The modulation/demodulation functionality may include Fast-Fourier Transform (FFT), pre-coding, or constellation mapping/demapping functionality. The (en)coding/decoding functionality may include convolution, tail-biting convolution, turbo, Viterbi, or Low Density Parity Check (LDPC) coding. Embodiments of modulation/demodulation and encoder/decoder functionality are not limited to these examples and may include other suitable functionality in other embodiments.

User interface circuitry 350 may include one or more user interfaces designed to enable user interaction with the system 300 or peripheral component interfaces designed to enable peripheral component interaction with the system 300. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end modules (RFEMs) 315 may comprise a millimeter wave (mmWave) RFEM and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical RFEM 315, which incorporates both mmWave antennas and sub-mmWave. The antenna array comprises one or more antenna elements, each of which is configured convert electrical signals into radio waves to travel through the air and to convert received radio waves into electrical signals. For example, digital baseband signals provided by the baseband circuitry 310 is converted into analog RF signals (e.g., modulated waveform) that will be amplified and transmitted via the antenna elements of the antenna array including one or more antenna elements (not shown). The antenna elements may be omnidirectional, direction, or a combination thereof. The antenna elements may be formed in a multitude of arranges as are known and/or discussed herein. The antenna array may comprise microstrip antennas or printed antennas that are fabricated on the surface of one or more printed circuit boards. The antenna array may be formed in as a patch of metal foil (e.g., a patch antenna) in a variety of shapes, and may be coupled with the RF circuitry using metal transmission lines or the like.

The memory circuitry 320 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. Memory circuitry 320 may be implemented as one or more of solder down packaged integrated circuits, socketed memory modules and plug-in memory cards.

The memory circuitry 320 is configured to store computational logic (or "modules") in the form of software, firmware, or hardware commands to implement the techniques described herein. The computational logic or modules may be developed using a suitable programming language or development tools, such as any programming language or development tool discussed herein. The computational logic may be employed to store working copies and/or permanent copies of programming instructions for the operation of various components of appliance infrastructure equipment 300, an operating system of infrastructure equipment 300, one or more applications, and/or for carrying out the embodiments discussed herein. The computational logic may be stored or loaded into memory circuitry 320 as instructions for execution by the processors of the application circuitry 305 to provide or perform the functions described herein. The various elements may be implemented by assembler instructions supported by processors of the application circuitry 305 or high-level languages that may be compiled into such instructions. The permanent copy of the programming instructions may be placed into persistent storage devices of memory circuitry 320 in the factory during manufacture, or in the field through, for example, a distribution medium (not shown), through a communication interface (e.g., from a distribution server), and/or over-the-air (OTA).

As discussed in more detail infra, infrastructure equipment 300 may be configured to support a particular V2X RAT based on the number of vUEs 121 that support (or are capable to communicate) the particular V2X RAT. In embodiments, the memory circuitry 320 may store a RAT configuration control module to control the (re)configuration of the infrastructure equipment 300 to support a particular RAT and/or V2X RAT. The configuration control module provides an interface for triggering (re)configuration actions. In some embodiments, the memory circuitry 320 may also store a RAT software (SW) management module to implement SW loading or provisioning procedures, and (de)activation SW in the infrastructure equipment 300. In either of these embodiments, the memory circuitry 320 may store a plurality of V2X RAT software components, each of which include program code, instructions, modules, assemblies, packages, protocol stacks, software engine(s), etc., for operating the infrastructure equipment 300 or components thereof (e.g., RFEMs 315) according to a corresponding V2X RAT. When a V2X RAT component is configured or executed by the application circuitry 305 and/or the baseband circuitry 310, the infrastructure equipment 300 operates according to the that V2X RAT component.

In a first example, a first V2X RAT component may be an LTE C-V2X component, which includes LTE and/or C-V2X protocol stacks that allow the infrastructure equipment 300 to support LTE C-V2X and/or provide radio time/frequency resources according to LTE and/or LTE C-V2X standards. Such protocol stacks may include a control plane protocol stack including a Non-Access Stratum (NAS), Radio Resource Control (RRC), Packet Data Convergence Protocol (PDCP), Radio Link Control (RLC), Media Access Control (MAC), and Physical (PHY) layer entities; and a user plane protocol stack including General Packet Radio Service (GPRS) Tunneling Protocol for the user plane layer (GTP-U), User Datagram Protocol (UDP), Internet Protocol (IP), PDCP, RLC, MAC, and PHY layer entities. These control plane and user plane protocol entities are discussed in more detail in 3GPP technical specification (TS) 36.300 version (v) 15.1.0 (2018-03) as well as other 3GPP specifications. In some embodiments, the IP layer entity may be replaced with an Allocation and Retention Priority (ARP) layer entity or some other non-IP protocol layer entity. Some or all of the aforementioned protocol layer entities may be "relay" versions depending on whether the infrastructure equipment 300 is acting as a relay. In some embodiments, the user plane protocol stack may be the PC5 user plane (PC5-U) protocol stack discussed in 3GPP TS 23.303 v15.1.0 (2018-06).

In a second example, a second V2X RAT component may be a DSRC/ITS-G5 component, which includes DSRC/ITS-G5 (IEEE 802.11p) and/or Wireless Access in Vehicular Environments (WAVE) (IEEE 1609.4) protocol stacks, among others, that allow the infrastructure equipment to support DSRC/ITS-G5 communications and/or provide radio time-frequency resources according to DSRC/ITS-G5 and/or other WiFi standards. The DSRC/ITS-G5 and WAVE protocol stacks include, inter alia, a DSRC/WAVE PHY and MAC layer entities that are based on the IEEE 802.11p protocol. The DSRC/WAVE PHY layer is responsible for obtaining data for transmitting over DSRC/ITS-G5 channels from higher layers, as well as receiving raw data over the DSRC/ITS-G5 channels and providing data to upper layers. The MAC layer organizes the data packets into network frames. The MAC layer may be split into a lower DSRC/WAVE MAC layer based on IEEE 802.11p and an upper WAVE MAC layer (or a WAVE multi-channel layer) based on IEEE 1609.4. IEEE 1609 builds on IEEE 802.11p and defines one or more of the other higher layers. The DSRC/ITS-G5 component may also include a logical link control (LLC) layer entity to perform layer 3 (L3) multiplexing and demultiplexing operations. The LLC layer (e.g., IEEE 802.2) allows multiple network L3 protocols to communicate over the same physical link by allowing the L3 protocols to be specified in LLC fields.

In addition to the V2X RAT components, the memory circuitry 320 may also store a RAT translation component, which is a software engine, API, library, object(s), engine(s), or other functional unit for providing translation services to vUEs 121 that are equipped with different V2X capabilities. For example, the RAT translation component, when configured or executed, may cause the infrastructure equipment 300 to convert or translate a first message obtained according to the first V2X RAT (e.g., LTE C-V2X) into a second message for transmission using a second V2X RAT (e.g., DSRC/ITS-G5). In one example, the RAT translation component may perform the translation or conversion by extracting data from one or more fields of the first message and inserting the extracted data into corresponding fields of the second message. Other translation/conversion methods may also be used in other embodiments. In some embodiments, the RAT translation component may employ a suitable translator for translating one or more source messages in a source format into one or more target messages in a target format, and may utilize any suitable compilation strategies for the translation. The translator may also have different implementations depending on the type of V2X RATs that are supported by the infrastructure equipment 300 (e.g., memory map, instruction set, programming model, etc.).

The PMIC 325 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 330 may provide for electrical power drawn from a network cable to provide both power supply and data connectivity to the infrastructure equipment 300 using a single cable.

The network controller circuitry 335 provides connectivity to a network using a standard network interface protocol such as Ethernet, Ethernet over GRE Tunnels, Ethernet over Multiprotocol Label Switching (MPLS), or some other suitable protocol, such as those discussed herein. Network connectivity may be provided to/from the infrastructure equipment 300 via network interface connector 340 using a physical connection, which may be electrical (commonly referred to as a "copper interconnect"), optical, or wireless. The network controller circuitry 335 may include one or more dedicated processors and/or FPGAs to communicate using one or more of the aforementioned protocols. In some implementations, the network controller circuitry 335 may include multiple controllers to provide connectivity to other networks using the same or different protocols. In various embodiments, the network controller circuitry 335 enables communication with associated equipment and/or with a backend system (e.g., server(s) 130 of FIG. 1), which may take place via a suitable gateway device.

The positioning circuitry 345 includes circuitry to receive and decode signals transmitted/broadcasted by a positioning network of a global navigation satellite system (GNSS). Examples of navigation satellite constellations (or GNSS) include United States' Global Positioning System (GPS), Russia's Global Navigation System (GLONASS), the European Union's Galileo system, China's BeiDou Navigation Satellite System, a regional navigation system or GNSS augmentation system (e.g., Navigation with Indian Constellation (NAVIC), Japan's Quasi-Zenith Satellite System (QZSS), France's Doppler Orbitography and Radio-positioning Integrated by Satellite (DORIS), etc.), or the like. The positioning circuitry 345 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 345 may include a Micro-Technology for Positioning, Navigation, and Timing (Micro-PNT) IC that uses a master timing clock to perform position tracking/estimation without GNSS assistance. The positioning circuitry 345 may also be part of, or interact with, the baseband circuitry 310 and/or RFEMs 315 to communicate with the nodes and components of the positioning network. The positioning circuitry 345 may also provide position data and/or time data to the application circuitry 305, which may use the data to synchronize operations with various other infrastructure equipment, or the like.

The components shown by FIG. 3 may communicate with one another using interface circuitry 306 or interconnect (IX) 306, which may include any number of bus and/or interconnect (IX) technologies such as industry standard architecture (ISA), extended ISA (EISA), inter-integrated circuit (VC), an serial peripheral interface (SPI), point-to-point interfaces, power management bus (PMBus), peripheral component interconnect (PCI), PCI express (PCIe), Intel® Ultra Path Interface (UPI), Intel® Accelerator Link (IAL), Common Application Programming Interface (CAPI), Intel® QuickPath interconnect (QPI), Ultra Path Interconnect (UPI), Intel® Omni-Path Architecture (OPA) IX, RapidIO™ system IXs, Cache Coherent Interconnect for Accelerators (CCIA), Gen-Z Consortium IXs, Open Coherent Accelerator Processor Interface (OpenCAPI) IX, a HyperTransport interconnect, and/or any number of other IX technologies. The IX technology may be a proprietary bus, for example, used in an SoC based system.

Figure 4:
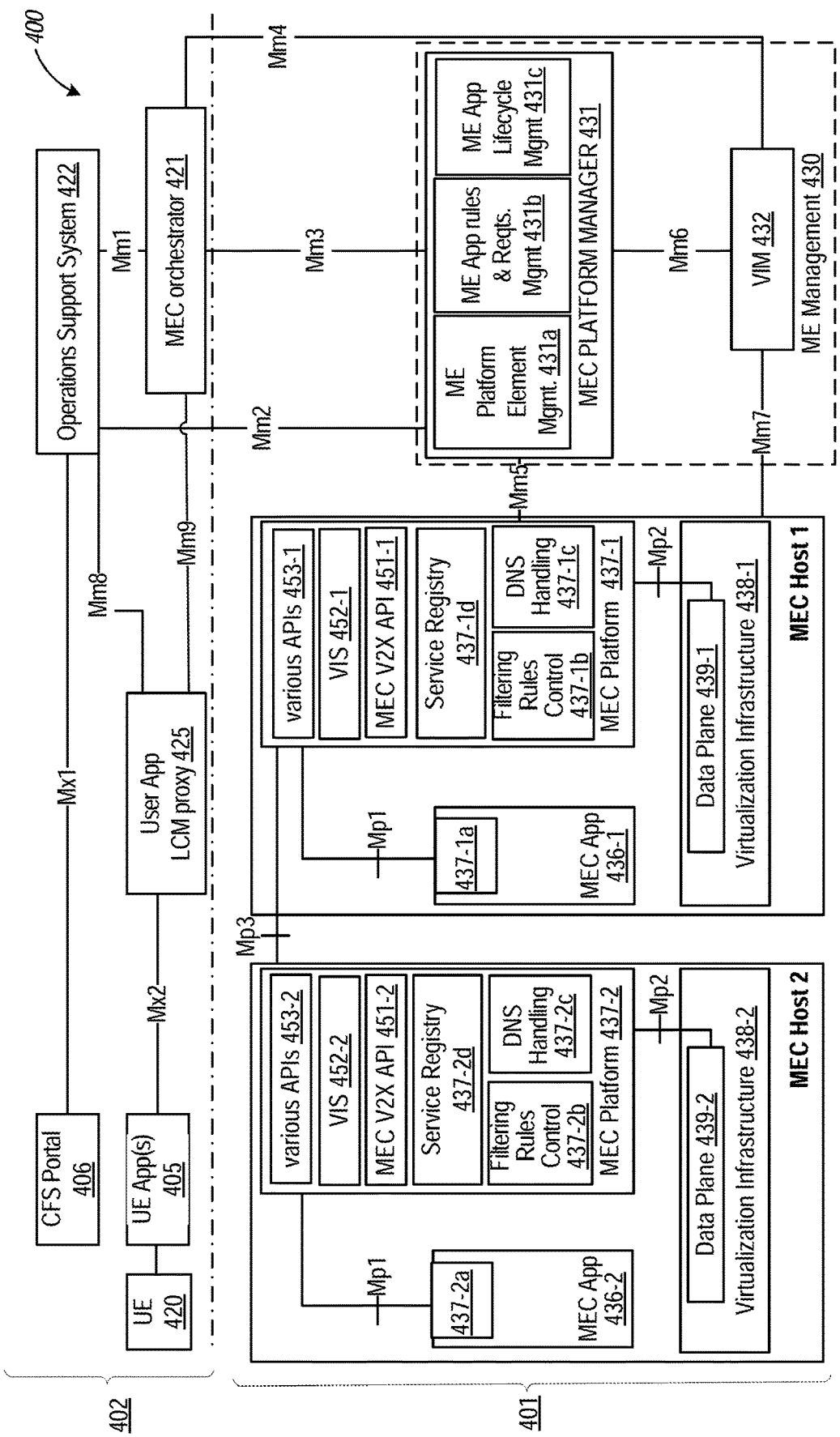
FIG. 4 depicts an example Multi-access Edge Computing (MEC) system architecture in which any one or more of the techniques (e.g., operations, processes, methods, and methodologies) discussed herein may be performed according to various embodiments.

FIG. 4 depicts a block diagram for an example MEC system architecture 400 according to various embodiments. MEC offers application developers and content providers cloud-computing capabilities and an IT service environment at the edge of the network. This environment is characterized by ultra-low latency and high bandwidth as well as real-time access to radio network information that can be leveraged by applications. MEC technology permits to flexible and rapid deployment of innovative applications and services towards mobile subscribers, enterprises and vertical segments. In particular, regarding the automotive sector, applications such as V2X (e.g., IEEE 802.11p based protocols such as DSRC/ITS-G5, or 3GPP LTE-V2X based protocols) need to exchange data, provide data to aggregation points and access to data in databases which provide an overview of the local situation derived from a multitude of sensors (by various cars, roadside units, etc.).

The illustrated logical connections between various entities of the MEC architecture 400 may be access-agnostic and not dependent on a particular deployment. MEC enables implementation of MEC applications (MEC Apps) 436-1 and 436-2 (collectively referred to as "MEC Apps 436" or the like) as software-only entities that run on top of a Virtualization Infrastructure (VI) 438-1 and 438-2 (collectively referred to as "VI 438" or the like), which is located in or close to the network edge. A MEC app 436 is an application that can be instantiated on a MEC host 136 within the MEC system 400 and can potentially provide or consume MEC services 437a. The term "user application" in the context of MEC refers to an MEA 436 that is instantiated in the MEC system 400 in response to a request from a user (e.g., vUE 125) via a device application. FIG. 4 shows the general entities involved, and these entities can be grouped into multi-access edge system level 402, multi-access edge host level 401, and network level entities (not shown). The multi-access edge host level 401 includes a MEC host 1 and MEC host 2 (which may be the same or similar to the MEC servers 136 discussed previously, and re collectively referred to as "MEC host 136" or the like) and Multi-access Edge (ME) management 430, which provide functionality to run MEC Apps 436 within an operator network or a subset of an operator network. The multi-access edge system level 402 includes multi-access edge system level management 402, UE 420 (which may be the same or similar to the intermediate nodes 120 and/or endpoints 110 discussed herein), and third party entities. The network level (not shown) includes various external network level entities, such as a 3GPP network (e.g., CN 142 of FIG. 1), a local area network (e.g., a LAN, WLAN, PAN, etc.), and an external network (e.g., CN 142 and/or cloud 144 of FIG. 1). The multi-access edge host level 401 includes multi-access edge host level management and one or more MEC hosts 136. The multi-access edge host level management may include various components that handle the management of the multi-access edge specific functionality of a particular MEC platform 437, MEC host 136, and the MEC Apps 436 to be run. The MEC host 136 includes the MEC platform 437, MEC Apps 436, and VI 438.

The MEC system 400 includes three groups of reference points, including "Mp" reference points regarding the multi-access edge platform functionality; "Mm" reference points, which are management reference points; and "Mx" reference points, which connect MEC entities to external entities. The interfaces/reference points in the MEC system 400 may include IP-based connections, and may be used to provide Representational State Transfer (REST or RESTful) services, and the messages conveyed using the reference points/interfaces may be in XML, HTML, JSON, or some other desired format, such as those discussed herein. A suitable Authentication, Authorization, and Accounting (AAA) protocol, such as the radius or diameter protocols, may also be used for communicating over the reference points/interfaces in other embodiments.

The MEC host 136 is an entity that contains an MEC platform 437 and VI 438 which provides compute, storage, and network resources for the purpose of running MEC Apps 436. Each of the VIs 438 includes a respective data plane (DP) 439 (including DP 439-1 and 439-2) that executes respective traffic rules 437-1b and 437-2b (collectively referred to as "traffic rules 437b") received by the MEC platform 437, and routes the traffic among applications (e.g., MEC Apps 436), MEC services 437-1a and 437-2a (collectively referred to as "MEC services 437a"), DNS server/proxy (see e.g., via DNS handling entities 437-1c and 437-2c), 3GPP network, local networks, and external networks. The MEC DP 438a may be connected with the (R)AN nodes 131 and CN 142 of FIG. 1, and/or may be connected with the AP 133 of FIG. 1 via a wider network, such as the internet, an enterprise network, or the like. The other entities depicted and/or discussed herein may be the same or similar as those discussed with regard to FIG. 1.

The MEC platforms 437-1 and 437-2 (collectively referred to as "MEC platform 437" or the like) within a MEC host 136 may be a collection of essential functionality required to run MEC Apps 436 on a particular VI 438 and enable them to provide and consume MEC services 437a, and that can provide itself a number of MEC services 937a. The MEC platform 437 can also provide various services and/or functions, such as offering an environment where the MEC Apps 436 can discover, advertise, consume and offer MEC services 437a (discussed infra), including MEC services 437a available via other platforms when supported. The MEC platform 437 may be able to allow authorized MEC Apps 436 to communicate with third party servers located in external networks. The MEC platform 437 may receive traffic rules from the MEC platform manager 431, applications, or services, and instruct the data plane accordingly (see e.g., Traffic Rules Control 437b). The MEC platform 437 may send instructions to the DP 438 within the VI 438 via the Mp2 reference point. The Mp2 reference point between the MEC platform 437 and the DP 438 of the VI 438 may be used to instruct the DP 438 on how to route traffic among applications, networks, services, etc. In some implementations, the MEC platform 437 may translate tokens representing UEs XP01 in the traffic rules into specific IP addresses. The MEC platform 437 also receives DNS records from the MEC platform manager 431 and configures a DNS proxy/server accordingly. The MEC platform 437 hosts MEC services 437a including the multi-access edge services discussed infra, and provide access to persistent storage and time of day information. Furthermore, the MEC platform 437 may communicate with other MEC platforms 437 of other MEC servers 136 via the Mp3 reference point.

The VI 438 may represent the totality of all hardware and software components which build up the environment in which MEC Apps 436 and/or MEC platform 437 are deployed, managed and executed. The VI 438 may span across several locations, and the network providing connectivity between these locations is regarded to be part of the VI 438. The physical hardware resources of the VI 438 includes computing, storage and network resources that provide processing, storage and connectivity to MEC Apps 436 and/or MEC platform 437 through a virtualization layer (e.g., a hypervisor, VM monitor (VMM), or the like). The virtualization layer may abstract and/or logically partition the physical hardware resources of the MEC server 136 as a hardware abstraction layer. The virtualization layer may also enable the software that implements the MEC Apps 436 and/or MEC platform 437 to use the underlying VI 438, and may provide virtualized resources to the MEC Apps 436 and/or MEC platform 437, so that the MEC Apps 436 and/or MEC platform 437 can be executed.

The MEC Apps 436 are applications that can be instantiated on a MEC host/server 136 within the MEC system 400 and can potentially provide or consume MEC services 437a. The term "MEC service" refers to a service provided via a MEC platform 937 either by the MEC platform 937 itself or by a MEC App 936. MEC Apps 436 may run as VM on top of the VI 438 provided by the MEC server 136, and can interact with the MEC platform 437 to consume and provide the MEC services 437a. The MEC Apps 436 are instantiated on the VI 438 of the MEC server 136 based on configuration or requests validated by the ME management 430. In some embodiments, the MEC Apps 436 can also interact with the MEC platform 437 to perform certain support procedures related to the lifecycle of the MEC Apps 436, such as indicating availability, preparing relocation of user state, etc. The MEC Apps 436 may have a certain number of rules and requirements associated to them, such as required resources, maximum latency, required or useful services, etc. These requirements may be validated by the ME management 430, and can be assigned to default values if missing. MEC services 437-1a and 437-2a (collectively referred to as "MEC services "437a" or the like) are services provided and/or consumed either by the MEC platform 437 and/or MEC Apps 436. The service consumers (e.g., MEC Apps 436 and MEC platform 437) may communicate with particular MEC services 437a over individual APIs (including MEC V2X API 451-1, 451-2 and various APIs 453-1, 453-2 in FIG. 4). When provided by an application, a MEC service 437a can be registered in a list of services in the service registries 437-1d and 437-2d (collectively referred to as "service registry 437d" or the like) to a respective the MEC platform 437 over the Mp1 reference point. Additionally, the MEC Apps 436 can subscribe to one or more services 437a for which it is authorized over the Mp1 reference point.

The MEC system 400 may support a feature called UserApps. When the MEC system 400 supports the feature UserApps, the ME management 430 may support the instantiation of MEC Apps 436 (or user applications) on multiple MEC hosts 136 following a single instantiation request, and when required by the operator in response to a request by the user. The application instance may need to fulfil a number of potential constraints predefined for the application 405. Once instantiated, connectivity may be established between the UE 420 and the application instance. Potential constraints may include latency, location, compute resources, storage resources, network capability, security conditions, and the like. As part of the user application (or MEC app 436) instantiation, the MEC system 400 will create an associated application context that the MEC system 400 maintains for the lifetime of the user application (or MEC app 436). The application context is a set of reference data about an application instance that is used to identify it, enable lifecycle management operations and associate it with its device application. The term "user context" in the context of MEC refers to application-specific runtime data maintained by a MEC app 436, which is associated with a user of that application. The application context contains information specific to the application instance such as its unique identifier within the MEC system 400 and the address (e.g., URI or the like) provided for clients (e.g., UE 420) that are external to the MEC system 400 to interact with the user application.

When the MEC system 400 supports the feature UserApps, the system 400 may, in response to a request by a user, support the establishment of connectivity between the UE 420 and an instance of a specific MEC App 436 fulfilling the requirements of the MEC App 436 regarding the UE 420. If no instance of the MEC App 436 fulfilling these requirements is currently running, the multi-access edge system management may create a new instance of the application 405 on a MEC host 136 that fulfils the requirements of the application 405. Once instantiated, connectivity is established between the UE 420 and the new MEC App 436 instance. Requirements of the application can include latency, location, compute resources, storage resources, network capability, security conditions, and the like. When the MEC system 400 supports the UserApps feature, the system 400 may support the on-boarding of MEC Apps 436 during the execution of an instantiation request, may allow the establishment of connectivity between the UE 420 and a specific instance of an MEC App 436, may support the capability to terminate the MEC App 436 instance when no UE 420 is connected to it anymore, and may support the termination of the MEC App 436 running on multiple MEC servers 136 following a single termination request.

As shown by FIG. 4, the Mp1 reference point is between the MEC platform 437 and the MEC Apps 436. The Mp1 reference point may provide service registration 437d, service discovery, and communication support for various services, such as the MEC services 437-1a provided by MEC host 1 and MEC services 437-2a provided by MEC host 2 (collectively referred to as "MEC services 437a" or the like). In addition, the Mp1 interface may provide application availability, session state relocation support procedures, traffic rules and DNS rules activation, access to persistent storage and time of day information, and/or the like. The Mp1 reference point may be used for consuming and providing service specific functionality.

Examples of MEC services 437a include Radio Network Information Service (RNIS), location services, and bandwidth management services. The RNIS, when available, provides authorized MEC Apps 436 with radio network related information, and expose appropriate up-to-date radio network information to the MEC Apps 436. The radio network information (RNI) may include, inter alia, radio network conditions, measurement and statistics information related to the user plane, information related to UEs 420 served by the radio node(s) associated with the MEC host 136 (e.g., UE context and radio access bearers), changes on information related to UEs 420 served by the radio node(s) associated with the MEC host 136, and/or the like. The RNI may be provided at the relevant granularity (e.g., per UE 420, per cell, per period of time).

The service consumers (e.g., MEC Apps 436 and MEC platform 437) may communicate with the RNIS over an RNI API 453 to obtain contextual information from a corresponding RAN. RNI may be provided to the service consumers via an access node (e.g., (R)AN nodes 131, 132, or AP 133 of FIG. 1). The RNI API 453 may support both query and subscription (e.g., a pub/sub) based mechanisms that are used over a Representational State Transfer (RESTful) API 453 or over a message broker of the MEC platform 437 (not shown by FIG. 4). A MEC App 436 may query information on a message broker via a transport information query procedure, wherein the transport information may be pre-provisioned to the MEC App 436 via a suitable configuration mechanism. The various messages communicated via the RNI API 453 may be in XML, JSON, Protobuf, or some other suitable format.

The RNI may be used by MEC Apps 436 and MEC platform 437 to optimize the existing services and to provide new types of services that are based on up to date information on radio conditions. As an example, a MEC App 436 may use RNI to optimize current services such as video throughput guidance. In throughput guidance, a radio analytics MEC App 436 may use MEC services to provide a backend video server with a near real-time indication on the throughput estimated to be available at the radio downlink interface in a next time instant. The throughput guidance radio analytics application 436 computes throughput guidance based on the required radio network information it obtains from a multi-access edge service running on the MEC server 136. RNI may be also used by the MEC platform 437 to optimize the mobility procedures required to support service continuity, such as when a certain MEC App 436 requests a single piece of information using a simple request-response model (e.g., using RESTful mechanisms) while other MEC Apps 436 subscribe to multiple different notifications regarding information changes (e.g., using a pub/sub mechanism and/or message broker mechanisms).

The location services (LS), when available, may provide authorized MEC Apps 436 with location-related information, and expose such information to the MEC Apps 436. With location related information, the MEC platform 437 or one or more MEC Apps 436 perform active device location tracking, location-based service recommendations, and/or other like services. The LS supports the location retrieval mechanism, e.g., the location is reported only once for each location information request. The LS supports a location subscribe mechanism, for example, the location is able to be reported multiple times for each location request, periodically or based on specific events, such as location change. The location information may include, inter alia, the location of specific UEs 420 currently served by the radio node(s) associated with the MEC server 136, information about the location of all UEs 420 currently served by the radio node(s) associated with the MEC server 136, information about the location of a certain category of UEs 420 currently served by the radio node(s) associated with the MEC server 136, a list of UEs 420 in a particular location, information about the location of all radio nodes currently associated with the MEC server 136, and/or the like. The location information may be in the form of a geolocation, a Global Navigation Satellite Service (GNSS) coordinate, a Cell identity (ID), and/or the like. The LS is accessible through the API defined in the Open Mobile Alliance (OMA) specification "RESTful Network API for Zonal Presence" OMA-TS-REST-NetAPI-ZonalPresence-V1-0-20160308-C. The Zonal Presence service utilizes the concept of "zone", where a zone lends itself to be used to group all radio nodes that are associated to a MEC host or MEC server 136, or a subset thereof, according to a desired deployment. In this regard, the OMA Zonal Presence API 453 provides means for MEC Apps 436 to retrieve information about a zone, the access points associated to the zones and the users that are connected to the access points. In addition, the OMA Zonal Presence API 453, allows authorized application to subscribe to a notification mechanism, reporting about user activities within a zone. In various embodiments, a MEC server 136 may access location information or zonal presence information of individual UEs 420 using the OMA Zonal Presence API 453 to identify the relative location or positions of the UEs 420.

The bandwidth management services (BWMS) provides for the allocation of bandwidth to certain traffic routed to and from MEC Apps 436, and specify static/dynamic up/down bandwidth resources, including bandwidth size and bandwidth priority. MEC Apps 436 may use the BWMS to update/receive bandwidth information to/from the MEC platform 437. In some embodiments, different MEC Apps 436 running in parallel on the same MEC server 136 may be allocated specific static, dynamic up/down bandwidth resources, including bandwidth size and bandwidth priority. The BWMS includes a bandwidth management (BWM) API 453 to allowed registered applications to statically and/or dynamically register for specific bandwidth allocations per session/application. The BWM API 453 includes HTTP protocol bindings for BWM functionality using RESTful services or some other suitable API mechanism.

Referring back to FIG. 4, multi-access edge management comprises multi-access edge system level management and the multi-access edge host level management 430. The ME management 430 comprises the MEC platform manager 431 and the VI manager (VIM) 432, and handles the management of MEC-specific functionality of a particular MEC server 136 and the applications running on it. In some implementations, some or all of the multi-access edge management components may be implemented by one or more servers located in one or more data centers, and may use virtualization infrastructure that is connected with Network Functions Virtualization (NFV) infrastructure used to virtualize core network elements, or using the same hardware as the NFV infrastructure.

The MEC platform manager 431 is responsible for managing the life cycle of applications including informing the multi-access edge orchestrator (MEC-O) 421 of relevant application related events. The MEC platform manager 431 may also provide MEP element management functions 431a to the MEC platform 437, manage MEC App rules and requirements 431b including service authorizations, traffic rules, DNS configuration and resolving conflicts, and manage MEC App 436 lifecycles (MEALC mgmt 431c). The MEC platform manager 431 may also receive virtualized resources fault reports and performance measurements from the VIM 432 for further processing. The Mm5 reference point between the MEC platform manager 431 and the MEC platform 437 is used to perform platform configuration, configuration of the MEPE mgmt 431a, the MERR mgmt 431b, the MEALC mgmt 431c, management of application relocation, etc.

The VIM 432 may be an entity that allocates, manages and releases virtualized (compute, storage and networking) resources of the VI 438, and prepares the VI 438 to run a software image. To do so, the VIM 432 may communicate with the VI 438 over the Mm7 reference point between the VIM 432 and the VI 438. Preparing the VI 438 may include configuring the VI 438, and receiving/storing the software image. When supported, the VIM 432 may provide rapid provisioning of applications, such as described in "Openstack++ for Cloudlet Deployments", available at http://reports-archive.adm.cs.cmu.edu/anon/2015/CMU-CS-15-123.pdf. The VIM 432 may also collect and report performance and fault information about the virtualized resources, and perform application relocation when supported. For application relocation from/to external cloud environments, the VIM 432 may interact with an external cloud manager to perform the application relocation, for example using the mechanism described in "Adaptive VM Handoff Across Cloudlets", and/or possibly through a proxy. Furthermore, the VIM 432 may communicate with the MEC platform manager 431 via the Mm6 reference point, which may be used to manage virtualized resources, for example, to realize the application lifecycle management. Moreover, the VIM 432 may communicate with the MEC-O 421 via the Mm4 reference point, which may be used to manage virtualized resources of the MEC server 136, and to manage application images. Managing the virtualized resources may include tracking available resource capacity, etc.

The multi-access edge system level management includes the MEC-O 421 as a core component, which has an overview of the complete MEC system 400. The MEC-O 421 may maintain an overall view of the MEC system 400 based on deployed multi-access edge hosts 901, available resources, available MEC services 437a, and topology. The Mm3 reference point between the MEC-O 421 and the MEC platform manager 431 may be used for the management of the application lifecycle, application rules and requirements and keeping track of available MEC services 437a. The MEC-O 421 may communicate with the user application lifecycle management proxy (UALMP) 425 via the Mm9 reference point in order to manage MEC Apps 436 requested by UE application 405.

The MEC-O 421 may also be responsible for on-boarding of application packages, including checking the integrity and authenticity of the packages, validating application rules and requirements and if necessary adjusting them to comply with operator policies, keeping a record of on-boarded packages, and preparing the VIM(s) 402 to handle the applications. The MEC-O 421 may select appropriate MEC host(s) 901 for application instantiation based on constraints, such as latency, available resources, and available services. The MEC-O 421 may also trigger application instantiation and termination, as well as trigger application relocation as needed and when supported.

The Operations Support System (OSS) 422 refers to the OSS of an operator that receives requests via the Customer Facing Service (CFS) portal 406 (and over the Mx1 reference point) and from UE applications 405 for instantiation or termination of MEC Apps 436, and decides on the granting of these requests. The CFS portal 406 (and the Mx1 interface) may be used by third-parties to request the MEC system 400 to run applications 406 in the MEC system 400. Granted requests may be forwarded to the MEC-O 421 for further processing. When supported, the OSS 422 also receives requests from UE applications 405 for relocating applications between external clouds and the MEC system 400. The Mm2 reference point between the OSS 422 and the MEC platform manager 431 is used for the MEC platform manager 431 configuration, fault and performance management. The Mm1 reference point between the MEC-O 421 and the OSS 422 is used for triggering the instantiation and the termination of multi-access edge applications 436 in the MEC system 400.

The UE app(s) 405 (also referred to as "device applications" or the like) is one or more applications running in a device, computing system, etc. (e.g., UE 420), that has the capability to interact with the MEC system 900 via the user application lifecycle management proxy 425. The UE app(s) 405 may be, include, or interact with one or more client applications, which in the context of MEC, is application software running on a device, computing system, etc. that utilizes functionality provided by one or more specific MEC application(s) 436. The user application lifecycle management proxy ("user app LCM proxy") 425 may authorize requests from UE applications 405 in the UE and interacts with the OSS 422 and the MEC-O 421 for further processing of these requests. The term "lifecycle management," in the context of MEC, refers to a set of functions required to manage the instantiation, maintenance and termination of a MEC application 436 instance. The user app LCM proxy 425 may interact with the OSS 422 via the Mm8 reference point, and is used to handle UE applications 405 requests for running applications in the MEC system 400. A user application 405 may be an MEC App 436 that is instantiated in the MEC system 400 in response to a request of a user via an application running in the UE 420 (e.g., UE application 405). The user app LCM proxy 425 allows UE applications 405 to request on-boarding, instantiation, termination of user applications and when supported, relocation of user applications in and out of the MEC system 400. It also allows informing the UE applications 405 about the state of the user applications 405. The user app LCM proxy 425 is only accessible from within the mobile network, and may only be available when supported by the MEC system 400. A UE application 405 may use the Mx2 reference point between the user app LCM proxy 425 and the UE application 405 to request the MEC system 400 to run an application in the MEC system 400, or to move an application in or out of the MEC system 400. The Mx2 reference point may only be accessible within the mobile network and may only be available when supported by the multi-access edge system.

In order to run an MEC App 436 in the MEC system 400, the MEC-O 421 receives requests triggered by the OSS 422, a third-party, or a UE application 405. In response to receipt of such requests, the MEC-O 421 selects a MEC server 136 to host the MEC App 436 for computational offloading. These requests may include information about the application to be run, and possibly other information, such as the location where the application needs to be active, other application rules and requirements, as well as the location of the application image if it is not yet on-boarded in the MEC system 400.

In various embodiments, the MEC-O 421 selects one or more MEC servers 136 for computational intensive tasks. The selected one or more MEC servers 136 may offload computational tasks of a UE application 405 based on various operational parameters, such as network capabilities and conditions, computational capabilities and conditions, application requirements, and/or other like operational parameters. The application requirements may be rules and requirements associated to/with one or more MEC Apps 436, such as deployment model of the application (e.g., whether it is one instance per user, one instance per host, one instance on each host, etc.); required virtualized resources (e.g., compute, storage, network resources, including specific hardware support); latency requirements (e.g., maximum latency, how strict the latency constraints are, latency fairness between users); requirements on location; multi-access edge services that are required and/or useful for the MEC Apps 436 to be able to run; multi-access edge services that the MEC Apps 436 can take advantage of, if available; connectivity or mobility support/requirements (e.g., application state relocation, application instance relocation); required multi-access edge features, such as VM relocation support or UE identity; required network connectivity (e.g., connectivity to applications within the multi-access edge system, connectivity to local networks, or to the Internet); information on the operator's MEC system deployment or mobile network deployment (e.g., topology, cost); requirements on access to user traffic; requirements on persistent storage; traffic rules 437b; DNS rules 437c; etc.

The MEC-O 421 considers the requirements and information listed above and information on the resources currently available in the MEC system 400 to select one or several MEC servers 136 within the MEC system 901 to host MEC Apps 436 and/or for computational offloading. After one or more MEC servers 136 are selected, the MEC-O 421 requests the selected MEC host(s) 901 to instantiate the application(s) or application tasks. The actual algorithm used to select the MEC servers 136 depends on the implementation, configuration, and/or operator deployment. In various embodiments, the selection algorithm may be based on the task offloading embodiments discussed herein, for example, by taking into account network, computational, and energy consumption requirements for performing tasks of application tasks, as well as network functionalities, processing, and offloading coding/encodings, or differentiating traffic between various RATs. Under certain circumstances (e.g., UE mobility events resulting in increased latency, load balancing decisions, etc.), and if supported, the MEC-O 421 may decide to select one or more new MEC servers 136 to act as a master node, and initiates the transfer of an application instance or application-related state information from the one or more source MEC servers 136 to the one or more target MEC servers 136.

In addition, the MEC system architecture 400 also provides support for applications. In the context of FIG. 4, the UE app 405 is an application instance running on a vehicle or vUE 420, and requesting V2X service to the system. MEC hosts 136 are co-located with edge infrastructure (e.g., RSUs 632a-c of FIG. 6) and communicate with each other through the Mp3 interface. The example of FIG. 4 also uses V2X Information Services (VIS) 452-1 and 452-1 (collectively referred to as "MEC VIS 452"). FIG. 4 is an example of application instances in a V2X service with MEC V2X API 451a and 451b (collectively referred to as "MEC V2X API 451"). In the framework of V2X services, a vehicle UE 420 is hosting a client application, and is connected to a certain MEC host 136 (and a related MEC App 436). In presence of multiple MEC host/server 136, the VIS 452 permits to expose information between MEC Apps 436 running on different MEC hosts 136. In addition, other remote application server instances can be located somewhere else (e.g., private clouds owned by the operator or by the OEM such as cloud 144). The VIS 452 may be produced by the MEC platform 437 or by the MEC Apps 436.

In particular, the VIS 452 permits information exposure, pertinent to the support of automotive use cases, to MEC application instances. VIS 452 also permits a single V2X/ITS operator to offer a V2X service(s) over a region that may span different countries and involve multiple network operators, MEC systems 400 and MEC apps 436 providers. For that purpose, the MEC VIS 452 includes the following functionalities.

In some aspects, the MEC platform 437 can include a MEC V2X API 451 and provide MEC VIS 452, which can include the following functionalities: (a) gathering of PC5 V2X relevant information from the 3GPP network for purposes of performing UE authorization for V2X communications (e.g., obtaining a list of V2X authorized UEs 420, obtaining relevant information about the authorization based on the UE subscription, and obtaining V2X configuration parameters such as a common set of V2X configuration parameters which can include PC5 configuration parameters); (b) exposure of the information obtained in (a) to MEC apps 436 in the same host or MEC apps in other MEC hosts; (c) enablement of MEC apps 436 to communicate securely with the V2X-related 3GPP core network logical functions (e.g., enabling communication between the MEC host and a V2X control function in the core network); (d) enablement of MEC apps 436 in different MEC systems 400 to communicate securely with each other; and (e) gathering and processing information available in other MEC APIs 453 (e.g., gathering and processing information obtained from a RNI API, Location API, WLAN API, and other APIs that may be implemented within the MEC platform 437) in order to predict radio network congestion, and provide suitable notifications to the UE 420.

From that perspective, the VIS 452 is relevant to Mp1 and Mp3 reference points in the MEC architecture 400. In particular, the relevant information is exposed to MEC apps 436 via the Mp1 reference point, and the Mp3 reference point may enable the possibility to transfer this information between different MEC platforms 437. The MEC V2X API 451 provides information to MEC apps 436 in a standardized way, which provides interoperability in multi-vendor scenarios. Nevertheless, MEC apps 436 may communicate in a direct way (e.g., without the use of MEC platform 437). Inter-system communication may be realized between MEC Orchestrators 421. As an alternative, or, in addition to that, possible Mp3 enhancements (or new reference points between MEC systems 400) may be defined.

In some aspects, the MEC host 2 in FIG. 4 can also implement a MEC V2X API 451-2, which can provide an interface to one or more of the apps instantiated within MEC host 2, such as MEC App 436-2b. In this regard, MEC host 1 and MEC host 2 can communicate with each other via the Mp3 interface as well as the MEC V2X APIs 451-1, 451-2. Additionally, one or more of the MEC apps 436-1 instantiated within MEC host 1 can communicate with one or more of the MEC apps 436-2 instantiated within MEC host 2 via the MEC V2X APIs 451-1, 451-2 as well as the Mp3 interface between the MEC host 1 and MEC host 2.

In some aspects, each of the MEC hosts 136 can be owned/managed by a different mobile services operator (while it can be operated directly by a MEC vendor or a third party). In some aspects, MEC apps 436 instantiated on MEC host 1 and MEC host 2 can be used to provide V2X-related services, and can be operated by the mobile services operator, by a MEC vendor, or by a third party (e.g., OEM, or OEM supplier, or system integrator).

In some aspects, the MEC V2X APIs 451 can be provided as a general middleware service, providing information gathered from vehicles and other V2X elements, and exposed as a service within the hosts (e.g., as a RESTful API) for the higher layers (e.g., the MEC apps instantiated within the hosts). In some aspects, the MEC V2X APIs 451 can be configured to gather information and data from sensors. In this regard, the deployment of the MEC V2X APIs 451 is ensuring continuity of the service across different mobile networks, for the same OEM (e.g., automobile manufacturer). If a standard implementation of a V2X API 451 is introduced (e.g., by ETSI MEC), this functionality can ensure the same basic V2X service characteristics for all OEMs in a 5G communication system with MEC functionalities.

In some aspects, MEC app 436a and MEC app 436b can use the corresponding MEC V2X APIs 451 to retrieve information from the 3GPP network. In some aspects, MEC apps 436 can be configured to host V2X configuration parameters such as PC5 configuration parameters (or a common set of V2X configuration parameters that can be available within a multi-PLMN communication environment). The availability of these V2X configuration parameters also in absence of network coverage is ensured by the usage of an Mp3 interface (or another type of interface) between the hosts. In some aspects, MEC app 436-1 can be configured to connect to MEC host 2 (through V2X MEC API 451-2 in MEC host 2), and MEC app 436-2 can be configured to connect to MEC host 1 (through V2X MEC API 451-1 in MEC host 1). In case of a multi-operator architecture, multiple MEC hosts can be configured to communicate with each other via the MEC V2X APIs 451 and synchronize in order to transfer the relevant V2X configuration parameters, so that they can be available across the multi-operator architecture in absence of cellular coverage (e.g., outside of the 3GPP domain). In this way, a UE 420 can have access to V2X configuration parameters even when the UE is not under coverage of its 3GPP network.

In some aspects, one or more ME apps within a MEC host 136 can be instantiated to perform functionalities of a V2X application function, which may include providing VIS 452. Additionally, MEC hosts can use MEC V2X APIs 451 to perform various V2X or VIS 452 functions. In particular, one or more ME apps can be instantiated within a MEC host to perform functionalities associated with a V2X application function. In some aspects, these ME apps can be configured to perform the following V2X application functions: obtaining V2X subscription information for a vUE 420, determining whether the vUE 420 is authorized to perform V2X communications in response to a request for V2X services, communicating V2X configuration parameters such as a common set of V2X configuration parameters, and so forth.

Figure 5:
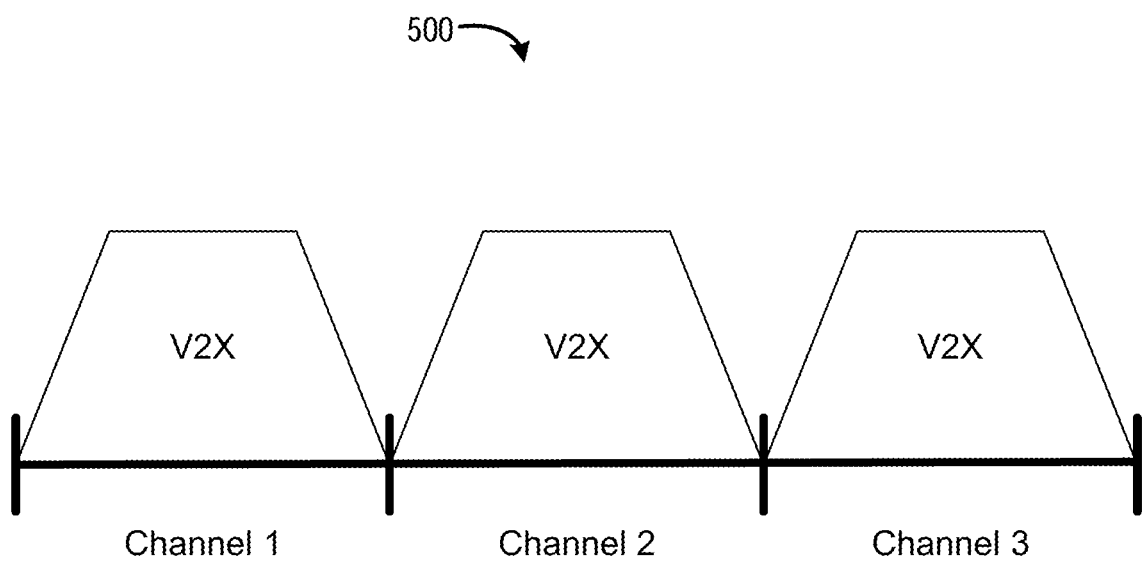
FIG. 5 illustrates an example of multiple channels available for vehicle-to-everything (V2X) communications according to an example embodiment.

FIG. 5 illustrates a scenario 500 having multiple channels available for V2X communications. As discussed herein, the present techniques address the problem of having multiple license-exempt V2X communication channels in the 5.9 GHz band, for example, three 10 MHz channels for safety related applications as is shown by FIG. 5.

As alluded to previously, at least two distinct V2X technologies (or V2X RATs) may need to coexist in the available channels. Although FIG. 5 shows three V2X channels, any applicable number of channels may be used for any number of V2X technologies. In an example, the at least two distinct V2X technologies include IEEE 802.11p based V2X technologies (e.g., DSRC for the U.S. and ITS-G5 for Europe) and 3GPP LTE C-V2X. These V2X technologies are not designed for interacting and coexisting with each other.

One coexistence approach is the "preferred channel" approach, which involves dynamically allocating a first channel (e.g., Channel 1 in FIG. 5) to be used exclusively by one V2X RAT (e.g., LTE C-V2X) and allocating a second channel (e.g., Channel 3 in FIG. 5) to be used exclusively by another V2X RAT (e.g., DSRC/ITS-G5). Another coexistence approach is the "co-channel existence" approach, which involves allocating both systems to a channel (e.g., Channel 2 in FIG. 5) during different time slots, for example, allocating the channel to be used by one V2X RAT (e.g., LTE C-V2X) during a first time period and allocating the channel to be used by another V2X RAT (e.g., DSRC/ITS-G5) during a second time period. However, operation of the at least two V2X technologies in the same channel (co-channel coexistence) has been shown to be highly inefficient. Furthermore, the need of spectral resources for any of the V2X technologies may vary considerably over a geographic area and time. For instance, some countries may introduce a particular V2X technology earlier than others, or in some areas vehicles are equipped with one V2X technology and other vehicles are equipped with a different V2X technology.

In this context, the present disclosure provides two alternative embodiments. In a first embodiment, edge infrastructure equipment (e.g., one or more RSUs 632a-c of FIG. 6) detect the type of V2X RAT(s) being used by vehicles (e.g., vUEs 61a-b of FIG. 6) in respective coverage areas. In this embodiment, the edge infrastructure equipment measure signaling taking place in its coverage area, and determines the number of vehicles using a first V2X RAT, the number of vehicles using a second V2X RAT, and so forth to the number of vehicles supporting an Nth V2X RAT where N is a number. For example, the edge infrastructure equipment may observe or measure sidelink communications originating from vehicles in their respective coverage areas, and the concerned edge infrastructure equipment may assume that any V2X RAT used by vehicles for sidelink communications should to be supported by the edge infrastructure equipment itself as well. This example is illustrated in scenario 700 of FIG. 7. Another example of the first embodiment is shown and described with respect to FIG. 8.

In a second embodiment, vehicles request support for a specific V2X technology/RAT. In this embodiment, the edge infrastructure equipment or the target cellular network that receive the requests elaborate on the request in order to properly configure the system, and acknowledge the request with a proper message to the vehicle. In an example, the vehicles traveling through the respective coverage areas may report the particular V2X RATs that they support in, for example, UE capability information during a registration or attachment procedure with a cellular network (e.g., CN 142 of FIG. 1), and the edge infrastructure equipment may obtain this information from the cellular network. An example of the second embodiment is shown and described with respect to FIG. 9.

In either embodiment, in order to share configuration information regarding V2X RAT support and/or resource allocations, the edge infrastructure equipment interact with neighboring edge infrastructure equipment (e.g., either directly or via edge servers), cellular network(s) (e.g., CN 142 of FIG. 1), and/or a cloud computing service (e.g., cloud 144 of FIG. 1).

In either the first embodiment or the second embodiment, the edge infrastructure equipment may only support the V2X RATs that are locally needed. For example, if there are only DSRC/ITS-G5 vUEs locally on the road, then the edge infrastructure equipment will be configured to only provide/support DSRC/ITS-G5 resources. In another example, if there are only LTE C-V2X vUEs locally on the road, then the edge infrastructure equipment will be configured to only provide/support C-V2X resources. In either embodiment, if there are vUEs that support different V2X RATs on the road (e.g. one or more vUEs supporting DSRC/ITS-G5, and at least one other vUE supporting LTE C-V2X), then then the edge infrastructure equipment will be configured to provide/support each of the V2X RATs in proportion to the amount of resources need to accommodate the communications using the different V2X RATs. For example, the support for each V2X RAT may be based on or according to the number of vUEs supporting each V2X RAT.

Figure 6:
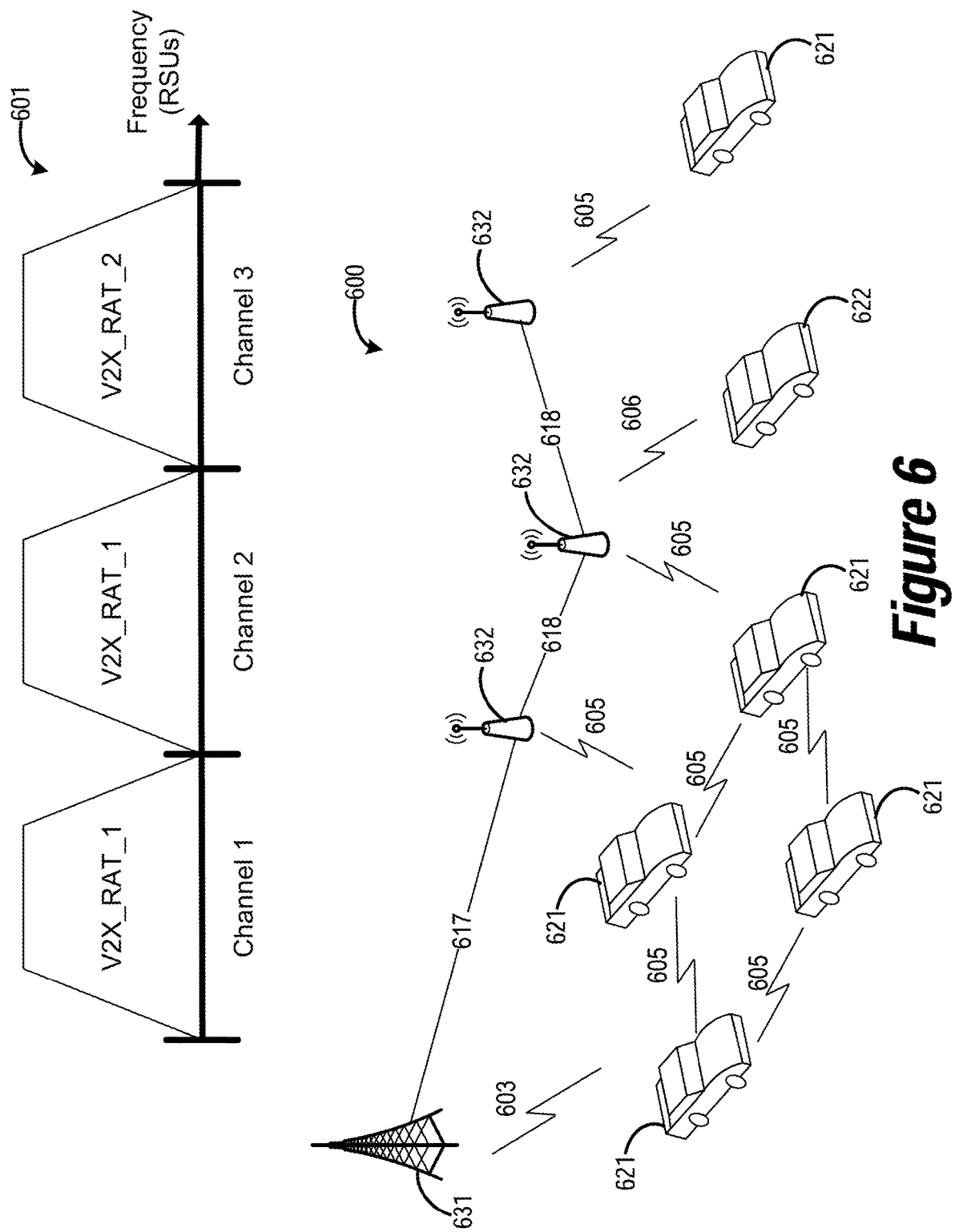
FIGS. 6-9 illustrate various scenarios for configuring infrastructure equipment to support/provide applicable V2X radio access technology (RAT) resource allocations according to an example embodiment.

FIG. 6 depicts a mixed V2X RAT scenario 600, which includes an example V2X resource configuration 601, according to various embodiments. Scenario 600 is applicable to both of the first and second embodiments discussed previously. Scenario 600 involves vUEs 621 and 622, which may be the same or similar as vUE 121a of FIG. 1 and/or UE 420 of FIG. 4; sidelink channels 605, 606, which may be the same or similar as the sidelink channel 105 of FIG. 1; RAN node 631, which may be the same or similar as RAN node 131 of FIG. 1; and RSUs 632, which may be the same or similar as ANs 132 of FIG. 1.

Scenario 600 depicted by FIG. 6 shows a use case having a majority of vUEs 621 that are equipped to communicate according to a first V2X RAT and a single vUE 622 that is equipped to communicate according to a second V2X RAT. Additionally, the RSUs 632 may be configured to provide first V2X RAT communication services or a second V2X RAT communication services. As an example, the first V2X RAT is LTE C-V2X and the second V2X RAT is DSRC/ITS-G5.

According to various embodiments, an integrated circuit (IC) for managing vUEs 621,622 communications comprises interface circuitry arranged to couple the IC to one or more RSUs 632 and/or RAN node 631, each RSU 632 and/or RAN node 631 are arranged to communicate with one or more vUEs 621,622 traveling through respective coverage areas of the one or more RSU 632 and/or RAN node 631. The IC also comprises processor circuitry coupled with the interface circuitry, where the processor circuitry is arranged to: determine a first number of first vUEs 621 and a second number of second vUEs 622 to be, or are being, served in the respective coverage areas of the RAN node 631 and/or RSUs 632 during respective service periods (or time periods); determines V2X RATs to be supported during the respective service periods (or time periods); and allocates communication resources based on the determined resource allocations. This may include determining and allocating individual channels (or portions thereof) to be used for providing first V2X RAT communication services to the first vUEs 621 based on the first number of vUEs 621 during a first service period (or time period), and determining and allocating individual channels to be used for second V2X RAT communication services to the second vUEs 622 based on the second number of vUEs 622 during a second service period (or time period). In some embodiments, the determined V2X configuration and/or resource allocation (e.g., resource allocation 601) may be communicated among the RAN node 631 and/or RSUs 632 to configure the RAN node 631 and/or RSUs 632 to provide the V2X RAT services during the service period (or time period). In scenario 600, the RSUs 632 will be configured to support a majority of first V2X RAT channels and a smaller portion of second V2X RAT channels toward the vUEs 621, 622. This is shown by the resource configuration 601, which allocates channel 1 and channel 2 to be used for first V2X RAT communications ("V2X_RAT_1" in FIG. 6) and channel 3 to be used for second V2X RAT communications ("V2X_RAT_2" in FIG. 6). In some embodiments, the RSUs 632 and/or the RAN node 631 are equipped with translation capabilities, and provide messages translations among the vUEs 621, 622. In these embodiments, the IC may be implemented in, or hosted by, the RAN node 631, one of the RSUs 632, one or more co-located edge servers (e.g., MEC servers 136), a cloud computing service (e.g., cloud 144 of FIG. 1), a core network NF (e.g., an NF within CN 142 of FIG. 1), and/or the like.

Additionally or alternatively, the processor circuitry of the IC is arranged to: identify a first group of vUEs (e.g., vUEs 621) and a second group of vUEs (e.g., vUEs 622) to be, or are being, served in the respective coverage areas of the RAN node 631 and/or RSUs 632 during respective service periods (or time periods). The identification of the vUE groups may be based on one or more criteria/qualifications (e.g., the type of V2X RATs being used by the vUEs and/or other vUE capabilities). The processor circuitry of the IC is also arranged to allocate communication resources between the first and second groups of vUEs during the respective service periods (or time periods). The allocation of resources may be the same or similar as discussed previously.

In addition, one or more links 617 are established between the RAN node 631 and the RSUs 632, and links 603 are used to serve some first V2X RAT vUEs 621 that are relatively close to the RAN node 631 for better coverage (e.g., in a different band) than that provided to vUEs 621 further away from the RAN node 631. The RSUs 632 are connected together through respective links 618 that permit the communication between individual RSUs 632. In some embodiments, the links 618 among the RSUs 632 may be kept active. The links 617, 618 may be wired or wireless links. Additionally, direct device-to-device (D2D) links 605 (also referred to as "sidelinks 605") can be established among the majority of first V2X RAT vUEs 621 including those not being directly served by the RAN node 631. Moreover, the second V2X RAT vUE 622 use the smaller portion of second V2X RAT channels.

In a first example where the first V2X RAT is LTE C-V2X, the links 603 and 617 may be LTE (or NR) Uu interface channels, and the sidelinks 605 may be LTE (or NR) PC5 interface channels. In a second example where the first V2X RAT is LTE C-V2X, the links 603 is/are LTE (or NR) Uu interface channels, the sidelinks 605 may be LTE (or NR) PC5 interface channels, and the links 617 is/are S1 Application Protocol (S1-AP) interfaces for LTE implementations, NG Application Protocol (NG-AP) interface for 5G/NR implementations, or Mp3 interfaces for MEC implementations.

In a third example, which may be combined with the first example or the second example discussed previously, the links 618 between the RSUs 632 are wired links and may be or represent S1-AP interfaces in LTE implementations, NG-AP interfaces in 5G/NR implementations, Mp3 interfaces for MEC implementations, and/or the like. In the first, second, and third examples, any of the aforementioned interfaces may operate on top of one or more existing network technologies such as Ethernet, fiber optic, and/or the like.

In a fourth example, which may be combined with the first example or the second example discussed previously, the links 618 between the RSUs 632 are wireless links and may be or represent wireless S1-AP interfaces when the RSUs 632 are relay nodes in LTE implementations, wireless backhaul links when the RSUs 632 are Integrated Access and Backhaul (IAB) nodes in 5G/NR IAB implementations, WLAN and/or DSRC wireless links in DSRC/ITS-G5 implementations, and/or the like. In any of the aforementioned examples, the second V2X RAT is DSRC/ITS-G5 and link 606 is a DSRC link.

In some embodiments, the edge infrastructure equipment (e.g., RAN node 631, RSUs 632, and/or co-located MEC servers 136) (re)configure themselves to support a particular V2X RAT or to provide communication services to vUEs 621, 622, and enforce corresponding reconfiguration of neighboring edge infrastructure equipment. In some embodiments, each edge infrastructure equipment is responsible for reconfiguring itself according to the shared configuration information, and coordinates the allocation of radio frequency resources with one another according to the configured V2X RAT. In some embodiments, an individual edge infrastructure equipment may project or predict the time period during which the individual and/or neighboring edge infrastructure equipment should be configured with the appropriate V2X RAT based on, for example, signal sampling, historical data of vUEs 621, 622 traveling through respective coverage areas during a sample period, and/or using other methods.

In some embodiments, the edge infrastructure equipment may directly transmit the configuration information and/or resource allocation to neighboring edge infrastructure equipment via direct wired or wireless links 617, 618 using known signaling/messages. In some embodiments, the RAN node 631 and/or RSUs 632 are co-located with a MEC server 136 (not shown by FIG. 6) and exposes information regarding the V2X RAT configuration to locally applicable edge infrastructure equipment through a V2X API 451. As a consequence, MEC Apps 436 (running on certain MEC servers 136) may exchange information by gathering information from their respective local MEC platforms 437 or from other MEC platforms 437 through the Mp3 interface), and exchange this information through suitable messaging/signaling (see e.g., FIGS. 10-11 discussed infra). In some embodiments, a particular MEC App 436 may determine the type of V2X RAT that should be configured, and may configure its co-located RAN node 631 and/or RSUs 632 with that V2X RAT.

In some embodiments, some or all of the aforementioned functions may be performed by other elements or entities. For example, in one embodiment, the RAN node 631 and/or RSUs 632 may measure or detect the signaling taking place in their respective coverage areas, and may provide measurement and/or detection information to a cloud computing system (e.g., cloud 144 of FIG. 1), which configures the RAN node 631 and/or RSUs 632 to provide/support particular V2X RATs for a given service period (or time period).

Figure 12:
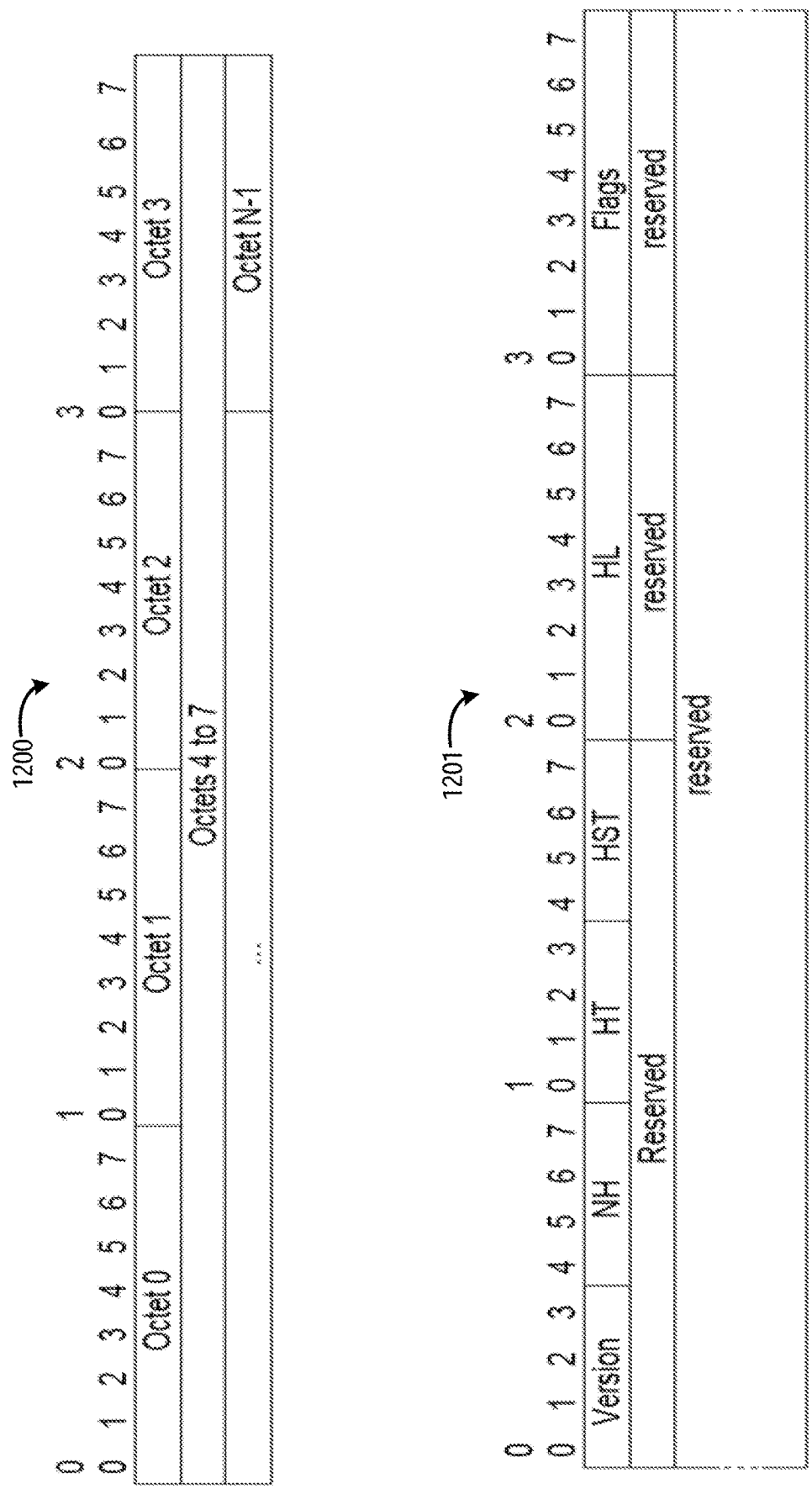
FIG. 12 illustrates a basic convention for the specification of packet formats and a basic convention for the header format for a packet according to an example embodiment.

In some embodiments, the message format for edge infrastructure to communicate (re)configuration information and/or resource allocations to locally applicable edge infrastructure equipment may be proprietary and not subjected to standardization. Alternatively, information made available to applications through the MEC V2X API 451 may be standardized in order to enable interoperability among different systems. An example of the data/information included in these messages for either embodiment, may include one or more of: the number of total channels available by the edge infrastructure equipment (or by the set of RAN nodes 631 and/or RSUs 632 associated to that MEC platform 437); for each edge infrastructure equipment, bandwidth and frequency carrier of each channel and respective preferred usage; for each edge infrastructure equipment: the number of vehicles supporting the first V2X RAT, the number of vehicles supporting the second V2X RAT, and so forth to the number of vehicles supporting an Nth V2X RAT where N is a number; and/or an average time period of the previous measurements. Example message formats are shown by FIG. 12 discussed infra.

Other configurations and variations of the edge infrastructure and frequency channel configuration 601 for RAN nodes 631 and/or RSUs 632 are possible depending on the particular infrastructure deployment, use case(s), and other factors. Such variations may include scenarios such as:

(1) There are only second V2X RAT (e.g., DSRC/ITS-G5) vUEs 622 locally on the road or in a particular coverage area (or set of coverage areas). Here, the infrastructure equipment may be configured to support only the second V2X RAT towards the vUEs 622; in addition, wireless/wired links 617 are established between RSUs 632 and the RAN node 631, wireless/wired links 618 among all other RSUs 632 are always kept active, and direct second V2X RAT links 606 (e.g., DSRC links 606) can be established among all vUEs 622.

(2) There are only first V2X RAT (e.g., LTE C-V2X) vUEs 621 locally on the road. Here, the infrastructure equipment may be configured to support only the first V2X RAT towards the vUEs 621; in addition, wireless/wired links 617 are established between RSUs 632 and the RAN node 631, and also potentially serving first V2X RAT vUEs 621 for better coverage (in a different band); wired/wireless links 618 among all RSUs 632 are always kept active; and direct first V2X RAT links 606 (e.g., PC5 links 605) can be established among all vUEs 621.

(3) There is a majority of second V2X RAT (e.g., DSRC/ITS-G5) vUEs 622 locally on the road. Here, the infrastructure equipment may be configured to support a majority of second V2X RAT channels and a smaller portion of first V2X RAT (e.g., LTE C-V2X) channels toward the vUEs 621; in addition, wireless/wired links 617 are established between RSUs 632 and the RAN node 631, which also serves first V2X RAT vUEs 621 (in a different band); wired/wireless links 618 among all other RSUs 632 are always kept active; and direct second V2X RAT links 606 can be established among the majority of second V2X RAT vUEs 622 (DSRC/ITS-G5), while the other few remaining cars will use the smaller portion of first V2X RAT channels. Additionally, the infrastructure equipment will be equipped with translation capabilities, and will provide messages translations among the vUEs 621 and 622.

More generally, in the case of a more balanced mix of first and second V2X RAT vUEs 621/622 locally on the road, the infrastructure equipment may be configured (e.g., semi-statically) in order to accommodate the bandwidth needs for all vUEs 621, 622. In these embodiments, the infrastructure equipment may implement a known frequency channel planning algorithm for dynamic channel allocation.

Figure 7:
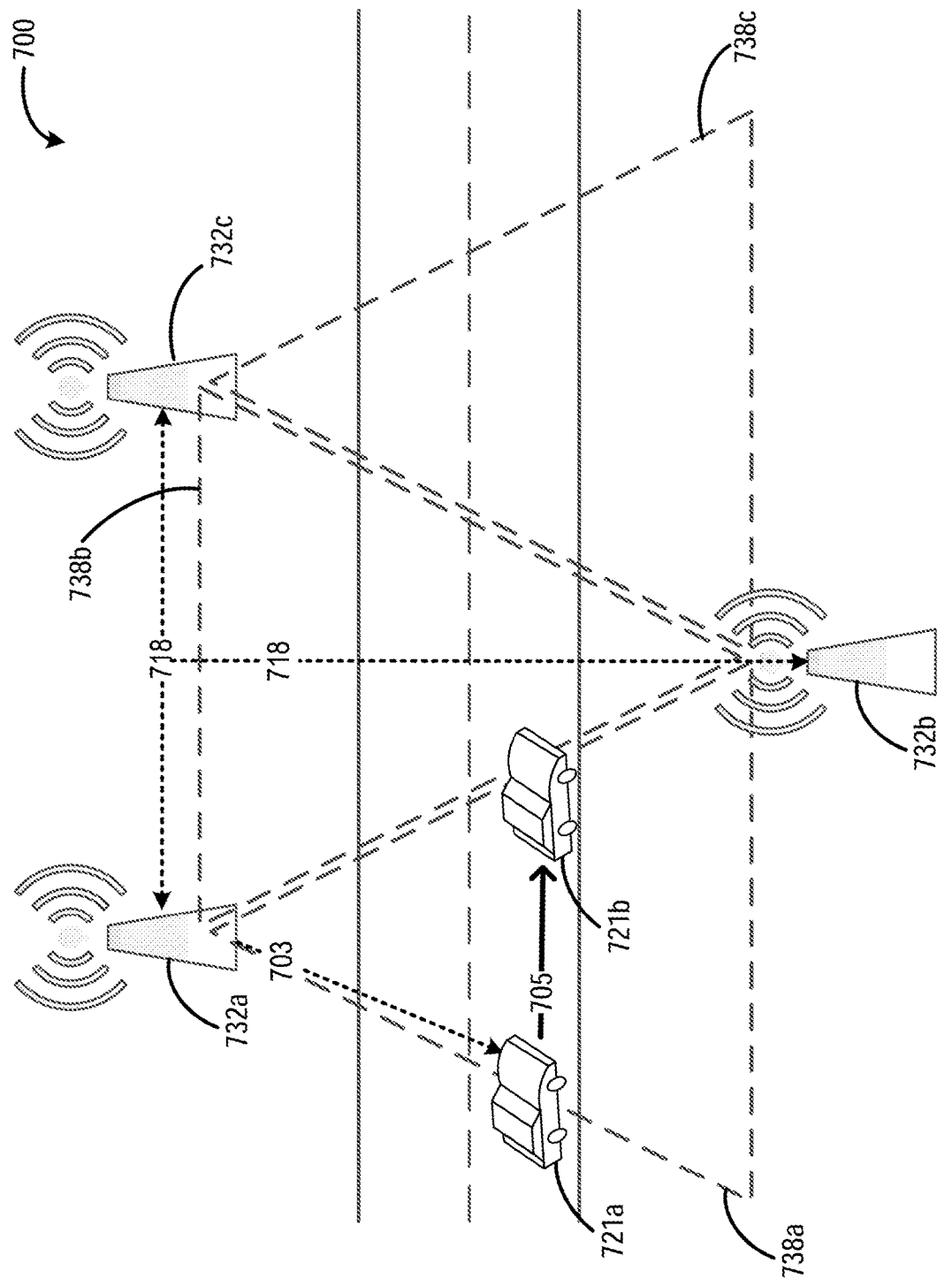

Referring now to FIG. 7, which illustrates a scenario 700 involving interactions between edge infrastructure equipment according to the first embodiment. Scenario 700 involves a sidelink communication being transmitted over a sidelink channel 705 originating from vUE 721a and terminating at vUE 721b. The vUEs 721a-b may be the same or similar to the vUE 621, 622 of FIG. 6; the sidelink channel 705 may be the same or similar as the sidelink channels 605, 606 of FIG. 6; and the RSUs 732a-c may be the same or similar as the RSUs 632 of FIG. 6. The RSUs 732a-c are communicatively coupled via links 718, which may be the same or similar as links 618 of FIG. 6.

In scenario 700, the RSUs 732a-c may be configured to provide first V2X RAT communication services or a second V2X RAT communication services in respective coverage areas 738a, 738b, and 738c. According to various embodiments, at least one of the RSUs 732a-c observes the presence of the sidelink communications taking place over sidelink 705, determines the particular type of V2X RAT being used for the sidelink communication, reconfigures itself to support the particular V2X RAT or to provide communication services to vUEs 721a-b using the detected V2X RAT, and enforces corresponding reconfiguration of neighboring RSUs 732a-c. In some embodiments, the observation of communications taking place in the coverage areas 738 may include capturing or otherwise obtaining messages being communicated by the vUEs 721, and determine the V2X RAT being used based on the header (or particular data included in the header) of such messages. In these embodiments, the RSUs 732a-c may then count the number of messages including first V2X RAT headers, the number of messages including second V2X RAT headers, and so forth to the number of messages including Nth V2X RAT headers. Based on the number of messages from each V2X RAT, the RSUs 732a-c can decide whether to support a particular V2X RAT and/or the proportion of resources to allocate to each V2X RAT.

In the example of FIG. 7, the vUEs 721a and 721b are capable of communicating using the first V2X RAT (e.g., LTE C-V2X), and the RSUs 732a-c are initially configured to provide second V2X RAT (e.g., DSRC/ITS-G5) services/resources. The RSU 732a determines that the sidelink communication over link 705 is taking place using the first V2X RAT (e.g., LTE C-V2X), reconfigures itself to provide first V2X RAT resources/services, and communicates this configuration information to the RSUs 732b and 732c. Then, the RSUs 732b and 732c reconfigure themselves to provide first V2X RAT resources/services.

Figure 8:
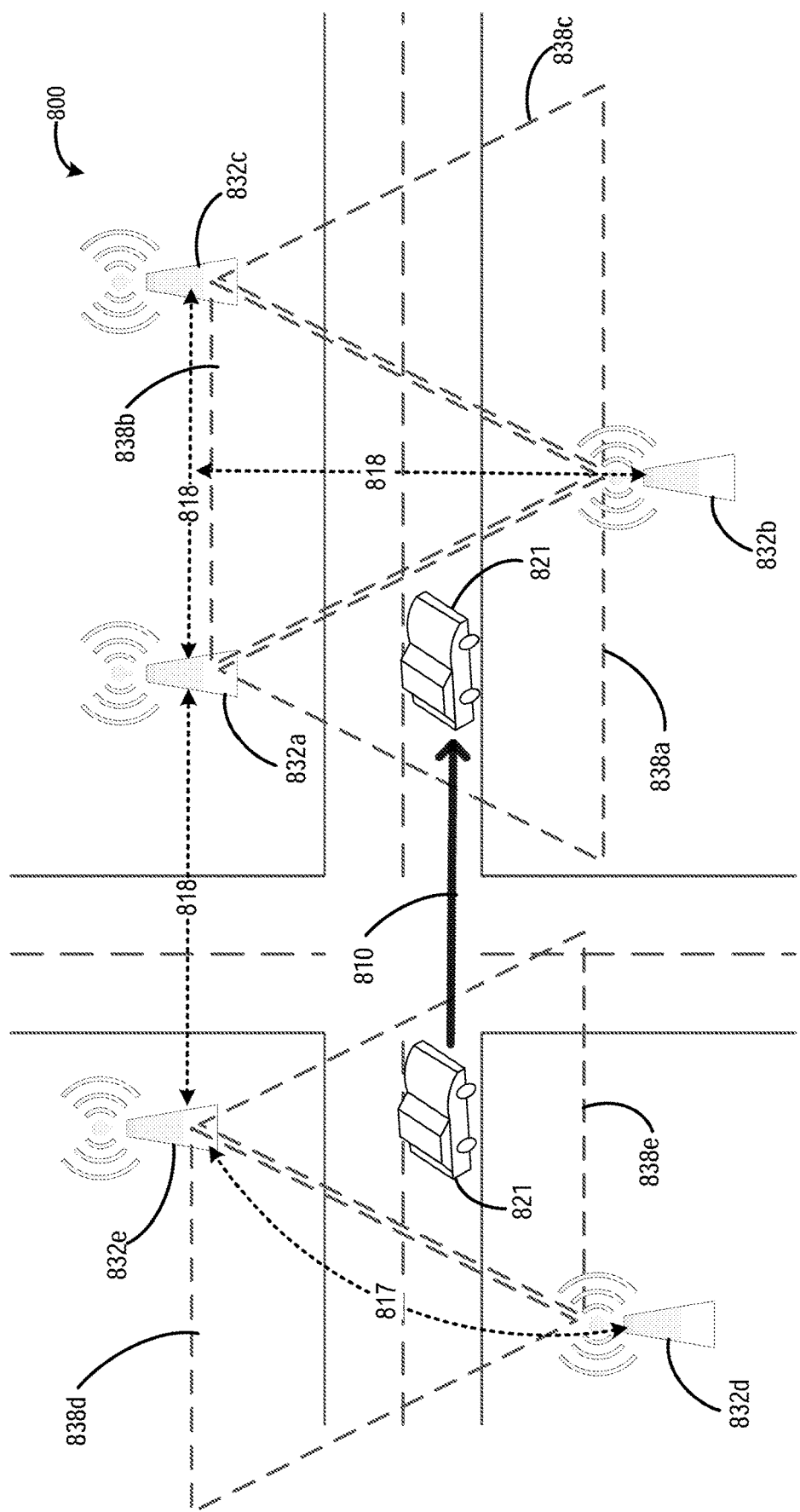

FIG. 8 illustrates a scenario 800, which is an example interaction of edge infrastructure equipment according to the first embodiment. In particular, the first embodiment involves the infrastructure equipment (e.g., RSUs, RAN nodes, etc.) detecting the type(s) of V2X RAT resources/services that need to be supported in a designated area. Scenario 800 involves vUEs 821, which may be the same or similar as vUEs 721a and 721b of FIG. 7; RSUs 832a, 832b, and 832c, which may be the same or similar as RSUs 732a, 732b, and 732c of FIG. 7, respectively; and coverage areas 838a, 838b, and 838c, which may be the same or similar as coverage areas 738a, 738b, and 738c of FIG. 7, respectively. Scenario 800 also involves RSU 832d providing coverage area 838d and involves RSU 832e providing coverage area 838e. The RSUs 832d-e may be the same or similar as RSUs 832a-c, and coverage areas 838d-e may be the same or similar as coverage areas 838a-c. The RSUs 832a-e are communicatively coupled via links 818, which may be the same or similar as links 718 of FIG. 7.

In this scenario, RSUs 832a-c are initially configured to provide second V2X (e.g., DSRC/ITS-G5) services/resources, and RSUs 832d and 832e are initially configured to provide both second V2X (e.g., DSRC/ITS-G5) services/resources and the first V2X (e.g., LTE CV2X) services/resources. Next, RSU 832e determines that the first V2X RAT capable vUE 821 is moving into an area that is not yet providing first V2X RAT services/resources (as indicated by arrow 810 in FIG. 8), and informs neighboring RSUs 832a-c over respective links 818 about the requirement of supporting first V2X RAT services/resources for vUE 821, which will arrive in their coverage areas 838b-c soon. Similar to the scenario 700 of FIG. 7, the neighboring RSUs 832a-c will reconfigure themselves to support/provide first V2X RAT services/resources.

As alluded to previously, the initial step is the sensing of vehicles 821 in a coverage area 838 by an RSU 832. Several cases may occur and should be properly managed by the system by means of a proper edge infrastructure and suitable frequency channel configuration for RSUs 832 (depending on the use case, such as those discussed previously).

Figure 9:
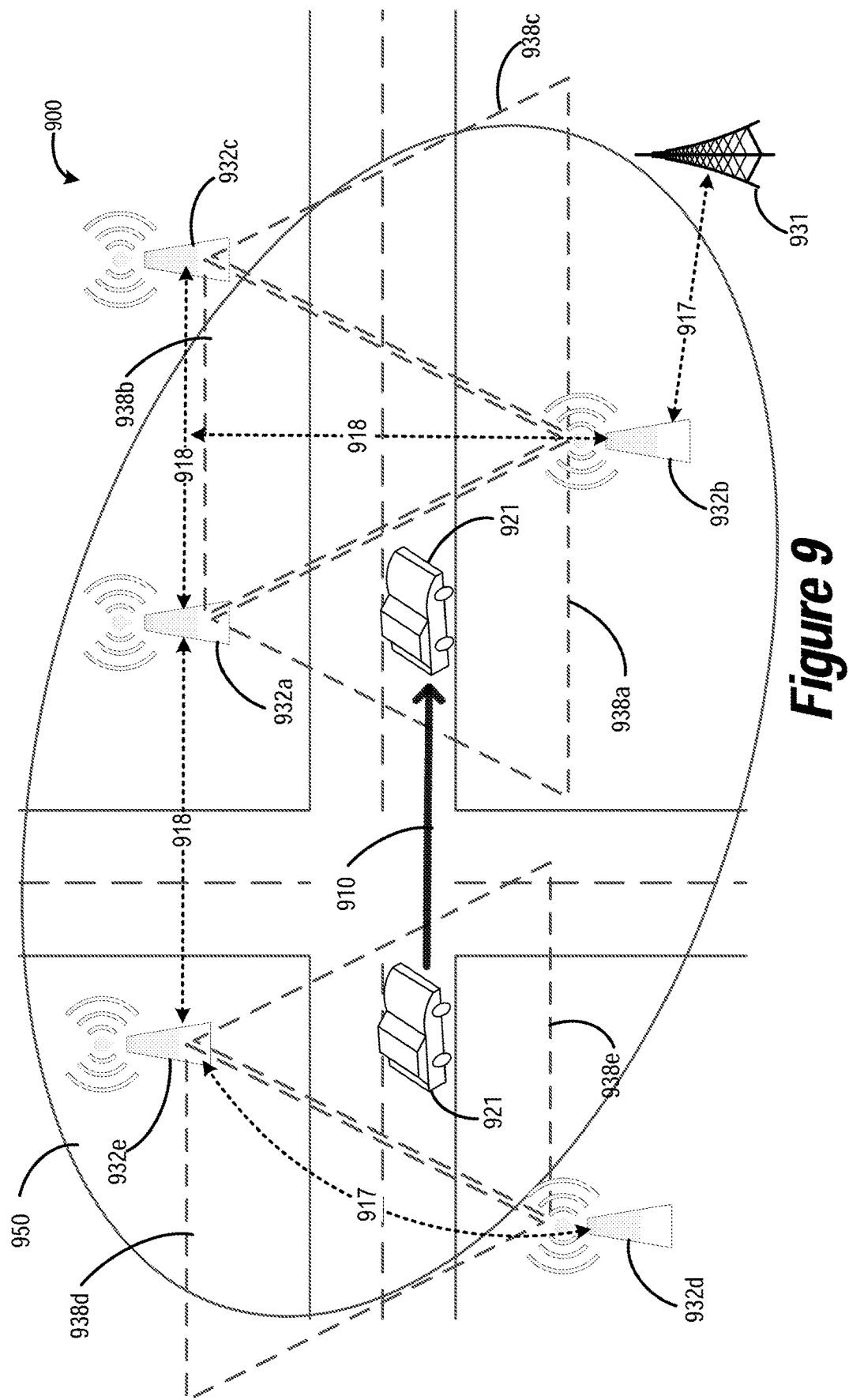

FIG. 9 depicts a scenario 900 according to the second embodiment. In particular, the second embodiment involves vUEs 921 requesting particular V2X RAT(s) to be supported. Scenario 900 involves vUEs 921, which may be the same or similar as vUEs 821 of FIG. 8; RSUs 932a, 932b, 932c, 932d, and 932e, which may be the same or similar as RSUs 832a, 832b, 832c, 832d, and 832e of FIG. 8, respectively; and coverage areas 938a, 938b, 938c, 938d, and 938e, which may be the same or similar as coverage areas 838a, 838b, 838c, 838d, and 838e of FIG. 8, respectively. The RSUs 932a-e are communicatively coupled with one another via links 918, which may be the same or similar as links 818 of FIG. 8. Scenario 900 also involves a RAN node 931, which may be the same or similar as RAN node 631 of FIG. 6, providing a coverage area 950 (or "cell 950"). The RSUs 932a-e are communicatively coupled with RAN node 931 via links 917 (not all of which are shown by FIG. 9), which may be the same or similar as links 617 of FIG. 6.

In scenario 900, the RSUs 932d-e are configured to support a first V2X RAT (e.g., LTE-C V2X) and a second V2X RAT (e.g., DSRC/ITS-G5). However, the vUE 921 supporting the first V2X RAT (e.g., LTE-C V2X) discovers (e.g., through scanning of the appropriate first V2X RAT channels (e.g., in the 5.9 GHz band)) that the first V2X RAT is currently not being served by the RSUs 931a-c. In the second embodiment, vUE 921 employs a communications link/connection to the RAN node 931, whose coverage area 950 is a much larger area than the coverage areas 938a-e provided by the RSUs 932a-e. As an example, this communications link/connection may be an LTE Uu connection when the RAN node 931 is an eNB and/or when the first V2X RAT is LTE C-V2X. As another example, this communications link/connection may be an NR Uu connection when the RAN node 931 is an gNB or an ng-eNB. As another example, this communications link/connection may be an LTE Uu connection when the RAN node 931 is an WiFi AP and/or when the first V2X RAT is DSRC/ITS-G5.

The vUE 921 uses the communications link/connection with the RAN node 931 to request local support of the first V2X RAT. The RAN node 931 receives the request, processes the request, and sends a corresponding acknowledgement (ACK) or negative ACK (NACK) message back to the vUE 921. If the request is acknowledged (e.g., using the ACK message), a channel number and/or other like information is communicated back to the requesting vUE 921 in the ACK message. Additionally, the RAN node 931 sends a configuration message to the RSUs 932a-c to reconfigure the RSUs 932a-c to provide first V2X RAT resources/services, and the RSUs 932a-c will reconfigure themselves to support the channel indicated by the ACK message.

In the aforementioned example, the request is performed by the vUE 921 through the cellular network. In another example, the vUE 921 may transmit or broadcast the request message to one or more RSUs 932a-e, and an RSU 932a-e that receives the request message may forward the request message to the RAN node 931 via respective links 918, 917. In another example, the vUE 921 may only support the second V2X RAT (e.g., DSRC/ITS-G5), and may transmit or broadcast the request message to an RSU 932a-e. The RSU 932a-e receives the request, elaborates on the request in order to properly configure the system, and acknowledges the request with a proper ACK message sent to the vUE 921.

Figure 11:
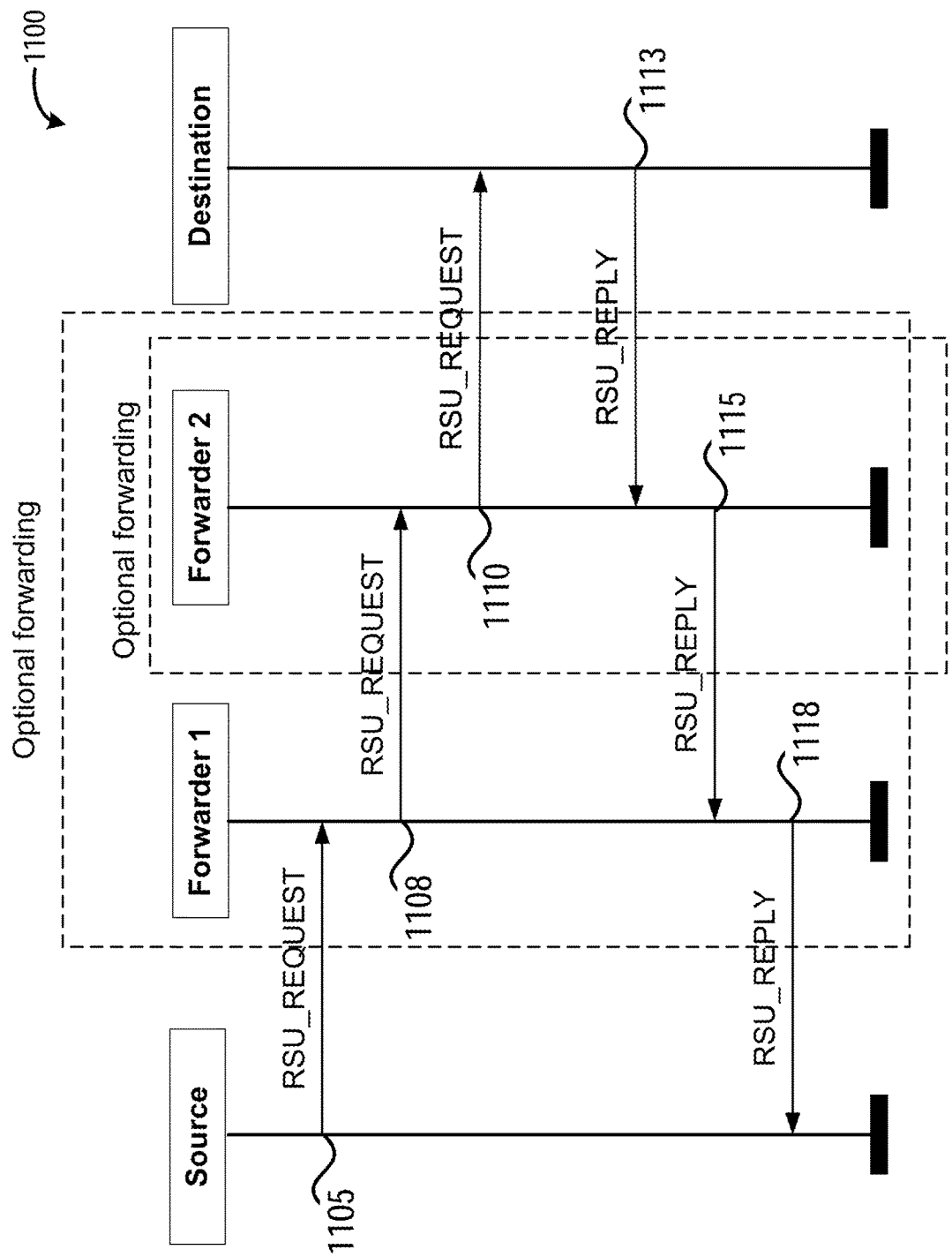
FIG. 11 illustrates an example V2X message forwarding procedure according to an example embodiment.

In an example, a message format used in scenarios 600-900 includes the convention for packet definition discussed by ETSI TS 102 636-4-1 V1.1.1 (2011-06). Example message formats for this purpose are shown by FIG. 12. The messages may be exchanged directly between vehicles and/or RSUs or through intermediate relay stations (or relays) as illustrated by FIG. 11.

Figure 10:
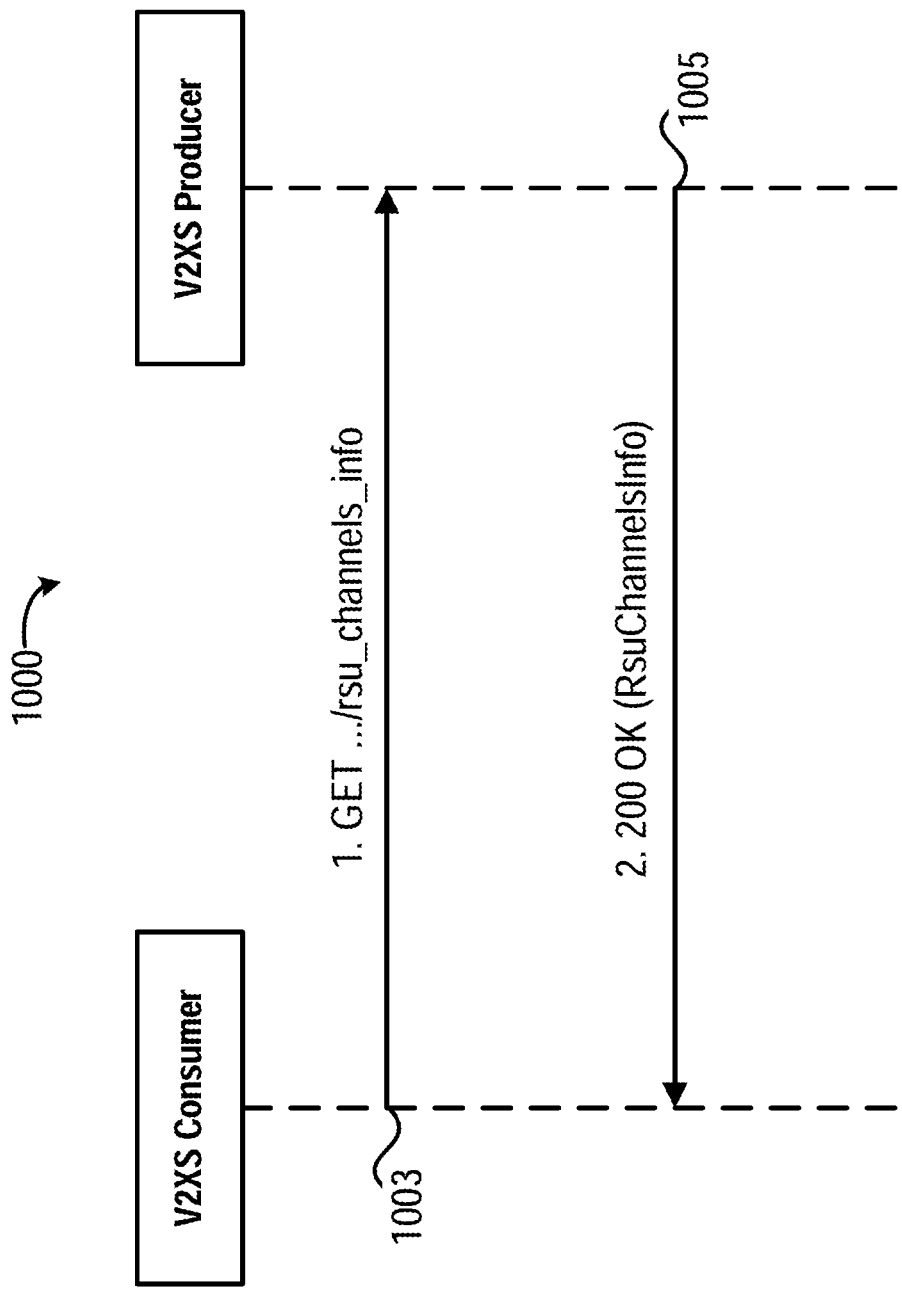
FIG. 10 illustrates a V2X service procedure according to an example embodiment.

FIG. 10 illustrates a V2X Service (V2XS) procedure 1000 according to various embodiments, wherein a V2XS consumer requests configuration and/or resource allocations (also referred to as "RSU channel usage information") from a V2XS producer. In embodiments, the V2XS consumer may be one of the RAN node 631 and/or RSUs 632 of FIG. 6, the RSUs 732a-c of FIG. 7, RSUs 832a-e of FIG. 8, or the RAN node 931 and/or RSUs 932a-e of FIG. 9; and the V2XS producer may be a different one of the aforementioned RAN node(s) or RSUs. From the V2XS consumer's perspective, the V2XS producer is a resource representing the RSU channel usage information.

Procedure 1000 begins at operation 1003 where the V2XS consumer sends a request message to the V2XS producer. In one embodiment, the request message may be an HTTP GET message with the request line "GET ../rsu_channels_info" or the like. Additionally, the request includes a MEC App 436 instance identifier (ID) as an input parameter, which may be included in a message body of the request message. At operation 1005, the V2XS producer responds with the message body containing the RSU channel usage information. In one embodiment, the response message is an HTTP response message including the status code "200 OK" in the header of the HTTP message, which indicates that the V2XS consumer's request succeeded. Additionally, the requested RSU channel usage information ("RsuChannelsInfo") is included in the body of the HTTP response message. In this embodiment, the HTTP response message may include other HTTP status codes, such as a bad request status code (400) (e.g., when incorrect parameters are passed in the request), a not found status code (404) (e.g., when a Universal Resource Indicator (URI) provided in the request cannot be mapped to a valid resource URI), a forbidden status code (403) (e.g., when the operation is not allowed given the current status of the resource), and/or other like HTTP status codes. In the aforementioned examples, the response body may include a ProblemDetails data type indicating/including information about the particular error. Other message formats may be used in other embodiments, and the request/response data may be located in the header or body portion of such messages.

After the detection, the edge infrastructure (e.g., individual RSUs 732a-c and/or individual MEC hosts 135) interacts with neighboring edge infrastructure (e.g., individual RSUs 732a-c) in order to share configuration information on its V2X RAT support. In such embodiments, the edge infrastructure (e.g., individual RSUs 732a-c and/or individual MEC hosts 135) covering a current coverage area 738a-c will inform neighboring edge infrastructure (e.g., individual RSUs 732a-c and/or individual MEC hosts 135) entities about an upcoming need for supporting a certain V2X RAT(s). This should include a message indicating the need for a certain V2X RAT(s) and a proposal (or instructions/commands) for a frequency band allocation between the V2X RAT(s).

In some embodiments, the message format for edge infrastructure (e.g., individual RSUs 732a-c and/or individual MEC hosts 135) to communicate reconfiguration (e.g., support of one or more V2X RAT(s)) to other applicable edge infrastructure (e.g., individual RSUs 732a-c and/or individual MEC hosts 135) is not subjected to standardization. Instead, in such embodiments, the MEC Apps 436 register to MEC services 437 running on other MEC hosts, and retrieve the suitable information through MEC V2X API. This registration mechanism may be the same or similar to the registration mechanism discussed in European Telecommunications Standards Institute (ETSI) Industry Group Specification (ISG) MEC 011 v1.1.1 (2017-07).

FIG. 11 illustrates a forwarding procedure 1100 according to various embodiments. Procedure 1100 may be used to exchange messages directly between vUEs and infrastructure equipment, or through intermediate forwarders. In particular, procedure 1100 shows request and reply message forwarding between a source and destination via two forwarders. The source is an sending (transmitting) entity that originates a message or packet. The destination is a receiver entity that processes a message or packet and delivers it to upper protocol entities, but does not relay the message or packet to other entities. The forwarders (including forwarder 1 and forwarder 2 in FIG. 11) are entities that process a message or packet and relays the message or packet to other entities.

Procedure 1100 begins at operation 1105 where a source generates and sends a request message (RSU_REQUEST) to a first forwarder (forwarder 1). At operation 1108, forwarder 1 forwards the request message to a second forwarder (forwarder 2), and at operation 1110, forwarder 2 forwards the request message to the destination node. At operation 1113, the destination node generates and sends a reply message (RSU_REPLY) to forwarder 2. At operation 1115, forwarder 2 forwards the reply message to forwarder 2, and at operation 1118, forwarder 1 forwards the reply message to the source node.

In various embodiments, the source, destination, and forwarders may be vUEs or infrastructure equipment such as those discussed previously with respect to FIGS. 1-9.

In a first example, the source node is a vUE, and the forwarders and destination node are RSUs. In this example, the request message is a V2X message intended for another vUE and is transmitted using a particular type of V2X RAT. This request message is captured or otherwise obtained by the forwarder 1, forwarded to forwarder 2, and then the destination node. The destination node uses the captured message, to determine the type of V2X RAT being used by the vUEs and determines an appropriate V2X RAT configuration for all of the RSUs. In this example, the reply message may be an ACK message to acknowledge the request message, or no reply message is sent at operations 1113-1118.

In a second example, the source node is a vUE, and the forwarders and destination node are RSUs. In this example, the request message is or includes a request for support of a particular type of V2X RAT. This request message is captured or otherwise obtained by the forwarder 1, forwarded to forwarder 2, and then the destination node. The destination node uses the request message (along with other request messages from other vUEs) to determine an appropriate V2X RAT configuration for all of the RSUs. In this example, the reply message is an ACK message to acknowledge the request message.

In a third example, the source node, the forwarders, and destination node are RSUs. In this example, the request message is or includes a request for a V2X configuration and/or a resource allocation, and the reply message is or includes the requested configuration or resource allocation.

In some implementations, the source, destination, and forwarders may be, or may implement GeoAdhoc routers. GeoAdhoc routers are ad hoc routers that implements the GeoNetworking (GN) protocol as discussed by ETSI TS 102 636-4-1 V1.1.1 (2011-06). In these implementations, the request and reply messages are GN packets or protocol data units (PDUs). The GN protocol is a network protocol that resides in the ITS network and transport layer (discussed by ETSI EN 302 665) and is executed in an ad hoc router, such as the GeoAdhoc router. The GeoNetworking protocol provides the transport of packets in the ITS ad hoc network as discussed by ETSI TS 102 636-1, ETSI TS 102 636-2, and ETSI TS 102 636-3.

The GN protocol provides services to upper protocol entities, for example, the ITS Transport Protocol, such as the Basic Transport Protocol (BTP) (discussed by ETSI TS 102 636-5-1), and the GeoNetworking to IPv6 Adaptation Sub-Layer (GN6ASL) (discussed by ETSI TS 102 636-6-1). The services are provided via a GN_SAP entity using service primitives of different types that carry parameters and the PDU of the upper protocol entity, for example, T/GN6 PDU (see e.g., FIG. 1 in ETSI TS 102 636-4-1). PDUs of the transport protocols are considered as SDUs in the GN protocol. The SDU is complemented with Protocol Control Information (PCI) and transmitted as GN PDU to the peer entity. In order to provide its packet transport services, the GNg protocol uses the services of the ITS Access Layer.

FIG. 12 illustrates a PDU 1200 and a PDU header 1201 according to various embodiments. The PDU 1200 is a basic convention for the specification of packet formats. The bits are grouped into bytes. The bits of an octet are always shown horizontally and are numbered from 0 to 7. Up to 4 octets are shown horizontally; multiple sets of 4 octets are grouped vertically. Octets are numbered from 1 to N. The octets are transmitted in ascending numerical order; inside an octet the bit 0 is transmitted first. When a field is contained within a single octet, the highest bit number of the field represents the lowest order value, e.g. the Least Significant Bit (LSB). When a field spans more than one octet, the order of bit values within each octet progressively increases as the octet number increases, e.g. the highest bit number of the multi-octet field represents the LSB.

The PDU header 1201 is a basic convention for the header format for a packet. In an example, the PDU header 1201 is a common header is present in every GN packet and includes the fields depicted in FIG. 12. The fields of the PDU header 1201 are described by table 1.

TABLE 1

Fields of the PDU Header 1201

| Field # | Field name | Octet/bit position First | Octet/bit position Last | Type | Unit | Description |
|---|---|---|---|---|---|---|
| 1 | Version | Octet 0 Bit 0 | Octet 0 Bit 3 | 4 bit unsigned integer | n/a | Identifies the version of the GeoNetworking protocol |
| 2 | NH | Octet 0 Bit 4 | Octet 0 Bit 7 | 4 bit unsigned integer | n/a | Identifies the type of header immediately following; Identifies the type of header immediately following the GeoNetworking header as specified in table 5 of ETSI TS 102 636-4-1 and/or the following values: "0000" = RSU_REQUEST "0001" = RSU_RESPONSE "1111" = error, etc. |
| 3 | HT | Octet 1 Bit 0 | Octet 1 Bit 3 | 4 bit unsigned integer | n/a | Identifies the type of the GeoAdhoc header type as specified in table 6 of ETSI TS 102 636-4-1 and/or the following values:. "0000" = RSU_REQUEST "0001" = RSU_RESPONSE "1111" = error, etc. |

TABLE 1-continued

Fields of the PDU Header 1201

| Field # | Field name | Octet/bit position First | Octet/bit position Last | Type | Unit | Description |
|---|---|---|---|---|---|---|
| 4 | HST | Octet 1 Bit 4 | Octet 1 Bit 7 | 4 bit unsigned integer | n/a | indicating a specific request, a specific response, etc. Identifies the sub-type of the GeoAdhoc header type as specified in table 6 of ETSI TS 102 636-4-1 and/or the following values: "0000" = response of limited validity "0001" = response of extended validity, etc. |
| 5 | Reserved | Octet 2 | Octet 2 | | n/a | Reserved for media-dependent functionality. |
| 6 | Flags | Octet 3 | Octet 3 | Bit field | n/a | Bit 0 to 5: Reserved. Set to 0. Bit 6: Type if ITS station. Bit 7: Reserved. Set to 0. |
| 7 | PL | Octet 4 | Octet 5 | 16 bit unsigned integer | [hops] | Length of the Network Header payload, i.e. the rest of the packet following the whole GeoNetworking header in octets. |
| 8 | TC | Octet 6 | Octet 6 | Four subfields: 1 bit unsigned integer, 3 bit unsigned integer, 2 bit selector, 2 bit selector | n/a | Traffic class that represents Facility-layer requirements on packet transport. Composed of four sub-fields (FIG. 9 of ETSI TS 102 636-4-1): Bit 0: Reserved. Set to 0. Bit 1 to 3: Relevance Relevance expresses the relevance or importance of a message given by the upper protocol entity. The relevance of a message shall be encoded as defined in clause 8.5.6.1 of ETSI TS 102 636-4-1. Bit 4 to 5: Reliability Reliability means the relative probability of correctly receiving a packet in a geographical area encoded by a 2 bit selector as detailed in table 7 of ETSI TS 102 636-4-1. Bit 6 to 7: Latency Latency expresses the relative packet delivery latency in a geographical area encoded by a 2 bit selector as detailed in table 8 of ETSI TS 102 636-4-1. |
| 9 | HL | Octet 7 | Octet 7 | 8 bit unsigned integer | | Hop Limit, e.g., if relays are being used, how many hops are being allowed? "0000" indicates that no hops are allows, e.g., the communication must be a direct vehicle - RSU (or vice versa) communication. Decremented by 1 by each GeoAdhoc router that forwards the packet. The packet must not be forwarded if Hop Limit is decremented to zero. |
| 10 | SE PV | Octet 8 | Octet 35 | Long Position Vector | | Long position vector of the sender. It shall carry the fields as specified in clause 8.4.2 of ETSI TS 102 636-4-1 (Long Position Vector). Length: 28 octets. |

In an example, an "RSU_REQUEST" Message format is used for a vUE 121 to communicate with a RAN node 131 to request that local edge infrastructure (e.g., RSU(s) 132 of FIG. 1) should support a particular V2X RAT. Fields of the "RSU_REQUEST" packet header may include those described by table 2.

TABLE 2

| Field # | Field name | Octet/bit position First | Octet/bit position Last | Type | Unit | Description |
|---|---|---|---|---|---|---|
| 1 | Common Header | Octet 0 | Octet 35 | Common Header | n/a | Common header. |
| 2 | TID (Technology ID) | Octet 36 | Octet 36 | 8-bit unsigned integer | n/a | Technology ID, e.g. "0000" = DSRC/ITS-G5, "0001" = LTE C-V2X, "0010" = 5G NR, etc. |
| 3 | RT (Request Type) | Octet 37 | Octet 37 | 8-bit unsigned integer | n/a | Type of request, e.g. "0000" = terminate transcoding, "0001" = request transcoding from DSRC/ITS-G5 to LTE C-V2X, "0010" = request transcoding from DSRC/ITS-G5 to 5G NR, "0011" = request transcoding from LTE C-V2X to DSRC/ITS-G5, "0100" = request transcoding from 5G NR to DSRC/ITS-G5, etc. |

In an example, a "RSU_REPLY" or "RSU_RESPONSE" Message format is used for a RAN node 131 to communicate ACK+assigned channel or NACK message back to concerned vUE 121. Fields of the "RSU_RESPONSE" packet header may include those described by table 3.

TABLE 3

| Field # | Field name | Octet/bit position First | Octet/bit position Last | Type | Unit | Description |
|---|---|---|---|---|---|---|
| 1 | Common Header | Octet 0 | Octet 35 | Common Header | n/a | Common header. |
| 2 | TID (Technology ID) | Octet 36 | Octet 36 | 8-bit unsigned integer | n/a | Technology ID, e.g. "0000" = DSRC/ITS-G5, "0001" = LTE C-V2X, "0010" = 5G NR, etc. |
| 3 | ResT (Response Type) | Octet 37 | Octet 37 | 8-bit unsigned integer | n/a | Type of response, e.g. "0000" = terminate transcoding, "0001" = acknowledge transcoding from DSRC/ITS-G5 to LTE C-V2X, "0010" = acknowledge transcoding from DSRC/ITS-G5 to 5G NR, "0011" = acknowledge transcoding from LTE C-V2X to DSRC/ITS-G5, "0100" = acknowledge transcoding from 5G NR to DSRC/ITS-G5, "1111" = error, etc. |

In an example, a "RSU_CONFIGURATION" packet header is used for a RAN node 131 to communicate reconfiguration (e.g., support of technology "T1") to locally applicable edge infrastructure equipment (e.g., RSU(s) 132). Fields of the "RSU_CONFIGURATION" packet header may include those described by table 4.

TABLE 4

| Field # | Field name | Octet/bit position First | Octet/bit position Last | Type | Unit | Description |
|---|---|---|---|---|---|---|
| 1 | Common Header | Octet 0 | Octet 35 | Common Header | n/a | Common header. |
| 2 | TID (Technology ID) | Octet 36 | Octet 36 | 8-bit unsigned integer | n/a | Technology ID, e.g. "0000" = DSRC/ITS-G5, "0001" = LTE C-V2X, "0010" = 5G NR, etc. |
| 3 | ConfT (Response Type) | Octet 37 | Octet 37 | 8-bit unsigned integer | n/a | Type of configuration message, e.g. "0000" = transcoding terminated, "0001" = acknowledge transcoding from DSRC/ITS-G5 to LTE C-V2X, "0010" = acknowledge transcoding from DSRC/ITS-G5 to 5G NR, "0011" = acknowledge transcoding from LTE C-V2X to DSRC/ITS-G5, "0100" = acknowledge transcoding from 5G NR to DSRC/ITS-G5, "1111" = error, etc. |

Figure 13:
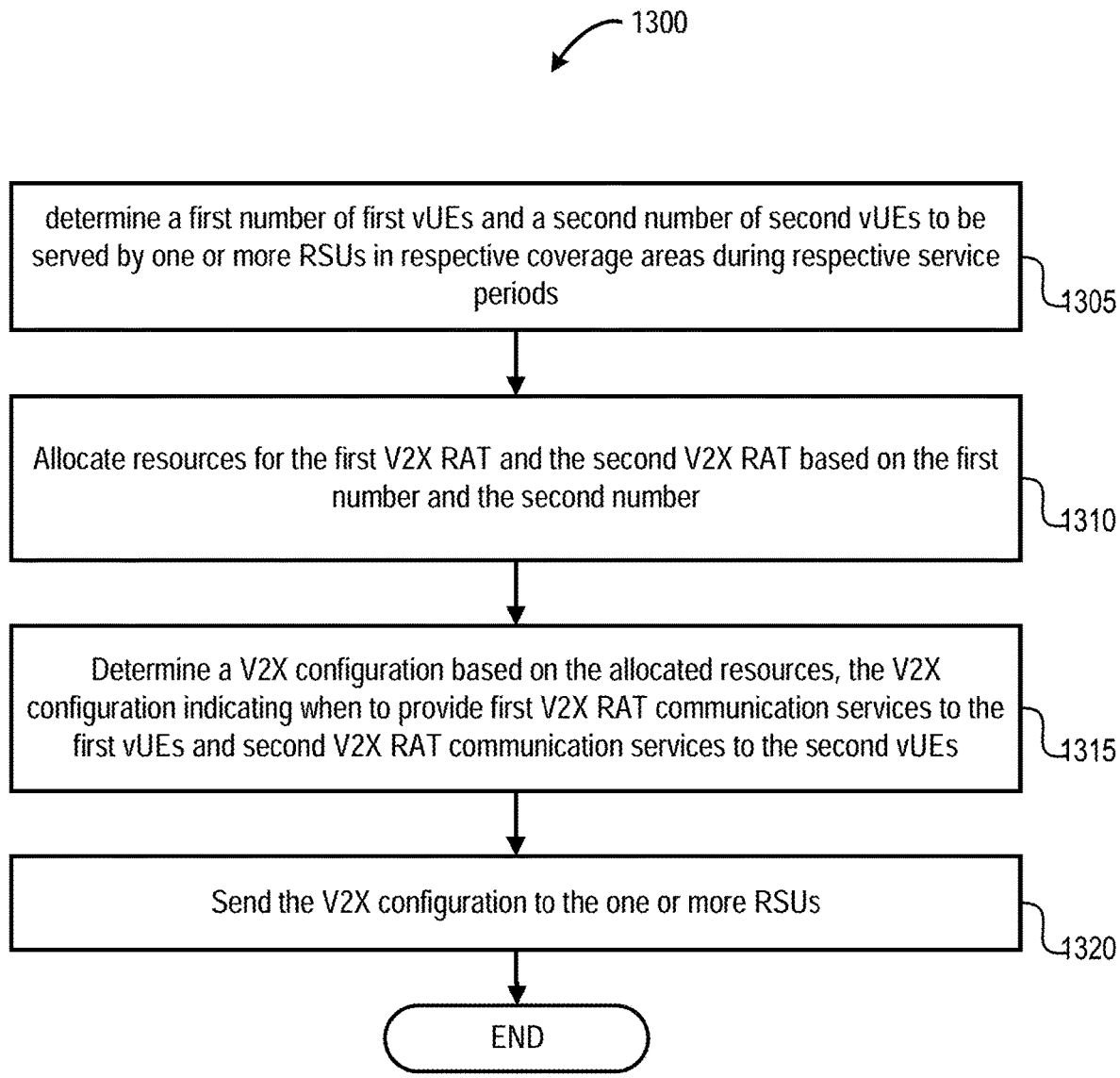
FIG. 13 depicts an example procedure for practicing the various embodiments herein.

FIG. 13 depicts an example process 1300 for practicing the various embodiments discussed herein. In particular, process 1300 may be performed by a computing system to dynamically allocate V2X resources (see e.g., resource allocation 601 of FIG. 6) to vUEs. For illustrative purposes, the various operations of processes 1300 is described as being performed by a computing system, which may be an access/edge node 130 (e.g., a MEC server 136, RAN node 111, AN (or RSU) 132, or AP 133) or backend node 140 (e.g., a network function or network element of CN 142, cloud 144, or server(s) 150) of FIG. 1 or elements thereof (e.g., components discussed with regard to infrastructure equipment 300 of FIG. 3). While particular examples and orders of operations are illustrated FIGS. 10-11, the depicted orders of operations should not be construed to limit the scope of the embodiments in any way. Rather, the depicted operations may be re-ordered, broken into additional operations, combined, and/or omitted altogether while remaining within the spirit and scope of the present disclosure.

Procedure 1300 begins at operation 1305 where the computing system determines a first number of first vUEs and a second number of second vUEs to be served by one or more RSUs (e.g., the RSUs 632, 732, 832, and 932 of FIGS. 6-9) in respective coverage areas (e.g., coverage areas 738, 838, and 938 of FIGS. 7-9) during respective service periods (or time periods). The first vUEs (e.g., vUEs 121, 621, 721, 821, and 921 of FIGS. 1 and 6-9) are configured to communicate using a first V2X RAT and the second vUEs (e.g., vUEs 121, 622, 721, 821, and 921 of FIGS. 1 and 6-9) are configured to communicate using a second V2X RAT.

According to a first embodiment, determining the first number includes determining the first number of the first vUEs to be a number of messages obtained from vUEs in a first frequency band; and determining the first number includes determining the second number of the second vUEs to be a number of messages obtained from vUEs in a second frequency band.

According to a second embodiment, determining the number of first vUEs and the number of second vUEs includes receiving request messages from corresponding first vUEs and corresponding second vUEs. The request messages obtained from the first vUEs may be requests for first V2X RAT communication services and the request messages obtained from the second vUEs may be requests for second V2X RAT communication services. In this embodiment, the computing system determines the first number of the first vUEs to be a number of request messages obtained from corresponding ones of the first vUEs, and determines the second number of the second vUEs to be a number of request messages obtained from corresponding ones of the second vUEs.

At operation 1310, the computing system allocates resources for the first V2X RAT and the second V2X RAT based on the first number of the first vUEs and the second number of the second vUEs. In some embodiments, allocating the resources comprises determining a first channel to be used for providing the first V2X RAT communication services (e.g., channel 1 or channel 2 of resource allocation 601 of FIG. 6) and a second channel (e.g., channel 3 of resource allocation 601 of FIG. 6) to be used for providing the second V2X RAT communication services, allocating the first channel for the first V2X RAT communication services, and allocating the second channels for the second V2X RAT communication services.

In some embodiments, allocating the resources comprises determining a third channel (e.g., channel 2 of resource allocation 601 of FIG. 6) to be used for providing both the first V2X RAT communication services and the second V2X RAT communication services, and allocating the third channel for the first V2X RAT communication services and the second V2X RAT communication services. In these embodiments, allocating the resources comprises allocating the third channel for the first V2X RAT communication services during a first service period (or time period) of the respective service periods (or time periods) and allocating the third channel for the second V2X RAT communication services during a second service period (or time period) of the respective service periods (or time periods).

At operation 1315, the computing system determines a V2X configuration based on the allocated resources, the V2X configuration indicating when to provide first V2X RAT communication services to the first vUEs and second V2X RAT communication services to the second vUEs.

In some embodiments, the V2X configuration further indicates a first time during which the first RAT communication services are to be provided in the third channel and a second time during which the second V2X RAT communication services are to be provided in the third channel.

In some embodiments, allocating the resources and/or generating the V2X configuration includes generating V2X configuration message (or resource allocation message) to include various information/data for providing the first and second V2X communication services. This information data may include, for example, one or more of a total number of available channels, a bandwidth and frequency carrier of each channel, a preferred usage for each RSU of the one or more RSUs, the first number of the first vUEs, the second number of the second vUEs, and/or a time period during which the first number and the second number were determined. This information may be used by the one or more RSUs to determine the allocated resources or otherwise provide the V2X communication services for the first and second V2X RATs. In some embodiments, the V2X configuration message (or resource allocation message) may be generated to include an indication of the allocated resources.

At operation 1315, the computing system sends the V2X configuration to the one or more RSUs. In some embodiments, sending the configuration to the one or more RSUs includes sending the V2X configuration message (or resource allocation message) the resource allocation message to the one or more RSUs over respective wired or wireless links.

In addition or alternative to sending the V2X configuration message, the computing system may configure the one or more RSUs with a first V2X RAT component during a first service period of the respective service periods, and configure the one or more RSUs with the second V2X RAT component during a second service period of the respective service periods. Additionally or alternatively, the computing system may configure at least one RSU of the one or more RSUs with the first V2X RAT component, and configure at least one other RSU of the one or more RSUs with the second V2X RAT component. In these embodiments, the first V2X RAT component enables the one or more RSUs to provide the first RAT communication services, and the second V2X RAT component enables the one or more RSUs to provide the second V2X RAT communication services.

In some embodiments, the computing system is a controller (or processor circuitry) for an individual RSU of the one or more RSUs, which includes interface circuitry that communicatively couples the computing system and/or individual RSU with one or more RFEMs. In these embodiments, operation 1320 involves loading the first V2X RAT component and the second V2X RAT component from memory/storage circuitry of the computing system to the RFEMs to provide the V2X RAT first and second V2X RAT communication services, respectively.

In some embodiments, the computing system is an edge server (e.g., a MEC server 136) co-located with at least one RSU of the one or more RSUs, and other RSUs of the one or more RSUs are co-located with other edge servers (e.g., MEC servers 136). In these embodiments, operation 1320 involves sending the V2X configuration message (or the first V2X RAT component and the second V2X RAT component) to the other edge servers over respective interfaces (e.g., the Mp3 interface between one or more MEC servers 136).

In some embodiments, the computing system is a computing system or cloud computing resources of a cloud computing service that is communicatively coupled with the one or more RSUs or co-located edge nodes 130 via respective backhaul links. In these embodiments, operation 1320 involves sending the V2X configuration message (or the first V2X RAT component and the second V2X RAT component) to the one or more RSUs and/or co-located edge servers over the backhaul links.

Implementation of the preceding techniques may be accomplished through any number of specifications, configurations, or example deployments of hardware and software. It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting configurations. Each of the non-limiting examples may stand on its own, or may be combined in any permutation or combination with any one or more of the other examples provided below or throughout the present disclosure.

Example A01 includes a method for managing vehicle user equipment (vUEs) communications, the method comprising: determining a first number of first vUEs and a second number of second vUEs to be served in respective coverage areas of one or more of one or more Road Side Units (RSUs) during respective service periods, the first vUEs communicating according to a first radio access technology (RAT) and the second vUEs communicating according to a second RAT; determining resource allocations for providing first RAT communication services to the first vUEs and second RAT communication services to the second vUEs based on the first number and the second number; and allocating resources based on the determined resource allocations.

Example A02 includes the method of example A01 and/or some other example(s) herein, wherein determination of the resource allocations includes, to determine a first channel is to be used for providing the first RAT communication services and a second channel is to be used for providing the second RAT communication services.

Example A03 includes the method of examples A01-A02 and/or some other example(s) herein, wherein allocation of the resources includes, to allocate the first channel for the first RAT communication services and allocate the second channels for the second RAT communication services.

Example A04 includes the method of examples A02-A03 and/or some other example(s) herein, wherein determination of the resource allocations includes determining includes to determine a third channel is to be used for providing both the first RAT communication services and the second RAT communication services.

Example A05 includes the method of examples A02-A04 and/or some other example(s) herein, wherein allocation of the resources includes allocating the third channel for the first RAT communication services and the second RAT communication services.

Example A06 includes the method of example A05 and/or some other example(s) herein, wherein determination of the resource allocation includes determining a first service period of the respective service periods during which the first RAT communication services are to be provided in the third channel and a second service period of the respective service periods during which the second RAT communication services are to be provided in the third channel.

Example A07 includes the method of examples A03-A06 and/or some other example(s) herein, wherein allocation of the resources includes allocating the third channel for the first RAT communication services during the first service period and allocate the third channel for the second RAT communication services during the second service period.

Example A08 includes the method of examples A01-A07 and/or some other example(s) herein, further comprising: sending a resource allocation message to the one or more RSUs over respective wired or wireless links between a system hosting the IC and the one or more RSUs.

Example A09 includes the method of example A08 and/or some other example(s) herein, further comprising generating the resource allocation message to include a total number of available channels, a bandwidth and frequency carrier of each channel, a preferred usage for each RSU of the one or more RSUs, the first number of the first vUEs, the second number of the second vUEs, or a time period during which the first number and the second number were determined.

Example A10 includes the method of examples A01-A09 and/or some other example(s) herein, wherein determining the first number of the first vUEs and the second number of the second vUEs comprises: measuring signals transmitted by the first vUEs and the second vUEs; determining the first number of the first vUEs to be a number of measured signals transmitted in a first frequency band; and determining the second number of the second vUEs to be a number of measured signals transmitted in a second frequency band.

Example A11 includes the method of examples A01-A09 and/or some other example(s) herein, wherein determining the first number of the first vUEs and the second number of the second vUEs comprises: receiving request messages from the first vUEs and the second vUEs; determining the first number of the first vUEs to be a number of request messages obtained from corresponding ones of the first vUEs; and determining the second number of the second vUEs to be a number of request messages obtained from corresponding ones of the second vUEs.

Example A12 includes the method of examples A01-A11 and/or some other example(s) herein, wherein allocating the resources comprises: configuring at least one RSU of the one or more RSUs with a first RAT module (also referred to as a "first RAT component") to provide the first RAT communication services; and configuring at least one other RSU of the one or more RSUs with a second RAT module (also referred to as a "second RAT component") to provide the second RAT communication services.

Example A13 includes an integrated circuit (IC) comprising interface circuitry arranged to couple the IC to one or more Road Side Units (RSUs), each RSU of the one or more RSUs arranged to communicate with one or more vehicle user equipment (vUEs) traveling through respective coverage areas of the one or more RSUs; and processor circuitry coupled with the interface circuitry, the processor circuitry arranged to perform the method of examples A01-A12 and/or some other example(s) herein.

Example A14 includes the IC of example A12 and/or some other example(s) herein, further comprising: memory circuitry communicatively coupled with the processor circuitry, the memory circuitry arranged to store program code of a first RAT module (or component) and a second RAT module (or component).

Example A15 includes the IC of example A14 and/or some other example(s) herein, wherein an RSU hosts the IC or the IC is hosted by a computing system of a cloud computing service.

Example B01 includes a method to be performed by a vehicle user equipment (vUE), the method comprising: generating a message according to a vehicle-to-everything (V2X) radio access technology (RAT); and transmitting the message to a destination node according to the V2X RAT protocol, wherein the message is to cause the one or more RAN nodes to allocate one or more frequency channels for V2X RAT communications.

Example B02 includes the method of example B01 and/or some other example(s) herein, wherein the V2X RAT is a first V2X RAT, and transmitting the message is to be performed using first communication means, and the method further comprises: communicating, using second communication means, according to a second V2X RAT that is different than the first V2X RAT.

Example B03 includes the method of example B02 and/or some other example(s) herein, wherein the destination node is another vUE or a Radio Access Network (RAN) node, and the method comprises generating the message to include one or more vUE capabilities, wherein the one or more vUE capabilities indicates support for the first V2X RAT and the second V2X RAT.

Example B04 includes the method of examples B01-B03 and/or some other example(s) herein, wherein the destination node is a RAN node, and the method comprises generating the message to include a request for support of the V2X RAT.

Example B05 includes the method of example B04 and/or some other example(s) herein, wherein the method comprises receiving an acknowledgement (ACK) message from the RAN node acknowledging receipt of the message, and communicating with one or more other vUEs according to the V2X RAT based on receipt of the ACK message.

Example C01 includes a method for dynamically allocating vehicle-to-everything (V2X) resources to vehicle user equipment (vUEs), the method comprising: determining a first number of first vUEs and a second number of second vUEs to be served by one or more Road Side Units (RSUs) in respective coverage areas during respective service periods, the first vUEs are configured to communicate using a first V2X radio access technology (RAT) and the second vUEs are configured to communicate using a second V2X RAT; allocating resources for the first V2X RAT and the second V2X RAT based on the first number and the second number; determining a V2X configuration based on the allocated resources, the V2X configuration indicating when to provide first V2X RAT communication services to the first vUEs and second V2X RAT communication services to the second vUEs; and sending the V2X configuration to the one or more RSUs.

Example C02 includes the method of example C01 and/or some other example(s) herein, wherein allocating the resources comprises determining a first channel to be used for providing the first V2X RAT communication services and a second channel to be used for providing the second V2X RAT communication services; allocating the first channel for the first V2X RAT communication services; and allocating the second channels for the second V2X RAT communication services.

Example C03 includes the method of example C02 and/or some other example(s) herein, wherein allocating the resources comprises determining a third channel to be used for providing both the first V2X RAT communication services and the second V2X RAT communication services; and allocating the third channel for the first V2X RAT communication services and the second V2X RAT communication services.

Example C04 includes the method of example C03 and/or some other example(s) herein, wherein the V2X configuration further indicates a first service period of the respective service periods during which the first RAT communication services are to be provided in the third channel and a second service period of the respective service periods during which the second V2X RAT communication services are to be provided in the third channel, and wherein allocating the resources comprises allocating the third channel for the first V2X RAT communication services during the first service period and allocating the third channel for the second V2X RAT communication services during the second service period.

Example C05 includes the method of examples C01-C04 and/or some other example(s) herein, further comprising: generating a V2X configuration message to include a total number of available channels, a bandwidth and frequency carrier of each channel, a preferred usage for each RSU of the one or more RSUs, the first number of the first vUEs, the second number of the second vUEs, or a time period during which the first number and the second number were determined; and sending the V2X configuration message to the one or more RSUs over respective wired or wireless links.

Example C06 includes the method of examples C01-C05 and/or some other example(s) herein, further comprising: configuring the one or more RSUs with a first V2X RAT component (also referred to as a "first V2X RAT module") during a first service period of the respective service periods, the first V2X RAT component enabling the one or more RSUs to provide the first RAT communication services; and configuring the one or more RSUs with the second V2X RAT component (also referred to as a "second V2X RAT module") during a second service period of the respective service periods, the second V2X RAT component enabling the one or more RSUs to provide the second V2X RAT communication services.

Example C07 includes the method of examples C01-C06 and/or some other example(s) herein, further comprising: configuring at least one RSU of the one or more RSUs with a first V2X RAT component, the first V2X RAT component enabling the at least one RSU to provide the first RAT communication services; and configuring at least one other RSU of the one or more RSUs with a second V2X RAT component, the second V2X RAT component enabling the at least one other RSU to provide the second V2X RAT communication services.

Example C08 includes the method of example C07 and/or some other example(s) herein, wherein determining the first number of the first vUEs and the second number of the second vUEs comprises: determining the first number of the first vUEs to be a number of messages obtained from vUEs in a first frequency band; and determining the second number of the second vUEs to be a number of messages obtained from vUEs in a second frequency band.

Example C09 includes the method of example C07 and/or some other example(s) herein, wherein determining the first number of the first vUEs and the second number of the second vUEs comprises: receiving request messages from the first vUEs and the second vUEs; determining the first number of the first vUEs to be a number of request messages obtained from corresponding ones of the first vUEs; and determining the second number of the second vUEs to be a number of request messages obtained from corresponding ones of the second vUEs.

Example C10 includes one or more computer readable storage media comprising instructions, wherein execution of the instructions by one or more processors is to cause a computing system to perform the method of any one of examples A01-A10, B01-B05, and/o C01-C09.

Example Z01 may include an apparatus comprising means to perform one or more elements of a method described in or related to any of examples A01-A14, B01-B05, C01-C10, or any other method or process described herein. Example Z02 may include one or more non-transitory computer-readable media comprising instructions to cause an electronic device, upon execution of the instructions by one or more processors of the electronic device, to perform one or more elements of a method described in or related to any of examples A01-A14, B01-B05, C01-C10, or any other method or process described herein. Example Z03 may include an apparatus comprising logic, modules, or circuitry to perform one or more elements of a method described in or related to any of examples A01-A14, B01-B05, C01-C10, or any other method or process described herein. Example Z04 may include a method, technique, or process as described in or related to any of examples A01-A14, B01-B05, C01-C10, or portions or parts thereof. Example Z05 may include an apparatus comprising: one or more processors and one or more computer-readable media comprising instructions that, when executed by the one or more processors, cause the one or more processors to perform the method, techniques, or process as described in or related to any of examples A01-A14, B01-B05, C01-C10, or portions thereof. Example Z06 may include a signal as described in or related to any of examples A01-A14, B01-B05, C01-C10, or portions or parts thereof. Example Z07 may include a datagram, packet, frame, segment, protocol data unit (PDU), or message as described in or related to any of examples A01-A14, B01-B05, C01-C10, or portions or parts thereof, or otherwise described in the present disclosure.

Example Z08 may include a signal encoded with data as described in or related to any of examples A01-A14, B01-B05, C01-C10, or portions or parts thereof, or otherwise described in the present disclosure. Example Z09 may include a signal encoded with a datagram, packet, frame, segment, protocol data unit (PDU), or message as described in or related to any of examples A01-A14, B01-B05, C01-C10, or portions or parts thereof, or otherwise described in the present disclosure. Example Z10 may include an electromagnetic signal carrying computer-readable instructions, wherein execution of the computer-readable instructions by one or more processors is to cause the one or more processors to perform the method, techniques, or process as described in or related to any of examples A01-A14, B01-B05, C01-C10, or portions thereof. Example Z11 may include a computer program comprising instructions, wherein execution of the program by a processing element is to cause the processing element to carry out the method, techniques, or process as described in or related to any of examples A01-A14, B01-B05, C01-C10, or portions thereof. Example Z12 may include a signal in a wireless network as shown and described herein. Example Z13 may include a method of communicating in a wireless network as shown and described herein. Example Z14 may include a system for providing wireless communication as shown and described herein. Example Z15 may include a device for providing wireless communication as shown and described herein. Any of the above-described examples may be combined with any other example (or combination of examples), unless explicitly stated otherwise.

The present disclosure has been described with reference to flowchart illustrations and/or block diagrams of methods, apparatus (systems), and/or computer program products according to embodiments of the present disclosure. In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

The terminology used herein is for the purpose of describing particular embodiments only and is not intended to be limiting of the disclosure. As used herein, the singular forms "a," "an" and "the" are intended to include plural forms as well, unless the context clearly indicates otherwise. It will be further understood that the terms "comprises" and/or "comprising," when used in this specification, specific the presence of stated features, integers, steps, operations, elements, and/or components, but do not preclude the presence or addition of one or more other features, integers, steps, operation, elements, components, and/or groups thereof.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C). The description may use the phrases "in an embodiment," or "In some embodiments," which may each refer to one or more of the same or different embodiments. Furthermore, the terms "comprising," "including," "having," and the like, as used with respect to embodiments of the present disclosure, are synonymous.

The term "circuitry" refers to a circuit or system of multiple circuits configured to perform a particular function in an electronic device. The circuit or system of circuits may be part of, or include one or more hardware components, such as a logic circuit, a processor (shared, dedicated, or group) and/or memory (shared, dedicated, or group), an Application Specific Integrated Circuit (ASIC), a field-programmable gate array (FPGA), programmable logic device (PLD), complex PLD (CPLD), high-capacity PLD (HCPLD), System-on-Chip (SoC), System-in-Package (SiP), Multi-Chip Package (MCP), digital signal processor (DSP), etc., that are configured to provide the described functionality. In addition, the term "circuitry" may also refer to a combination of one or more hardware elements with the program code used to carry out the functionality of that program code. Some types of circuitry may execute one or more software or firmware programs to provide at least some of the described functionality. Such a combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer to one or more application processors, one or more baseband processors, a physical central processing unit (CPU), a single-core processor, a dual-core processor, a triple-core processor, a quad-core processor, and/or any other device capable of executing or otherwise operating computer-executable instructions, such as program code, software modules, and/or functional processes. The terms "application circuitry" and/or "baseband circuitry" may be considered synonymous to, and may be referred to as, "processor circuitry."

The term "memory" and/or "memory circuitry" as used herein refers to one or more hardware devices for storing data, including random access memory (RAM), magnetoresistive RAM (MRAM), phase change random access memory (PRAM), dynamic random access memory (DRAM) and/or synchronous dynamic random access memory (SDRAM), core memory, read only memory (ROM), magnetic disk storage mediums, optical storage mediums, flash memory devices or other machine readable mediums for storing data. The term "computer-readable medium" may include, but is not limited to, memory, portable or fixed storage devices, optical storage devices, and various other mediums capable of storing, containing or carrying instructions or data.

The term "interface circuitry" as used herein refers to, is part of, or includes circuitry that enables the exchange of information between two or more components or devices. The term "interface circuitry" may refer to one or more hardware interfaces, for example, buses, IO interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, router, switch, hub, bridge, radio network controller, RAN device, RAN node, gateway, server, virtualized VNF, NFVI, etc.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "architecture" as used herein refers to a computer architecture or a network architecture. A "network architecture" is a physical and logical design or arrangement of software and/or hardware elements in a network including communication protocols, interfaces, and media transmission. A "computer architecture" is a physical and logical design or arrangement of software and/or hardware elements in a computing system or platform including technology standards for interacts therebetween.

The term "appliance," "computer appliance," or the like, as used herein refers to a computer device or computer system with program code (e.g., software or firmware) that is specifically designed to provide a specific computing resource. A "virtual appliance" is a virtual machine image to be implemented by a hypervisor-equipped device that virtualizes or emulates a computer appliance or otherwise is dedicated to provide a specific computing resource.

The term "element" refers to a unit that is indivisible at a given level of abstraction and has a clearly defined boundary, wherein an element may be any type of entity including, for example, one or more devices, systems, controllers, network elements, modules, etc., or combinations thereof. The term "device" refers to a physical entity embedded inside, or attached to, another physical entity in its vicinity, with capabilities to convey digital information from or to that physical entity. The term "entity" refers to a distinct component of an architecture or device, or information transferred as a payload. The term "controller" refers to an element or entity that has the capability to affect a physical entity, such as by changing its state or causing the physical entity to move.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

As used herein, the term "computational offloading" or "offloading" refers to the transfer of resource intensive computational tasks or workloads from a device, computing system, etc., to an external platform such as an edge node/server, cluster, grid, cloud computing service, and/or the like.

As used herein, the term "workload" may refer to an amount of work performed by a computing system, device, entity, etc., during a period of time or at a particular instant of time. A workload may be represented as a benchmark, such as a response time, throughput (e.g., how much work is accomplished over a period of time), and/or the like. Additionally or alternatively, the workload may be represented as a memory workload (e.g., an amount of memory space needed for program execution to store temporary or permanent data and to perform intermediate computations), processor workload (e.g., a number of instructions being executed by the processor 102 during a given period of time or at a particular time instant), an I/O workload (e.g., a number of inputs and outputs or system accesses during a given period of time or at a particular time instant), database workloads (e.g., a number of database queries during a period of time), a network-related workload (e.g., a number of network attachments, a number of mobility updates, a number of radio link failures, a number of handovers, an amount of data to be transferred over an air interface, etc.), and/or the like. Various algorithms may be used to determine a workload and/or workload characteristics, which may be based on any of the aforementioned workload types.

The term "channel" as used herein refers to any transmission medium, either tangible or intangible, which is used to communicate data or a data stream. The term "channel" may be synonymous with and/or equivalent to "communications channel," "data communications channel," "transmission channel," "data transmission channel," "access channel," "data access channel," "link," "data link," "carrier," "radiofrequency carrier," and/or any other like term denoting a pathway or medium through which data is communicated. Additionally, the term "link" as used herein refers to a connection between two devices through a RAT for the purpose of transmitting and receiving information.

As used herein, the term "radio technology" refers to technology for wireless transmission and/or reception of electromagnetic radiation for information transfer. The term "radio access technology" or "RAT" refers to the technology used for the underlying physical connection to a radio based communication network.

As used herein, the term "communication protocol" (either wired or wireless) refers to a set of standardized rules or instructions implemented by a communication device and/or system to communicate with other devices and/or systems, including instructions for packetizing/depacketizing data, modulating/demodulating signals, implementation of protocols stacks, and/or the like. Examples of wireless communications protocols may be used in various embodiments include a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology including, for example, 3GPP Fifth Generation (5G) or New Radio (NR), Universal Mobile Telecommunications System (UMTS), Freedom of Multimedia Access (FOMA), Long Term Evolution (LTE), LTE-Advanced (LTE Advanced), LTE Extra, LTE-A Pro, cdmaOne (2G), Code Division Multiple Access 2000 (CDMA 2000), Cellular Digital Packet Data (CDPD), Mobitex, Circuit Switched Data (CSD), High-Speed CSD (HSCSD), Universal Mobile Telecommunications System (UMTS), Wideband Code Division Multiple Access (W-CDM), High Speed Packet Access (HSPA), HSPA Plus (HSPA+), Time Division-Code Division Multiple Access (TD-CDMA), Time Division-Synchronous Code Division Multiple Access (TD-SCDMA), LTE LAA, MuLTEfire, UMTS Terrestrial Radio Access (UTRA), Evolved UTRA (E-UTRA), Evolution-Data Optimized or Evolution-Data Only (EV-DO), Advanced Mobile Phone System (AMPS), Digital AMPS (D-AMPS), Total Access Communication System/Extended Total Access Communication System (TACS/ETACS), Push-to-talk (PTT), Mobile Telephone System (MTS), Improved Mobile Telephone System (IMTS), Advanced Mobile Telephone System (AMTS), Cellular Digital Packet Data (CDPD), DataTAC, Integrated Digital Enhanced Network (iDEN), Personal Digital Cellular (PDC), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Bluetooth®, Bluetooth Low Energy (BLE), IEEE 802.15.4 based protocols (e.g., IPv6 over Low power Wireless Personal Area Networks (6LoWPAN), WirelessHART, MiWi, Thread, 802.11a, etc.) WiFi-direct, ANT/ANT+, ZigBee, Z-Wave, 3GPP device-to-device (D2D) or Proximity Services (ProSe), Universal Plug and Play (UPnP), Low-Power Wide-Area-Network (LPWAN), Long Range Wide Area Network (LoRA) or LoRaWAN™ developed by Semtech and the LoRa Alliance, Sigfox, Wireless Gigabit Alliance (WiGig) standard, Worldwide Interoperability for Microwave Access (WiMAX), mmWave standards in general (e.g., wireless systems operating at 10-300 GHz and above such as WiGig, IEEE 802.11ad, IEEE 802.11ay, etc.), V2X communication technologies (including 3GPP C-V2X), Dedicated Short Range Communications (DSRC) communication systems such as Intelligent-Transport-Systems (ITS) including the European ITS-G5, ITS-G5B, ITS-G5C, etc. In addition to the standards listed above, any number of satellite uplink technologies may be used for purposes of the present disclosure including, for example, radios compliant with standards issued by the International Telecommunication Union (ITU), or the European Telecommunications Standards Institute (ETSI), among others. The examples provided herein are thus understood as being applicable to various other communication technologies, both existing and not yet formulated.

The terms "instantiate," "instantiation," and the like as used herein refers to the creation of an instance. An "instance" also refers to a concrete occurrence of an object, which may occur, for example, during execution of program code. The term "information element" refers to a structural element containing one or more fields. The term "field" refers to individual contents of an information element, or a data element that contains content. As used herein, a "database object", "data structure", or the like may refer to any representation of information that is in the form of an object, attribute-value pair (AVP), key-value pair (KVP), tuple, etc., and may include variables, data structures, functions, methods, classes, database records, database fields, database entities, associations between data and/or database entities (also referred to as a "relation"), blocks and links between blocks in block chain implementations, and/or the like.

The terms "coupled," "communicatively coupled," along with derivatives thereof are used herein. The term "coupled" may mean two or more elements are in direct physical or electrical contact with one another, may mean that two or more elements indirectly contact each other but still cooperate or interact with each other, and/or may mean that one or more other elements are coupled or connected between the elements that are said to be coupled with each other. The term "directly coupled" may mean that two or more elements are in direct contact with one another. The term "communicatively coupled" may mean that two or more elements may be in contact with one another by a means of communication including through a wire or other interconnect connection, through a wireless communication channel or ink, and/or the like.

The term "localized network" as used herein may refer to a local network that covers a limited number of connected vehicles in a certain area or region. The term "distributed computing" as used herein may refer to computation resources that are geographically distributed within the vicinity of one or more localized networks' terminations. The term "local data integration platform" as used herein may refer to a platform, device, system, network, or element(s) that integrate local data by utilizing a combination of localized network(s) and distributed computation.

The foregoing description provides illustration and description of various example embodiments, but is not intended to be exhaustive or to limit the scope of embodiments to the precise forms disclosed. Modifications and variations are possible in light of the above teachings or may be acquired from practice of various embodiments. Where specific details are set forth in order to describe example embodiments of the disclosure, it should be apparent to one skilled in the art that the disclosure can be practiced without, or with variation of, these specific details. It should be understood, however, that there is no intent to limit the concepts of the present disclosure to the particular forms disclosed, but on the contrary, the intention is to cover all modifications, equivalents, and alternatives consistent with the present disclosure and the appended claims.

The invention claimed is:

1. An integrated circuit (IC) for managing vehicle user equipment (vUEs) communications, the IC comprising:
   interface circuitry arranged to couple the IC to one or more Road Side Units (RSUs), each RSU of the one or more RSUs arranged to communicate with one or more vehicle user equipment (vUEs) traveling through respective coverage areas of the one or more RSUs; and
   processor circuitry coupled with the interface circuitry, the processor circuitry arranged to:
      determine a first number of first vUEs and a second number of second vUEs to be served in the respective coverage areas during respective service periods, the first vUEs communicating according to a first radio access technology (RAT) and the second vUEs communicating according to a second RAT;
      determine resource allocations for providing first RAT communication services to the first vUEs and second RAT communication services to the second vUEs based on the first number and the second number; and
      allocate resources based on the determined resource allocations.

2. The IC of claim 1, wherein:
   determination of the resource allocations includes, to determine a first channel is to be used for providing the first RAT communication services and a second channel is to be used for providing the second RAT communication services; and
   allocation of the resources includes, to allocate the first channel for the first RAT communication services and allocate the second channel for the second RAT communication services.

3. The IC of claim 2, wherein:
   determination of the resource allocations includes, to determine includes to determine a third channel is to be used for providing both the first RAT communication services and the second RAT communication services; and
   allocation of the resources includes, to allocate the third channel for the first RAT communication services and the second RAT communication services.

4. The IC of claim 3, wherein:
   determination of the resource allocation includes, to determine a first service period of the respective service periods during which the first RAT communication services are to be provided in the third channel and a second service period of the respective service periods during which the second RAT communication services are to be provided in the third channel; and
   allocation of the resources includes, to allocate the third channel for the first RAT communication services during the first service period and allocate the third channel for the second RAT communication services during the second service period.

5. The IC of claim 1, wherein the processor circuitry is to further arranged to use the interface circuitry to send a resource allocation message to the one or more RSUs over respective wired or wireless links between a system hosting the IC and the one or more RSUs.

6. The IC of claim 5, wherein the processor circuitry is further arranged to:
   generate the resource allocation message to include a total number of available channels, a bandwidth and frequency carrier of each channel, a preferred usage for each RSU of the one or more RSUs, the first number of the first vUEs, the second number of the second vUEs, or a time period during which the first number and the second number were determined.

7. The IC of claim 6, wherein, to determine the first number of the first vUEs and the second number of the second vUEs, the processor circuitry is arranged to:
   measure signals transmitted by the first vUEs and the second vUEs;
   determine the first number of the first vUEs to be a number of measured signals transmitted in a first frequency band; and
   determine the second number of the second vUEs to be a number of measured signals transmitted in a second frequency band.

8. The IC of claim 6, wherein, to determine the first number of the first vUEs and the second number of the second vUEs, the processor circuitry is arranged to:
   receive request messages from the first vUEs and the second vUEs;
   determine the first number of the first vUEs to be a number of request messages obtained from corresponding ones of the first vUEs; and
   determine the second number of the second vUEs to be a number of request messages obtained from corresponding ones of the second vUEs.

9. The IC of claim 1, further comprising:
   memory circuitry communicatively coupled with the processor circuitry, the memory circuitry arranged to store program code of a first RAT module and a second RAT module, and wherein, to allocate the resources, the processor circuitry is further arranged to:
   configure at least one RSU of the one or more RSUs with the first RAT module to provide the first RAT communication services; and
   configure at least one other RSU of the one or more RSUs with the second RAT module to provide the second RAT communication services.

10. The IC of claim 9, wherein an RSU hosts the IC or the IC is hosted by a computing system of a cloud computing service.

11. A vehicle user equipment (vUE) comprising:
    processor circuitry arranged to generate a message according to a vehicle-to-everything (V2X) radio access technology (RAT); and
    communication circuitry arranged to transmit the message to a destination node according to the V2X RAT protocol, wherein the message is to cause the one or more RAN nodes to allocate one or more frequency channels for V2X RAT communications.

12. The vUE of claim 11, wherein the V2X RAT is a first V2X RAT, and the communication circuitry is a first communication circuitry, and the vUE further comprises:
    second communication circuitry arranged to communication according to a second V2X RAT that is different than the first V2X RAT.

13. The vUE of claim 12, wherein the destination node is another vUE or a Radio Access Network (RAN) node, and the processor circuitry is further arranged to generate the message to include one or more vUE capabilities, wherein the one or more vUE capabilities indicates support for the first V2X RAT and the second V2X RAT.

14. The vUE of claim 11, wherein the destination node is a RAN node, and the processor circuitry is further arranged to generate the message to include a request for support of the V2X RAT.

15. The vUE of claim 14, wherein the communication circuitry is further arranged to receive an acknowledgement (ACK) message from the RAN node acknowledging receipt of the message, and communicate with one or more other vUEs according to the V2X RAT based on receipt of the ACK message.

16. One or more non-transitory computer readable media (NTCRM) comprising instructions for dynamically allocating vehicle-to-everything (V2X) resources to vehicle user equipment (vUEs), wherein execution of the instructions by one or more processors of a computing system is to cause the computing system to:
    determine a first number of first vUEs and a second number of second vUEs to be served by one or more Road Side Units (RSUs) in respective coverage areas during respective service periods, the first vUEs are configured to communicate using a first V2X radio access technology (RAT) and the second vUEs are configured to communicate using a second V2X RAT;
    allocate resources for the first V2X RAT and the second V2X RAT based on the first number and the second number;
    determine a V2X configuration based on the allocated resources, the V2X configuration indicating when to provide first V2X RAT communication services to the first vUEs and second V2X RAT communication services to the second vUEs; and
    send the V2X configuration to the one or more RSUs.

17. The one or more NTCRM of claim 16, wherein, to allocate the resources, execution of the instructions is to cause the computing system to:
    determine a first channel to be used for providing the first V2X RAT communication services and a second channel to be used for providing the second V2X RAT communication services;
    allocate the first channel for the first V2X RAT communication services; and
    allocate the second channel for the second V2X RAT communication services.

18. The one or more NTCRM of claim 17, wherein, to allocate the resources, execution of the instructions is to cause the computing system to:
    determine a third channel to be used for providing both the first V2X RAT communication services and the second V2X RAT communication services; and
    allocate the third channel for the first V2X RAT communication services and the second V2X RAT communication services.

19. The one or more NTCRM of claim 18, wherein the V2X configuration further indicates a first service period of the respective service periods during which the first RAT communication services are to be provided in the third channel and a second service period of the respective service periods during which the second V2X RAT communication services are to be provided in the third channel, and wherein, to allocate the resources, execution of the instructions is to cause the computing system to:
    allocate the third channel for the first V2X RAT communication services during the first service period and allocating the third channel for the second V2X RAT communication services during the second service period.

20. The one or more NTCRM of claim 16, wherein execution of the instructions is to cause the computing system to:
    generate a V2X configuration message to include a total number of available channels, a bandwidth and frequency carrier of each channel, a preferred usage for each RSU of the one or more RSUs, the first number of the first vUEs, the second number of the second vUEs, or a time period during which the first number and the second number were determined; and send the V2X configuration message to the one or more RSUs over respective wired or wireless links.

21. The one or more NTCRM of claim 16, wherein execution of the instructions is to cause the computing system to:

configure the one or more RSUs with a first V2X RAT component during a first service period of the respective service periods, the first V2X RAT component enabling the one or more RSUs to provide the first RAT communication services; and configure the one or more RSUs with the second V2X RAT component during a second service period of the respective service periods, the second V2X RAT component enabling the one or more RSUs to provide the second V2X RAT communication services.

22. The one or more NTCRM of claim 16, wherein execution of the instructions is to cause the computing system to:

configure at least one RSU of the one or more RSUs with a first V2X RAT component, the first V2X RAT component enabling the at least one RSU to provide the first RAT communication services; and configure at least one other RSU of the one or more RSUs with a second V2X RAT component, the second V2X RAT component enabling the at least one other RSU to provide the second V2X RAT communication services.

23. The one or more NTCRM of claim 22, wherein, to determine the first number of the first vUEs and the second number of the second vUEs, execution of the instructions is to cause the computing system to:

determine the first number of the first vUEs to be a number of messages obtained from vUEs in a first frequency band; and determine the second number of the second vUEs to be a number of messages obtained from vUEs in a second frequency band.

24. The one or more NTCRM of claim 22, wherein, to determine the first number of the first vUEs and the second number of the second vUEs, execution of the instructions is to cause the computing system to:

receive request messages from the first vUEs and the second vUEs;

determine the first number of the first vUEs to be a number of request messages obtained from corresponding ones of the first vUEs; and determine the second number of the second vUEs to be a number of request messages obtained from corresponding ones of the second vUEs.

* * * * *